(12) United States Patent
Zhang et al.

(10) Patent No.: US 11,665,344 B2
(45) Date of Patent: May 30, 2023

(54) MULTIPLE MERGE LISTS AND ORDERS FOR INTER PREDICTION WITH GEOMETRIC PARTITIONING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN); Na Zhang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/244,533

(22) Filed: Apr. 29, 2021

(65) Prior Publication Data
US 2021/0258575 A1  Aug. 19, 2021

Related U.S. Application Data

(63) Continuation of application No. PCT/CN2019/116069, filed on Nov. 6, 2019.

(30) Foreign Application Priority Data

Nov. 6, 2018 (WO) ................ PCT/CN2018/114057
May 17, 2019 (WO) ................ PCT/CN2019/087372
(Continued)

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS 9,020,030 B2  4/2015  Chen et al.
9,271,006 B2  2/2016  Huang et al.
(Continued)

FOREIGN PATENT DOCUMENTS

CN  101350097 A  1/2009
CN  101822056 A  9/2010
(Continued)

OTHER PUBLICATIONS

Akula et al. "Description of SDR, HDR and 360° Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC 29/WG 11, 10th Meeting: San Diego, US, Apr. 10-20, 2018, document JVET-J0024, 2018.
(Continued)

*Primary Examiner* — Chikaodili E Anyikire
(74) *Attorney, Agent, or Firm* — Perkins Coie LLP

(57) ABSTRACT

Devices, systems and methods for digital video coding, which include geometric partitioning, are described. An exemplary method for video processing includes making a decision, based on a priority rule, regarding an order of insertion of motion candidates into a motion candidate list for a conversion between a current block of video and a bitstream representation of the video, wherein the current block is coded using a geometry partition mode; and per-
(Continued)

forming, based on the decision and the motion candidate list, the conversion.

17 Claims, 51 Drawing Sheets

(30) Foreign Application Priority Data

| | | | |
|---|---|---|---|
| Jun. 5, 2019 | (WO) | ................ | PCT/CN2019/090127 |
| Jun. 20, 2019 | (WO) | ................ | PCT/CN2019/092151 |

(51) Int. Cl.

| | |
|---|---|
| *H04N 19/132* | (2014.01) |
| *H04N 19/137* | (2014.01) |
| *H04N 19/176* | (2014.01) |
| *H04N 19/139* | (2014.01) |
| *H04N 19/159* | (2014.01) |
| *H04N 19/52* | (2014.01) |
| *H04N 19/46* | (2014.01) |

(52) U.S. Cl.
CPC ......... *H04N 19/137* (2014.11); *H04N 19/139* (2014.11); *H04N 19/159* (2014.11); *H04N 19/176* (2014.11); *H04N 19/46* (2014.11); *H04N 19/52* (2014.11)

(56) References Cited

U.S. PATENT DOCUMENTS

| | | | |
|---|---|---|---|
| 9,277,200 B2 | 3/2016 | Chen et al. | |
| 9,762,924 B2 | 9/2017 | Kim et al. | |
| 10,116,964 B2 | 10/2018 | An et al. | |
| 10,129,542 B2 | 11/2018 | Gu et al. | |
| 10,356,416 B2 | 7/2019 | Liu et al. | |
| 10,448,048 B2 | 10/2019 | Kim et al. | |
| 10,681,383 B2 | 6/2020 | Ye et al. | |
| 10,715,827 B2 | 7/2020 | Hsu | |
| 10,771,781 B2 | 9/2020 | Lee et al. | |
| 10,805,607 B2* | 10/2020 | Moon | H04N 19/119 |
| 11,159,793 B2 | 10/2021 | Ahn et al. | |
| 11,265,541 B2 | 3/2022 | Zhang et al. | |
| 2011/0194609 A1* | 8/2011 | Rusert | H04N 19/137 375/E7.243 |
| 2011/0206132 A1 | 8/2011 | Bivolarsky et al. | |
| 2012/0147961 A1 | 6/2012 | Guo et al. | |
| 2013/0051470 A1 | 2/2013 | Noguchi | |
| 2013/0070854 A1* | 3/2013 | Wang | H04N 19/52 375/E7.125 |
| 2013/0107959 A1* | 5/2013 | Park | H04N 19/159 375/240.15 |
| 2013/0128974 A1 | 5/2013 | Chien et al. | |
| 2013/0188715 A1* | 7/2013 | Seregin | H04N 19/52 375/240.16 |
| 2013/0202038 A1 | 8/2013 | Seregin et al. | |
| 2014/0219356 A1* | 8/2014 | Nishitani | H04N 19/51 375/240.16 |
| 2015/0181233 A1 | 6/2015 | Ramasubramonian et al. | |
| 2015/0373358 A1 | 12/2015 | Pang et al. | |
| 2016/0286230 A1 | 9/2016 | Li et al. | |
| 2016/0295215 A1 | 10/2016 | Hsu | |
| 2016/0345007 A1 | 11/2016 | Jaeger et al. | |
| 2016/0366435 A1 | 12/2016 | Chien et al. | |
| 2017/0332099 A1 | 11/2017 | Lee et al. | |
| 2018/0041778 A1 | 2/2018 | Zhang et al. | |
| 2018/0091814 A1 | 3/2018 | Carmel et al. | |
| 2018/0103273 A1 | 4/2018 | Guo et al. | |
| 2019/0200023 A1 | 3/2019 | Hanhart et al. | |
| 2019/0238811 A1 | 8/2019 | Xiu et al. | |
| 2019/0297325 A1* | 9/2019 | Lim | H04N 19/119 |
| 2019/0387251 A1 | 12/2019 | Lin et al. | |
| 2020/0021845 A1 | 1/2020 | Lin et al. | |
| 2020/0120334 A1 | 4/2020 | Xu et al. | |
| 2020/0137386 A1 | 4/2020 | Zhao et al. | |
| 2020/0137387 A1 | 4/2020 | Zhao et al. | |
| 2020/0288150 A1 | 9/2020 | Jun et al. | |
| 2020/0359020 A1 | 11/2020 | Ahn et al. | |
| 2020/0359048 A1* | 11/2020 | Abe | H04N 19/537 |
| 2020/0394450 A1 | 12/2020 | Li et al. | |
| 2021/0006787 A1 | 1/2021 | Zhang et al. | |
| 2021/0006788 A1 | 1/2021 | Zhang et al. | |
| 2021/0037240 A1 | 2/2021 | Zhang et al. | |
| 2021/0037256 A1 | 2/2021 | Zhang et al. | |
| 2021/0051324 A1 | 2/2021 | Zhang et al. | |
| 2021/0092379 A1 | 3/2021 | Zhang et al. | |
| 2021/0136402 A1* | 5/2021 | Lim | H04N 19/52 |

FOREIGN PATENT DOCUMENTS

| | | |
|---|---|---|
| CN | 102498718 A | 6/2012 |
| CN | 102547290 A | 7/2012 |
| CN | 102763415 A | 10/2012 |
| CN | 102946536 A | 2/2013 |
| CN | 103202014 A | 7/2013 |
| CN | 103299624 A | 9/2013 |
| CN | 104838656 A | 8/2015 |
| CN | 105187839 A | 12/2015 |
| CN | 107347159 A | 11/2017 |
| CN | 107580223 A | 1/2018 |
| CN | 108353184 A | 7/2018 |
| CN | 109417629 A | 3/2019 |
| WO | 2008016605 A2 | 2/2008 |
| WO | 2008016609 A2 | 2/2008 |
| WO | 2011087320 A2 | 7/2011 |
| WO | 2011103210 A2 | 8/2011 |
| WO | 2013106336 A2 | 7/2013 |
| WO | 2015081888 A1 | 6/2015 |
| WO | 2015100731 A1 | 7/2015 |
| WO | 2015139762 A1 | 9/2015 |
| WO | 2017131475 A1 | 8/2017 |
| WO | 2017197126 A1 | 11/2017 |
| WO | 2018012851 A1 | 1/2018 |
| WO | 2018119431 A1 | 6/2018 |
| WO | 2018128239 A1 | 7/2018 |
| WO | 2018141416 A1 | 8/2018 |
| WO | 2018172609 A2 | 9/2018 |
| WO | 2018166357 A1 | 9/2019 |
| WO | 2020061147 A1 | 3/2020 |
| WO | 2020073896 A1 | 4/2020 |

OTHER PUBLICATIONS

Blaser et al. "Geometry-based Partitioning for Predictive Video Coding with Transform Adaptation," RWTH Aachen University, IEEE 2018.
Bross et al. "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1001, 2018.
Chen et al. "Overlapped Block Motion Compensation in TMuC," Joint Collaborative Team on Video Coding (JCT-VC) of ITU-T SG16 WP3 and ISO/IEC JTC1/SC29/WG11, 3rd Meeting, Guangzhou, CN, Oct. 7-15, 2010, document JCTVC-C251, 2010.
Chen et al. "Algorithm description of Joint Exploration Test Model 7 (JEM7)," Joint Video Exploration Team (JVET) of TU-T SG 16 WP 3 and ISO/IEC JTC 1/SC 29/WG 11, 7th Meeting; Torino, IT, Jul. 13-21, 2017, document JVET-G1001, Jul. 2017.
Chen et al. "Algorithm Description for Versatile Video Coding and Test Model 2 (VTM2)," Joint Video Experts Team (JVET) of ITU-T SG 16 WP 3 and ISO/IEC JTC 1/SC 29/WG 11 11th Meeting, Ljubljana, SI, Jul. 10-18, 2018, document JVET-K1002, 2018.
Chen et al. "CE4: Common Base for Affine Merge Mode (Test 4.2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.
Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

(56) References Cited

OTHER PUBLICATIONS

Chen et al. "CE4: Separate List for Sub-Block Merge Candidates (test 4.2.8)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0369, 2018.

Guo et al. "Simplified Geometry-Adaptive Block Partitioning for Video Coding," Proceedings of 2010 IEEE 17th Inernational Conference on Image Processing, Sep. 26-29, 2010, Hong Kong, pp. 965-968.

Guo et al. "CE2: Overlapped Block Motion Compensation," Joint Collaborative Team on Video Coding (JCT-VC) of ITU-T SG16 WP3 and ISO/IEC JTC1/SC29/WG11, 7th Meeting, Geneva, Nov. 21-30, 2011, document JCTVC-G749, 2011.

Han et al. "CE4.1.3: Affine Motion Compensation Prediction," Joint Video Exploration Team (JVET) of ITU-T SG 16 WP3 and ISO/IEC JTC 1/SC 29/WG 11, 11th Meeting: Ljubljana, SI, Jul. 10-18, 2018,document JVET-K0337, 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC 1/SC 29/WG 11, 12th Meeting, Macao, CN, Oct. 3-12, 2018, document JVET-L0278, 2018.

Information Technology—High efficiency coding and media delivery in heterogeneous environments—Part 2: "High Efficiency Video Coding" ISO/IEC JTC 1/SC 29/WG 11 N 17661, ISO/IEC DIS 23008-2_201x(4th Ed.) (Apr. 2018).

JEM-7.0:—https://jvet.hhi.fraunhofer.de/svn/svn_HMJEMSoftware/tags/ HM-16.6-38JEM-7.0 (Accessed on Apr. 21, 2020).

https://vegit.hhi.fraunhofer.de/jvet/WCSoftware_VTM/tags/VTM-2.1 (only website).

Kim et al. "Block Partitioning Structure in the HEVC Standard," IEEE Transactions on Circuits and Systems for Video Technology, Dec. 2012, 22(12):1697-1706.

Li et al. "An Efficient Four-Parameter Affine Motion Model for Video Coding," IEEE Transactions on Circuits and Systems for Video Technology, Aug. 2018, 28(8):1934-1948.

Liao et al. "CE10:Triangular Prediction Unit Mode (CE10.3.1 and CE10.3.2)," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0144, 2018.

Liao et al. "CE10.3.1.b:Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Rosewarne C et al. "High Efficiency Video Coding (HEVC) Test Model 16 (HM16) Improved Encoder Description Update 7," Joint Collaborative Team on Video Coding (JCT-VC) of ITU-T SG.16 WP3 and ISO/IEC JTC1/SC29/WG11, 25th Meeting, Chengdu, CN, Oct. 14-21, 2016, document JCTVC-Y1002, 2016.

Sun et al. "Geometric Derived Motion Vector for Motion Prediction in Block-Based Video Coding," 2017 IEEE International Conference on Image Processing (IC1P), Sep. 20, 2017, pp. 2483-2487.

Suzuki et al. "Extension of Uni-Prediction Simplification in B Slices," Joint Collaborative Team on Video Coding (JCT-VC) of ITU-T SG16 WP3 and Iso/IEC JTC1/SC29/WG11, 4th meeting, Daegu, Korea, Jan. 20-28, 2011, document JCTVC-D421, 2011.

Xu et al. "Candidate List Reordering," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0065, 2018.

Yuan et al. "CE2: Non-Square Quadtree Transform for Symmetric and Asymmetric Motion Partition," Joint Collaborative Team on Video Coding (JCT-VC) of ITU-T SG16 WP3 and ISO/IEC JTC1/SC26/WG11, 6th Meeting, Torino, IT, Jul. 14-22, 2011, document JCTVC-F412, 2011.

International Search Report and Written Opinion from PCT/CN2019/116065 dated Feb. 3, 2020 (14 pages).

International Search Report and Written Opinion from PCT/CN2019/116067 dated Feb. 3, 2020 (10 pages).

International Search Report and Written Opinion from PCT/CN2019/116069 dated Feb. 3, 2020 (14 pages).

International Search Report and Written Opinion from PCT/CN2019/116073 dated Feb. 1, 2020 (10 pages).

International Search Report and Written Opinion from PCT/CN2019/116074 dated Jan. 31, 2020 (11 pages).

International Search Report and Written Opinion from PCT/CN2019/116078 dated Feb. 11, 2020 (9 pages).

International Search Report and Written Opinion from PCT/CN2019/116080 dated Feb. 3, 2020 (11 pages).

International Search Report and Written Opinion from PCT/CN2020/090481 dated Aug. 20, 2020 (9 pages).

International Search Report and Written Opinion from PCT/CN2020/094158 dated Sep. 3, 2020 (9 pages).

Non-Final Office Action from U.S. Appl. No. 17/019,834 dated Nov. 10, 2020.

Non-Final Office Action from U.S. Appl. No. 17/087,154 dated Dec. 14, 2020.

Final Office Action from U.S. Appl. No. 17/019,834 dated Mar. 12, 2021.

Final Office Action from U.S. Appl. No. 17/087,154 dated Apr. 19, 2021.

Sjoberg et al. "Overview of HEVC High-Level Syntax and Reference Picture Management," IEEE Transactions on Circuits and Systems for Video Technology, Dec. 2012, 22(12):1858-1870.

Sullivan et al. "Standardized Extension of High Efficiency Video Coding (HEVC)," IEEE Journal of Selected Topics in Signal Processing,Dec. 2013, 7(6):1001-1016.

Non-Final Office Action from U.S. Appl. No. 17/087,154 dated Dec. 10, 2021.

Extended European Search Report from EP19882035.9 dated May 28, 2021 (7 pages).

Blaser et al. "CE10-Related: Bi-Directional Motion Vector Storage for Triangular Prediction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0581, 2019.

Zhang et al. "Non-CE4: Simplified Motion Field Storage for TPM," Joint Video Experts Team (JVET) of ITU-T SG 16 WP 3 and ISO/IEC JTC 1/SC 29/WG 11 15th Meeting: Gothenburg, SE, Jul. 3-12, 2019. document JVET-O265, 2019.

Notice of Allowance from U.S. Appl. No. 17/087,154 dated May 16, 2022.

* cited by examiner (b) second PU of 2N×N (a) second PU of N×2N

3102 — Making a decision, based on a priority rule, regarding an order of insertion of motion candidates into a motion candidate list for a conversion between a current block of video and a bitstream representation of the video, wherein the current block is coded using a geometry partition mode 3104 — Performing, based on the decision and the motion candidate list, the conversion

FIG. 31

```
                    ┌─ 3200
                    │
┌─────────────────────────────────────────┐ ─ 3202
│ Inserting, into a motion candidate list  │
│ for a conversion between a current block │
│ of video and a bitstream representation  │
│ of the video, one or more averaged       │
│ uni-prediction motion candidates from    │
│ List 0 and List 1 derived from one       │
│ regular motion candidate, wherein the    │
│ current block is coded using a geometry  │
│ partition mode                           │
└─────────────────────────────────────────┘
                    │
┌─────────────────────────────────────────┐ ─ 3204
│ Performing, based on the motion          │
│ candidate list, the conversion           │
└─────────────────────────────────────────┘
```

3302 — Inserting, into a motion candidate list for a conversion between a current block of video and a bitstream representation of the video, one or more averaged motion candidates with uni-prediction derived from regular motion candidates with uni-prediction, wherein the current block is coded using a geometry partition mode 3304 — Performing, based on the motion candidate list, the conversion

3402 — Inserting, into a motion candidate list for a conversion between a current block of video and a bitstream representation of the video, one or more virtual motion candidates derived from available motion candidates, wherein the current block is coded using a geometry partition mode 3404 — Performing, based on the motion candidate list, the conversion

FIG. 34

```
┌─────────────────────────┐      ┌─────────────────────────┐
│ 4000                    │ 4002 │                    4004 │
│                         │      │                         │
│  Selecting, for a       │      │  Applying, as part of   │
│  current block of       │      │  a conversion between   │
│  video that is          │      │  the current block      │
│  partitioned into       │      │  and a bitstream        │
│  multiple partitions    │      │  representation of      │
│  using a geometry       │      │  the video, the         │
│  partition mode, a      │      │  weighting factor       │
│  weighting factor       ├──────┤  group to samples       │
│  group from a           │      │  along a common         │
│  plurality of           │      │  boundary of at least   │
│  weighting factor       │      │  two of the multiple    │
│  groups, wherein the    │      │  partitions             │
│  weighting factor       │      │                         │
│  group is selected      │      │                         │
│  based on at least a    │      │                         │
│  width or a height of   │      │                         │
│  the current block      │      │                         │
└─────────────────────────┘      └─────────────────────────┘
```

4102 — Determining, for a sample within a current block of video that is partitioned into multiple partitions using a geometry partition mode, at least one weighting factor based on an angle of a common boundary of at least two of the multiple partitions 4104 — Performing, based on the at least one weighting factor, a conversion between the current block and a bitstream representation of the video

4202 — Performing, for a current block of video that is partitioned into multiple partitions using a geometry partition mode, a motion compensation process on samples along a common boundary of at least two of the multiple partitions with a sample size that is different from a 4×4 sample size 4204 — Performing, based on the motion compensation process, a conversion between the current block and a bitstream representation of the video

MULTIPLE MERGE LISTS AND ORDERS FOR INTER PREDICTION WITH GEOMETRIC PARTITIONING

CROSS-REFERENCE TO RELATED APPLICATIONS

This application is a continuation of International Application No. PCT/CN2019/116069, filed on Nov. 6, 2019 which claims the priority to and benefits of International Patent Application No. PCT/CN2018/114057, filed on Nov. 6, 2018, International Patent Application No. PCT/CN2019/087372, filed on May 17, 2019, International Patent Application No. PCT/CN2019/090127, filed on Jun. 5, 2019, and International Patent Application No. PCT/CN2019/092151, filed on Jun. 20, 2019. All of the aforementioned patent applications are hereby incorporated by reference in their entireties.

TECHNICAL FIELD

This document is related to video coding techniques, systems and devices.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, which include geometric partitioning, are described. The described methods may be applied to both the existing video coding standards (e.g., High Efficiency Video Coding (HEVC) and/or Versatile Video Coding (VVC)) and future video coding standards or video codecs.

In one representative aspect, the disclosed technology may be used to provide a method for video processing. This method includes making a decision, based on a priority rule, regarding an order of insertion of motion candidates into a motion candidate list for a conversion between a current block of video and a bitstream representation of the video, wherein the current block is coded using a geometry partition mode; and performing, based on the decision and the motion candidate list, the conversion.

In another representative aspect, the disclosed technology may be used to provide a method for video processing. This method includes inserting, into a motion candidate list for a conversion between a current block of video and a bitstream representation of the video, one or more averaged uni-prediction motion candidates from List 0 and List 1 derived from one regular motion candidate, wherein the current block is coded using a geometry partition mode; and performing, based on the motion candidate list, the conversion.

In yet another representative aspect, the disclosed technology may be used to provide a method for video processing. This method includes inserting, into a motion candidate list for a conversion between a current block of video and a bitstream representation of the video, one or more averaged motion candidates with uni-prediction derived from regular motion candidates with uni-prediction, wherein the current block is coded using a geometry partition mode; and performing, based on the motion candidate list, the conversion.

In yet another representative aspect, the disclosed technology may be used to provide a method for video processing. This method includes inserting, into a motion candidate list for a conversion between a current block of video and a bitstream representation of the video, one or more virtual motion candidates derived from available motion candidates, wherein the current block is coded using a geometry partition mode; and performing, based on the motion candidate list, the conversion.

In yet another representative aspect, the disclosed technology may be used to provide a method for video processing. This method includes making a decision, based on a priority rule, regarding an order of insertion of motion candidates into a motion candidate list for a conversion between a current block of video coded using a geometry partition mode and a bitstream representation of the video, wherein the priority rule is based on a position from where a motion candidate of the motion candidates is derived or one or more reference picture lists associated with the motion candidate; and performing, based on the decision and the motion candidate list, the conversion.

In yet another representative aspect, the disclosed technology may be used to provide a method for video processing. This method includes making a decision, based on a priority rule, regarding an order of insertion of motion candidates into a motion candidate list for a conversion between a current block of video and a bitstream representation of the video, wherein the current block is coded using a geometry partition mode, wherein the order or insertion is changeable across sequence to sequence, picture to picture, slice to slice, tile group to tile group, or from the current block to a subsequent block of the video; and performing, based on the decision and the motion candidate list, the conversion.

In yet another representative aspect, the disclosed technology may be used to provide a method for video processing. This method includes partitioning a current block of video coded using a geometry partition mode into multiple partitions; constructing multiple motion candidate lists, each motion candidate list corresponding to each of the multiple partitions; and performing, based on the multiple motion candidate lists, a conversion between the current block and a bitstream representation of the video.

In yet another representative aspect, the disclosed technology may be used to provide a method for video processing. This method includes partitioning a current block of video coded using a geometry partition mode into multiple partitions; constructing multiple motion candidate lists, wherein each of the multiple partitions is configured to select a same motion candidate list of the multiple motion candidate lists; and performing, based on the selected same motion candidate list, a conversion between the current block and a bitstream representation of the video.

In yet another representative aspect, the disclosed technology may be used to provide a method for video processing. This method includes performing a conversion between a current block of video in a video unit and a bitstream representation of the video, wherein the bitstream representation includes a field indicative of a maximum number of allowed motion candidate in a motion candidate list for a geometry partition mode that is enabled in the video region.

In yet another representative aspect, the disclosed technology may be used to provide a method for video processing. This method includes selecting, for a current block of video that is partitioned into multiple partitions using a geometry partition mode, a weighting factor group from a plurality of weighting factor groups, wherein the weighting factor group is selected based on at least a width or a height of the current block; and applying, as part of a conversion between the current block and a bitstream representation of the video, the weighting factor group to samples along a common boundary of at least two of the multiple partitions.

In yet another representative aspect, the disclosed technology may be used to provide a method for video processing. This method includes determining, for a sample within a current block of video that is partitioned into multiple partitions using a geometry partition mode, at least one weighting factor based on an angle of a common boundary of at least two of the multiple partitions; and performing, based on the at least one weighting factor, a conversion between the current block and a bitstream representation of the video.

In yet another representative aspect, the disclosed technology may be used to provide a method for video processing. This method includes performing, for a current block of video that is partitioned into multiple partitions using a geometry partition mode, a motion compensation process on samples along a common boundary of at least two of the multiple partitions with a sample size that is different from a 4×4 sample size; and performing, based on the motion compensation process, a conversion between the current block and a bitstream representation of the video.

In yet another representative aspect, the disclosed technology may be used to provide a method for video processing. This method includes partitioning a current block of video into multiple partitions using a geometry partition mode; storing a single set of motion information for a K×L region within the current block that is derived from motion information associated with the multiple partitions; and performing, using at least one set of motion information associated with at least one of the multiple partitions, a conversion between the current block and a bitstream representation of the video.

In yet another representative aspect, the disclosed technology may be used to provide a method for video processing. This method includes partitioning a current block of video into multiple partitions; and performing a conversion between the current block coded using a geometry partition mode and a bitstream representation of the video, wherein a single set of motion information is stored for each M×N block unit of the current block, wherein the single set of motion information is derived from motion information associated with each of the multiple partitions, wherein either M or N is not equal to 4, and wherein each sample in the M×N block unit shares a same motion information.

In yet another representative aspect, the disclosed technology may be used to provide a method for video processing. This method includes partitioning a current block of video into multiple partitions; and performing, as part of a conversion between the current block and a bitstream representation of the video, a motion compensation process for a first sub-region of the current block based on a first motion information that is different from a second motion information associated with the first sub-region which is to be stored.

In yet another representative aspect, the disclosed technology may be used to provide a method for video processing. This method includes partitioning a current block of video into multiple partitions using a geometry partition mode; storing, based on a splitting direction or decoded merge indices or merge candidate lists associated with the multiple partitions, motion information for a first set of samples and a second set of samples, wherein the first set of samples is on a common boundary of at least two of the multiple partitions and the second set of samples is in an interior of one of the at least two of the multiple partitions; and performing, based on stored motion information, a conversion between the current block and a bitstream representation of the video or a conversion between subsequent blocks of the video and the bitstream representation.

In yet another representative aspect, the disclosed technology may be used to provide a method for video processing. This method includes partitioning a current block of video into multiple partitions; storing virtual bi-prediction motion information that is based on motion information of at least two of the multiple partitions; and performing, based on the virtual bi-prediction motion information, a conversion between the current block and a bitstream representation of the video.

In yet another representative aspect, the disclosed technology may be used to provide a method for video processing. This method includes partitioning a current block of video into multiple partitions; storing, based on a low delay check flag, motion information for a first partition of the multiple partitions (MvInfo1) and motion information for a second partition of the multiple partitions (MvInfo2), wherein the low delay check flag is indicative of all reference pictures having picture order count (POC) values that are no greater than a POC value of a current picture comprising the current block; and performing, based on the stored motion information, a conversion between the current block and a bitstream representation of the video.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 16A and 16B show examples of signaling of triangular prediction mode (TPM).

FIGS. 31-48 are flowcharts for examples of a video processing method.

DETAILED DESCRIPTION

Figure 1:
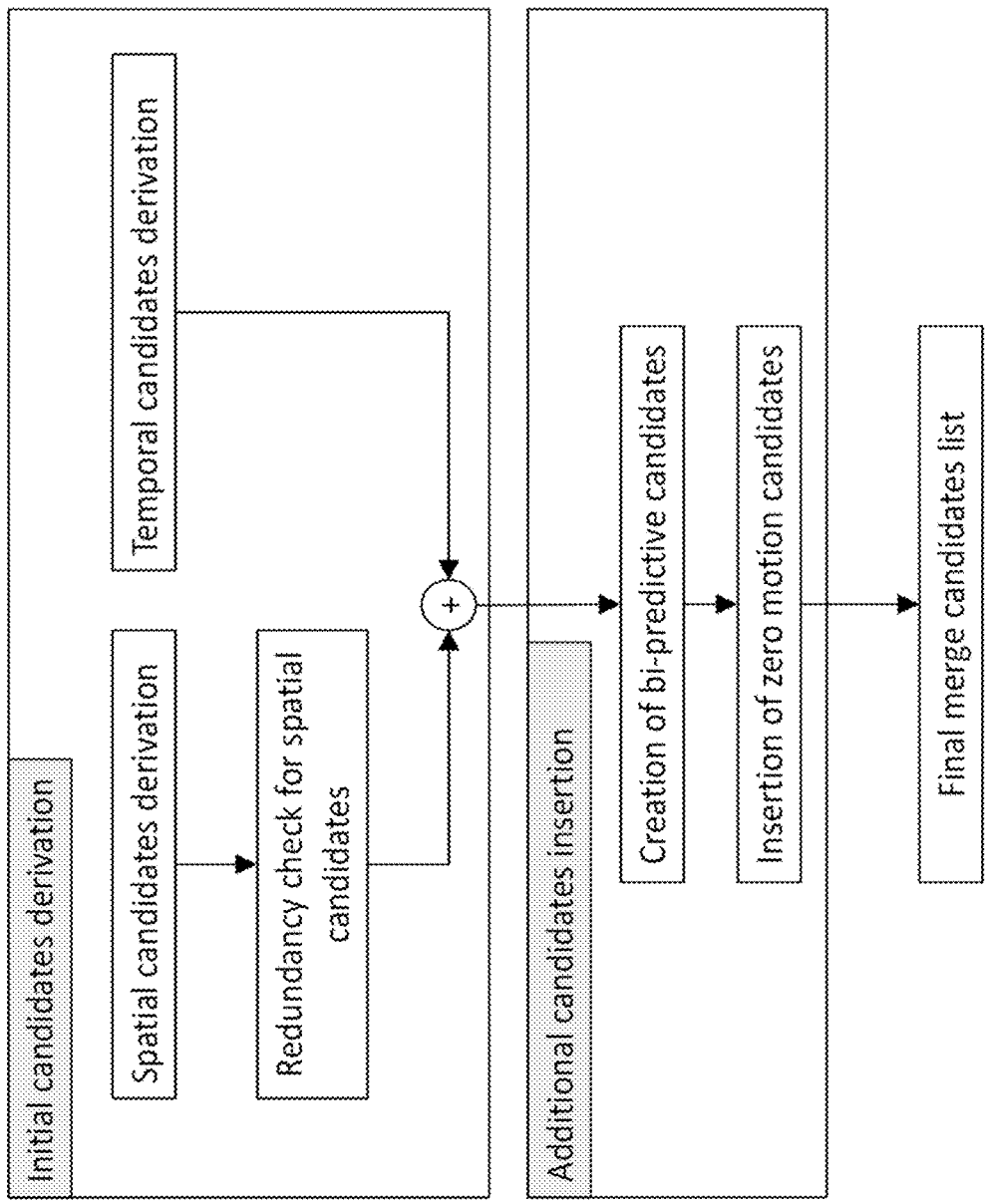
FIG. 1 is an example of derivation process for merge candidates list construction.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to motion vector coding and signaling under geometry partitioning in video coding. It may be applied to the existing video coding standard like HEVC, or a standard (e.g., Versatile Video Coding (VVC)) to be finalized. It may be also applicable to future video coding standards or video codec.

2. Introductory Comments

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the versatile video coding (VVC) standard targeting at 50% bitrate reduction compared to HEVC.

The latest version of VVC draft, i.e., Versatile Video Coding (Draft 2) could be found at:

http://phenix.it-sudparis.eu/jvet/doc_end_user/documents/11_Ljubljana/wg11/JVET-K1001-v7.zip The latest reference software of VVC, named VTM, could be found at:

https://vcgit.hhi.fraunhofer.de/jvet/VVCSoftware_VTM/tags/VTM-2.1

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
  Step 1.1: Spatial candidates derivation
  Step 1.2: Redundancy check for spatial candidates
  Step 1.3: Temporal candidates derivation
Step 2: Additional candidates insertion
  Step 2.1: Creation of bi-predictive candidates
  Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 3:
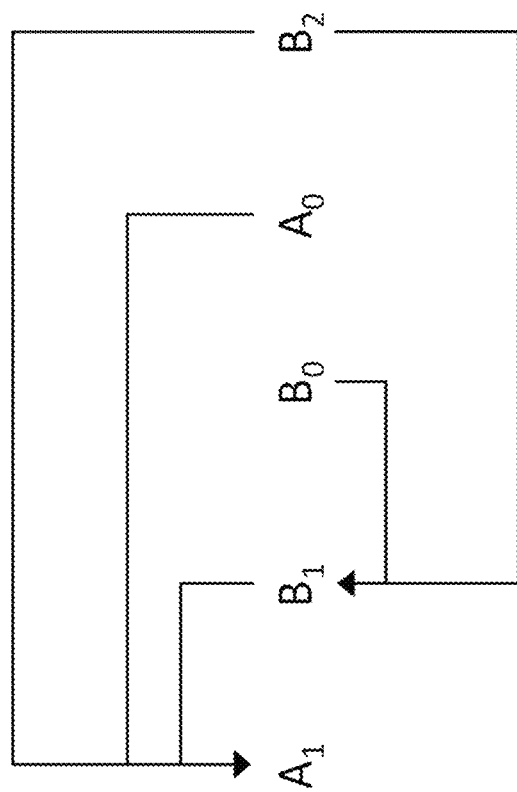
FIG. 3 shows an example of candidate pairs considered for redundancy check of spatial merge candidates.
Figure 2:
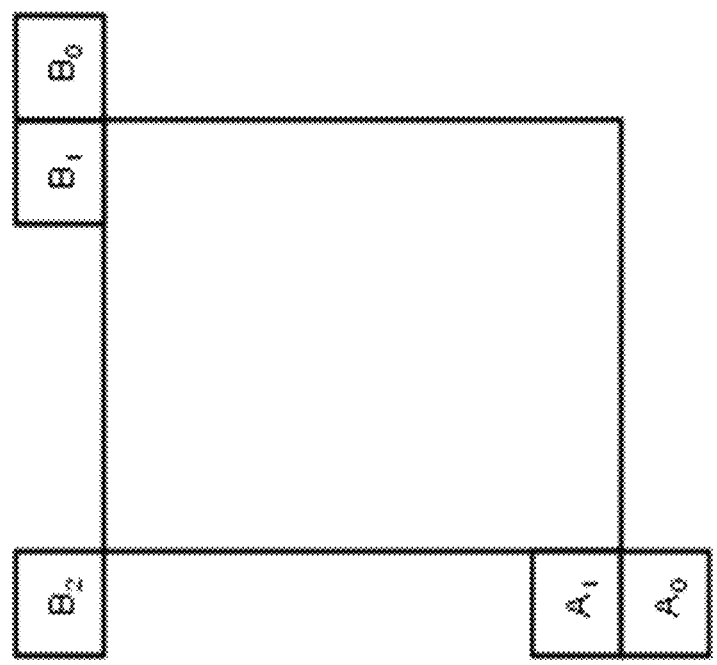
FIG. 2 shows example positions of spatial merge candidates.
Figure 4B:
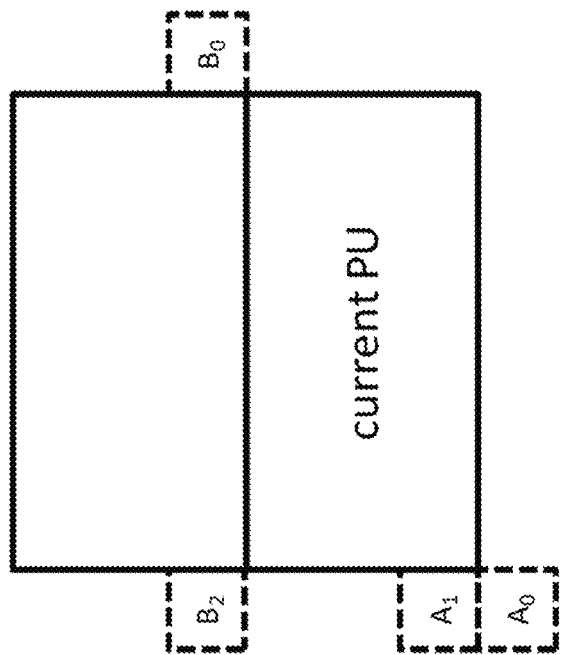
FIGS. 4A and 4B show example positions for a second prediction unit (PU) of N×2N and 2N×N partitions.
Figure 4A:
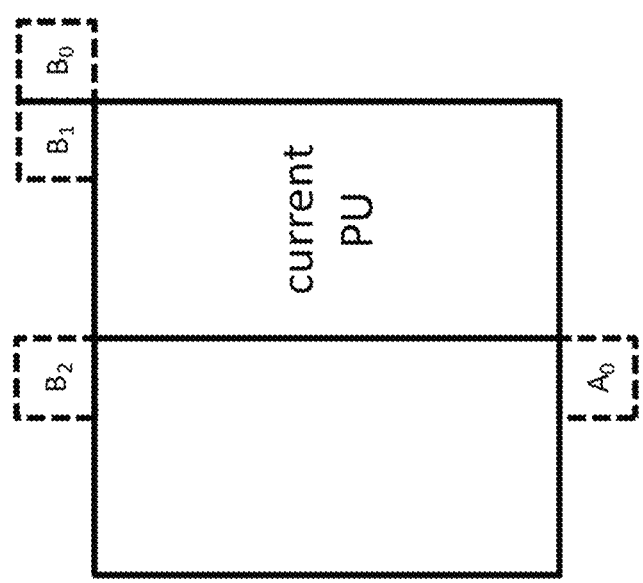

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A and FIG. 4B depict the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
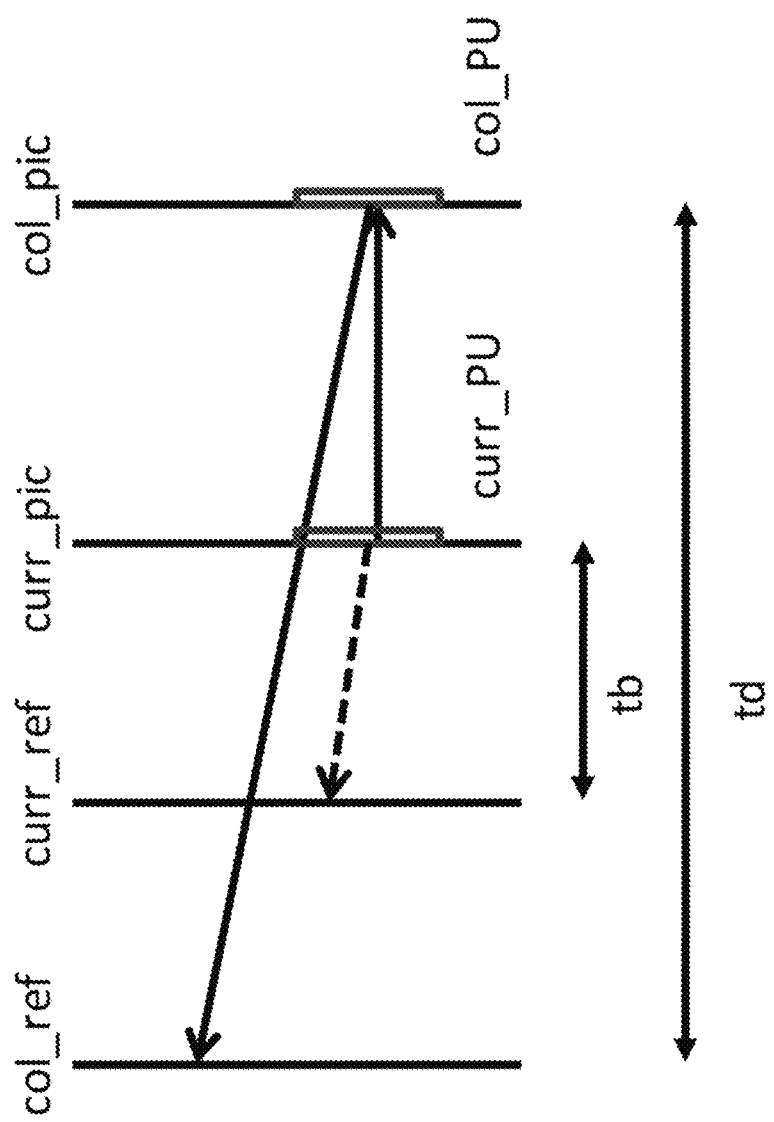
FIG. 5 is an example illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
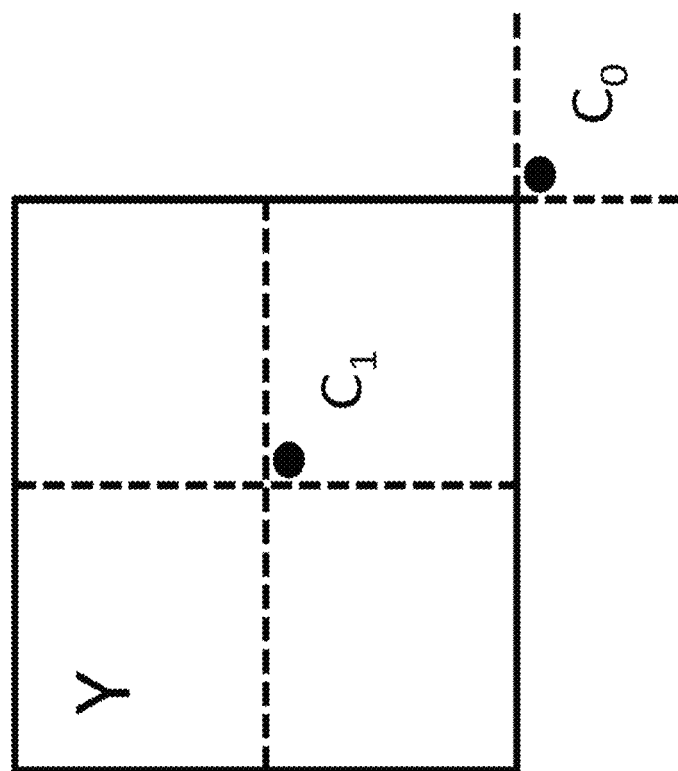
FIG. 6 shows example candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

2.1.2.4 Additional Candidates Insertion

Figure 7:
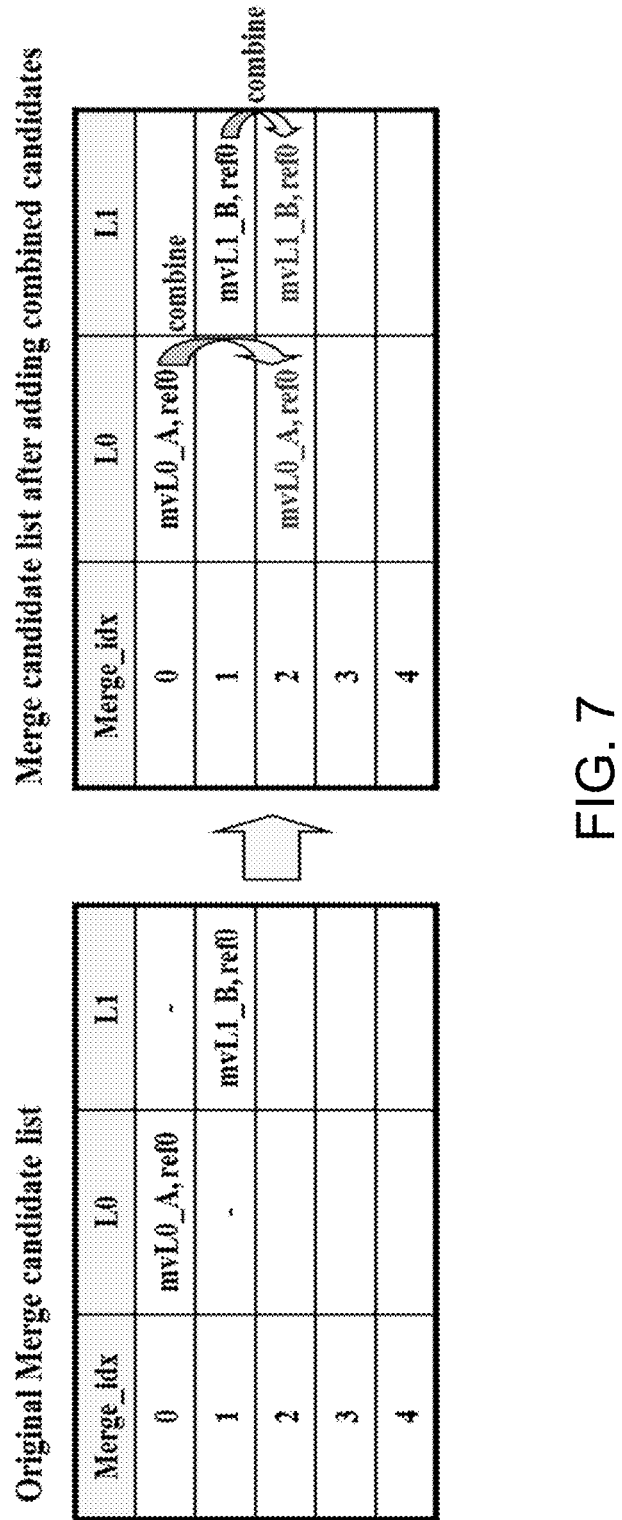
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.2.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
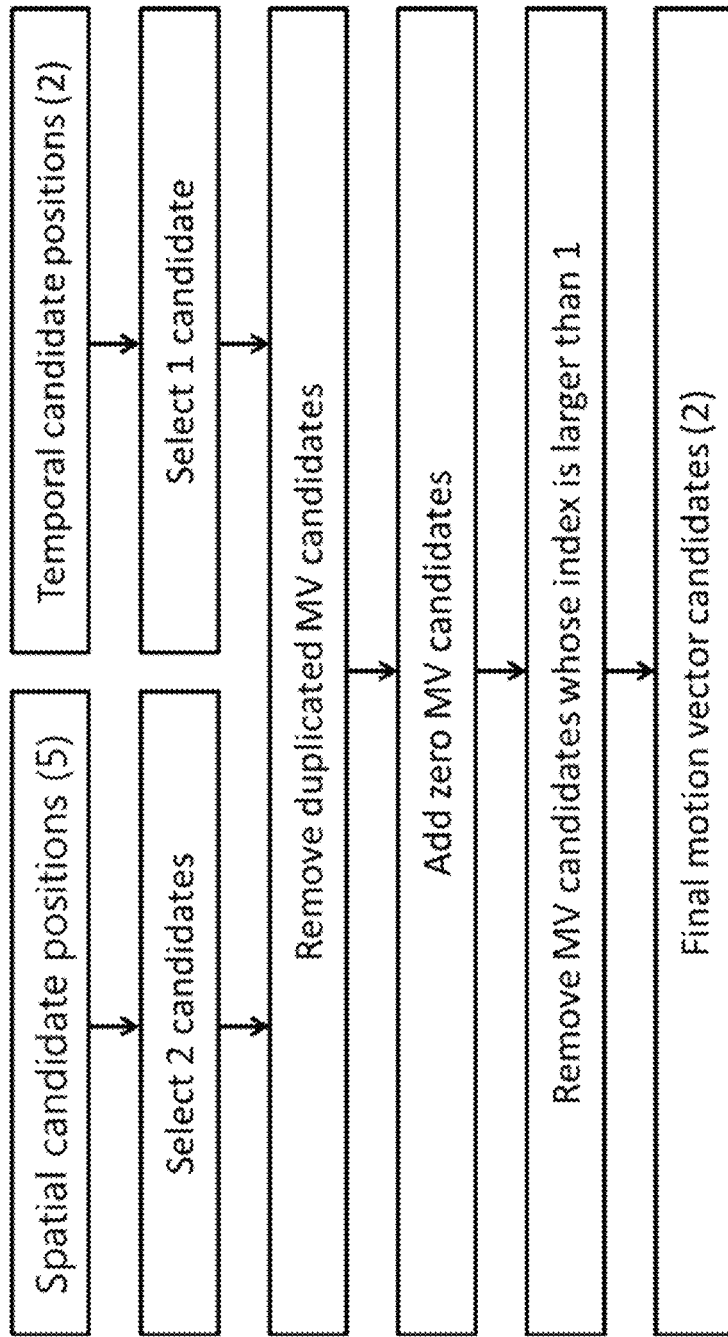
FIG. 8 shows an example derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
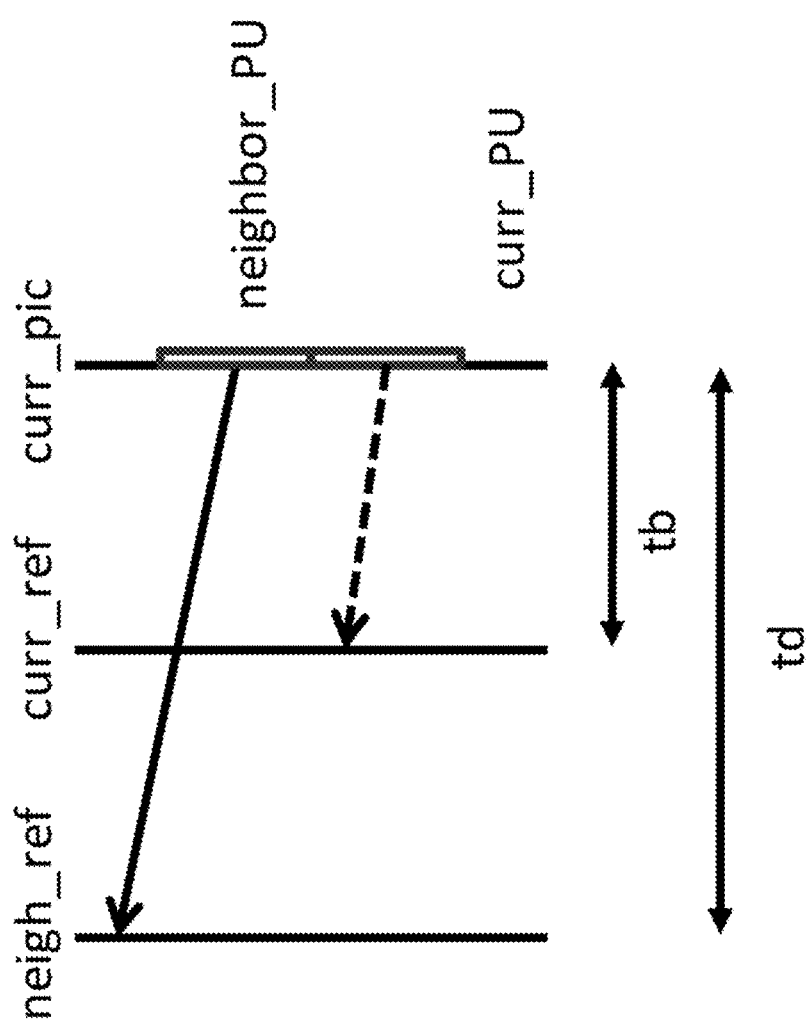
FIG. 9 is an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 New Inter Prediction Methods in JEM 2.2.1 Sub-CU Based Motion Vector Prediction In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1.1 Alternative Temporal Motion Vector Prediction

Figure 10:
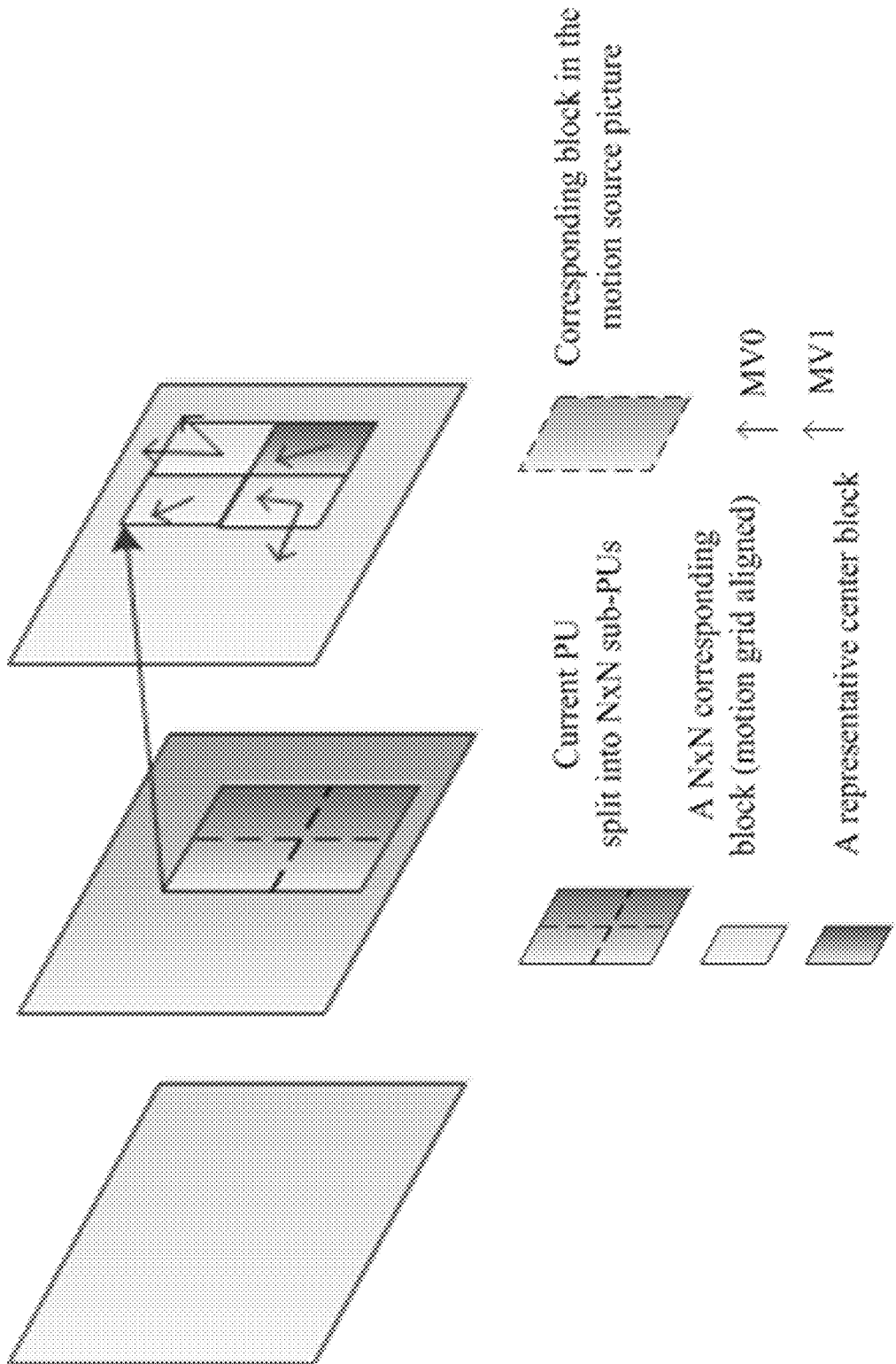
FIG. 10 shows an example of alternative temporal motion vector prediction (ATMVP) motion prediction for a CU.

With reference to FIG. 10, in the alternative temporal motion vector prediction (ATMVP) method, the motion vectors temporal motion vector prediction (TMVP) is modified by fetching multiple sets of motion information (including motion vectors and reference indices) from blocks smaller than the current CU. In an example, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.1.2 Spatial-Temporal Motion Vector Prediction (STMVP)

Figure 11:
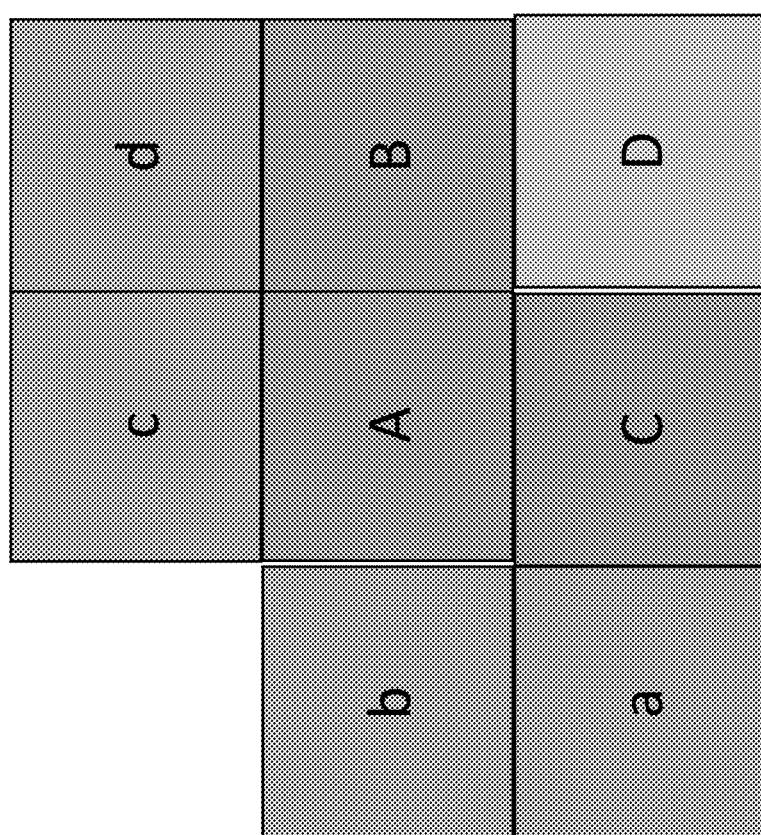
FIG. 11 shows an example of one CU with four sub-blocks (A-D) and its neighboring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index are context coded by CABAC. While in HEVC, only the first bin is context coded and the remaining bins are context by-pass coded.

2.2.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
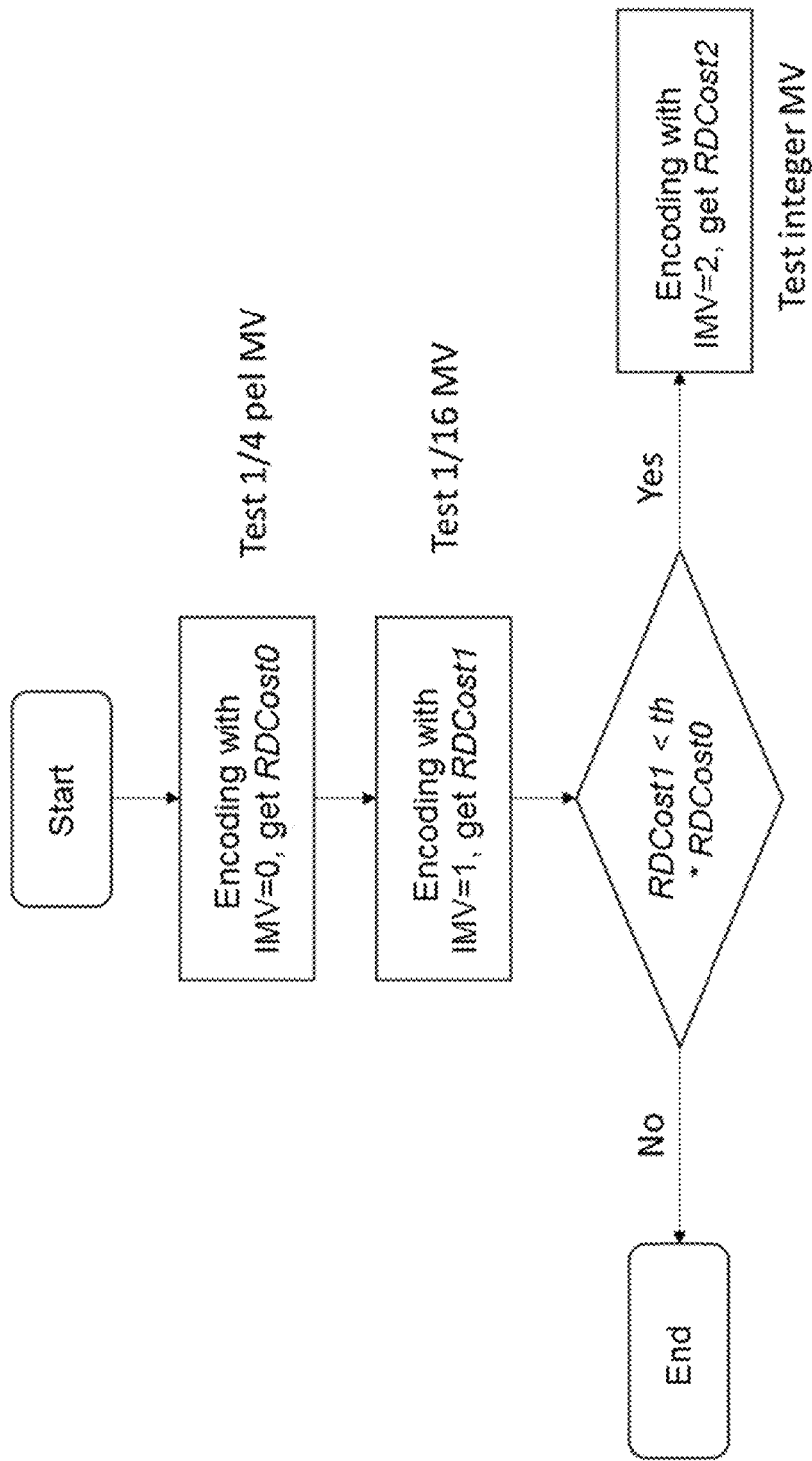
FIG. 12 is a flowchart of an example of encoding with different MV precision

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.3 Triangular Prediction Mode

Figure 13A:
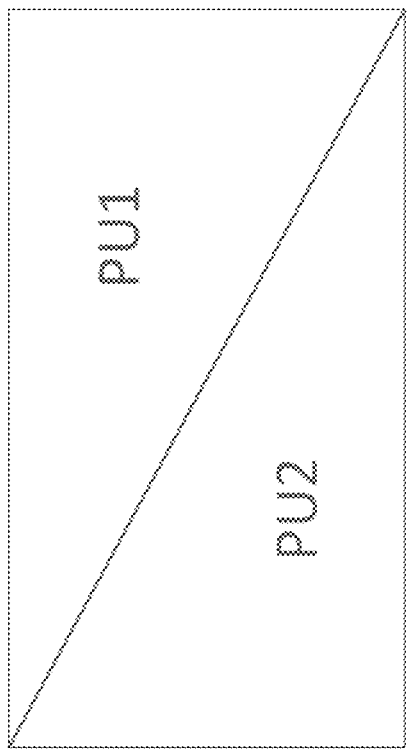
FIGS. 13A and 13B show 135 degree partition type (splitting from top-left corner to bottom-right corner), and 45 degree splitting patterns. An illustration of splitting a CU into two triangular prediction units (two splitting patterns).
Figure 13B:
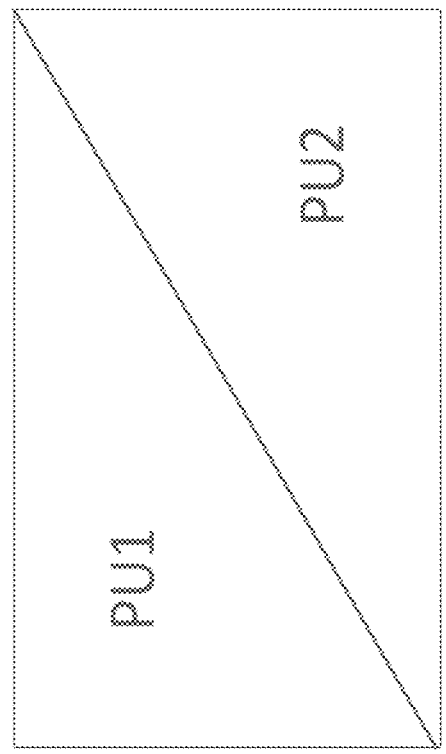

The concept of the triangular prediction mode (TPM) is to introduce a new triangular partition for motion compensated prediction. As shown in FIGS. 13A and 13B, it splits a CU into two triangular prediction units, in either diagonal or inverse diagonal direction. Each triangular prediction unit in the CU is inter-predicted using its own uni-prediction motion vector and reference frame index which are derived from one single uni-prediction candidate list. An adaptive weighting process is performed to the diagonal edge after predicting the triangular prediction units. Then, the transform and quantization process are applied to the whole CU. It is noted that this mode is only applied to merge modes (including skip mode, wherein skip mode is treated as a special merge mode).

In this document, the triangular prediction mode (TPM) is alternatively referred to as triangular partitioning mode, triangle prediction mode, triangular partitioning mode, geometry partition mode, or geometry partitioning mode.

In some embodiments, for non-TPM (also referred to as non-geometry) merge mode, a merge index to a merge list is signaled, the merge list which consists multiple regular merge candidates is constructed as: spatial merge candidates (derived from up to five spatial neighbors), temporal merge candidate (TMVP), HMVP, pairwise averaged candidate, and default merge candidate (zero MV with some assigned reference pictures). In some embodiments, a regular merge candidate is a motion candidate derived for a block of video coded using a non-geometry (non-TPM) partition mode.

In contrast, for TPM coded block, two merge indices (with predictive coding) to a merge list are signaled.

In one case, a merge list may be constructed in a manner similar to that for the non-TPM partition mode described above, which results in TPM motion candidates being generated.

In another case, parity may be used to select uni-prediction motion information of the two partitions. The two selected merge indices may be denoted idx0 and idx1. For each merge candidate, if its reference picture list X=(idx0 & idx1) is true, the partition's motion information is set to the merge candidate's list X information. Otherwise, the partition's motion information is set to the merge candidate's list Y (Y=1−X) information. This results in the final motion information with uni-prediction as the TPM candidates, and candidates in the first case being the regular merge candidates (which were generated using the merge list construction process described for non-TPM mode coded blocks).

2.2.3.1 Uni-Prediction Candidate List for TPM

Figure 14:
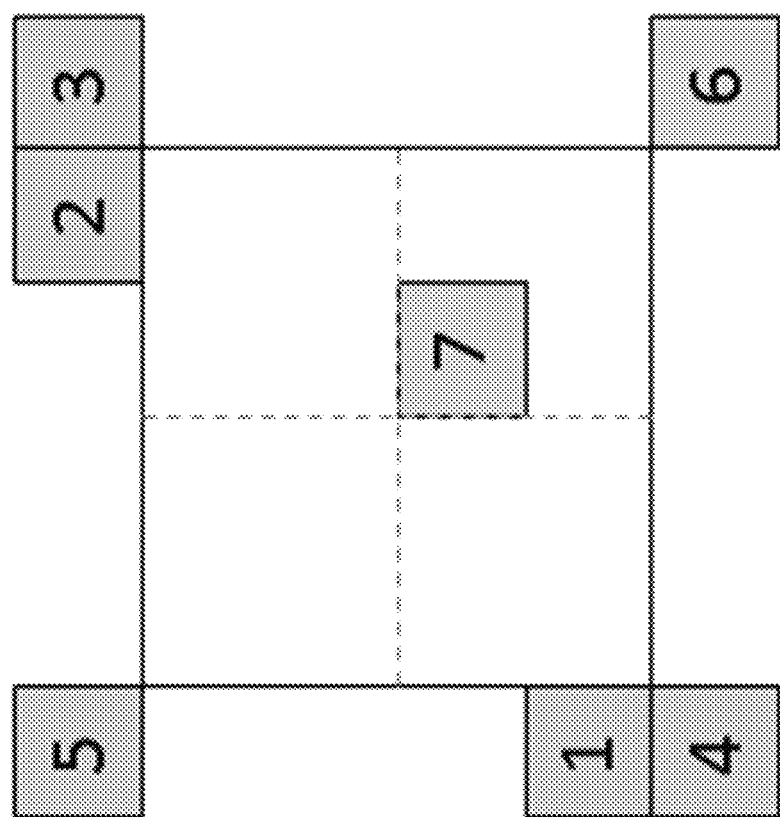
FIG. 14 shows an example of position of the neighboring blocks.

The uni-prediction candidate list, named TPM motion candidate list, consists of five uni-prediction motion vector candidates. It is derived from seven neighboring blocks of the CU including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
1) Obtain regular motion candidates from $A_1$, $B_1$, $B_0$, $A_0$, $B_2$, Col and Col2 (corresponding to block 1-7 in FIG. 14) without any pruning operations.
2) Set variable numCurrMergeCand=0

3) For each regular motion candidates derived from $A_1$, $B_1$, $B_0$, $A_0$, $B_2$, Col and Col2 and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.
Full pruning is applied.
4) For each motion candidates derived from $A_1$, $B_1$, $B_0$, $A_0$, $B_2$, Col and Col2 and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.
Full pruning is applied.
5) For each motion candidates derived from $A_1$, $B_1$, $B_0$, $A_0$, $B_2$, Col and Col2 and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.
Full pruning is applied.
6) For each motion candidates derived from $A_1$, $B_1$, $B_0$, $A_0$, $B_2$, Col and Col2 and numCurrMergeCand is less than 5, if the regular motion candidate is bi-prediction,
If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.
Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.
Full pruning is applied.
7) If numCurrMergeCand is less than 5, zero motion vector candidates are added.

2.2.3.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Figure 15B:
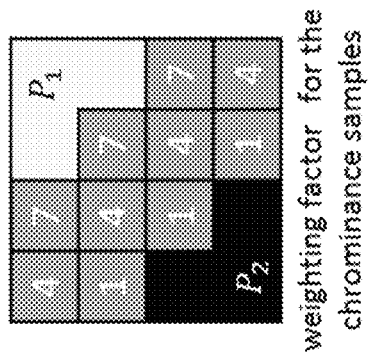
FIGS. 15A and 15B show examples of motion vector storage.
Figure 15A:
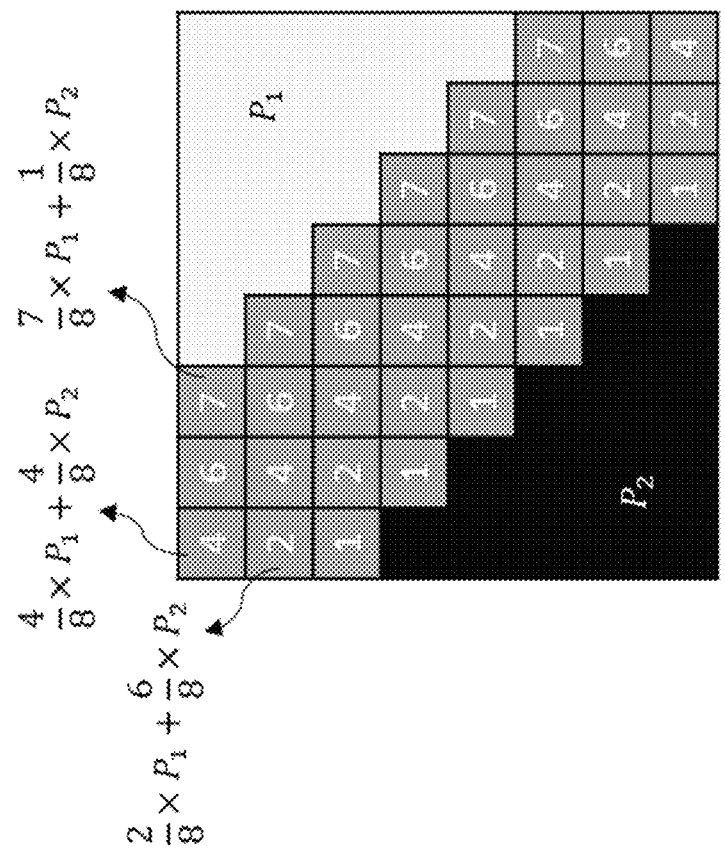

Weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the 1$^{st}$ weighting factor group is used. Examples are is shown in FIG. 15A-15B.

2.2.3.3 Motion Vector Storage

Figures 16A, 16B:
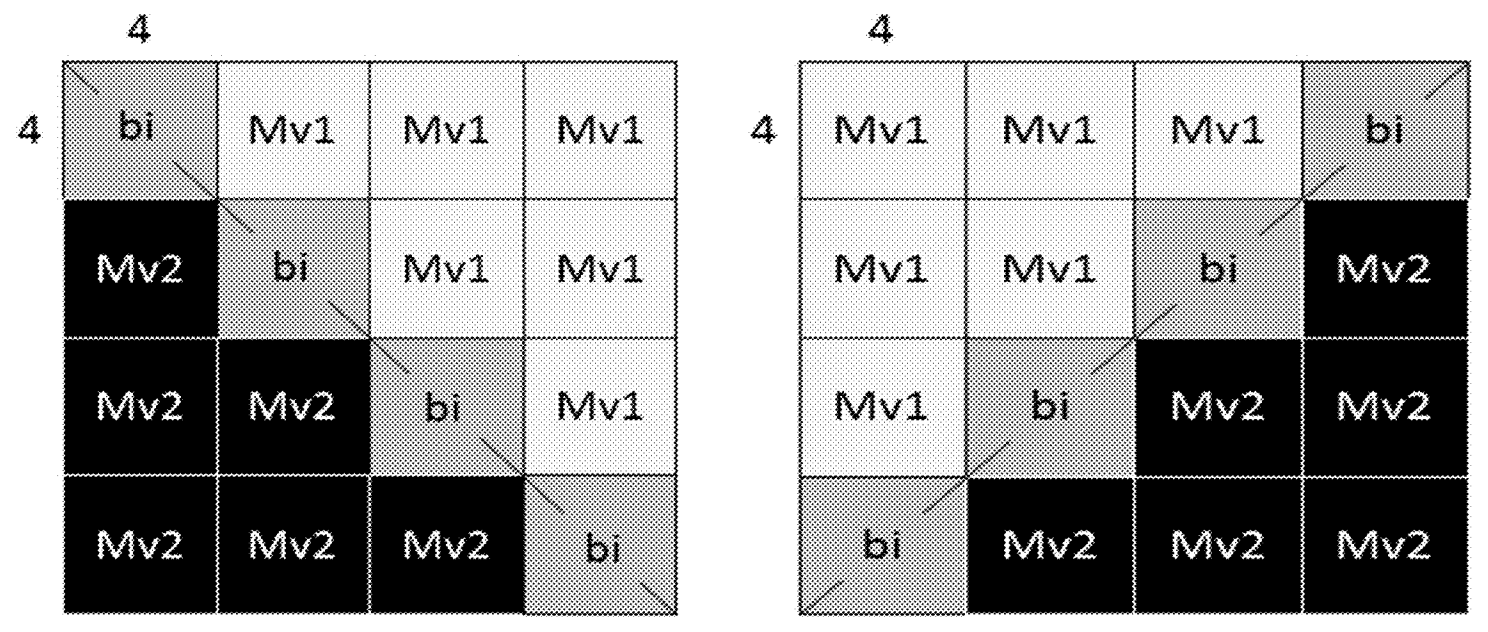

The motion vectors (Mv1 and Mv2 in FIGS. 16A and 16B) of the triangular prediction units are stored in 4×4 grids. For each 4×4 grid, either uni-prediction or bi-prediction motion vector is stored depending on the position of the 4×4 grid in the CU. As shown in FIGS. 16A-16B, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.
2) In the case that both Mv1 and Mv2 are from the same L0 (or L1) direction,
    If the reference picture of Mv2 is the same as a picture in the L1 (or L0) reference picture list, Mv2 is scaled to the picture. Mv1 and the scaled Mv2 are combined to form the bi-prediction motion vector.
    If the reference picture of Mv1 is the same as a picture in the L1 (or L0) reference picture list, Mv1 is scaled to the picture. The scaled Mv1 and Mv2 are combined to form the bi-prediction motion vector.
    Otherwise, only Mv1 is stored for the weighted area.

2.2.3.4 Signaling of Triangular Prediction Mode (TPM)

One bit flag to indicate whether TPM is used may be firstly signaled. Afterwards, the indications of two splitting patterns (as depicted in FIGS. 13A and 13B), and selected merge indices for each of the two partitions are further signaled.

2.2.3.4.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

Figure 17:
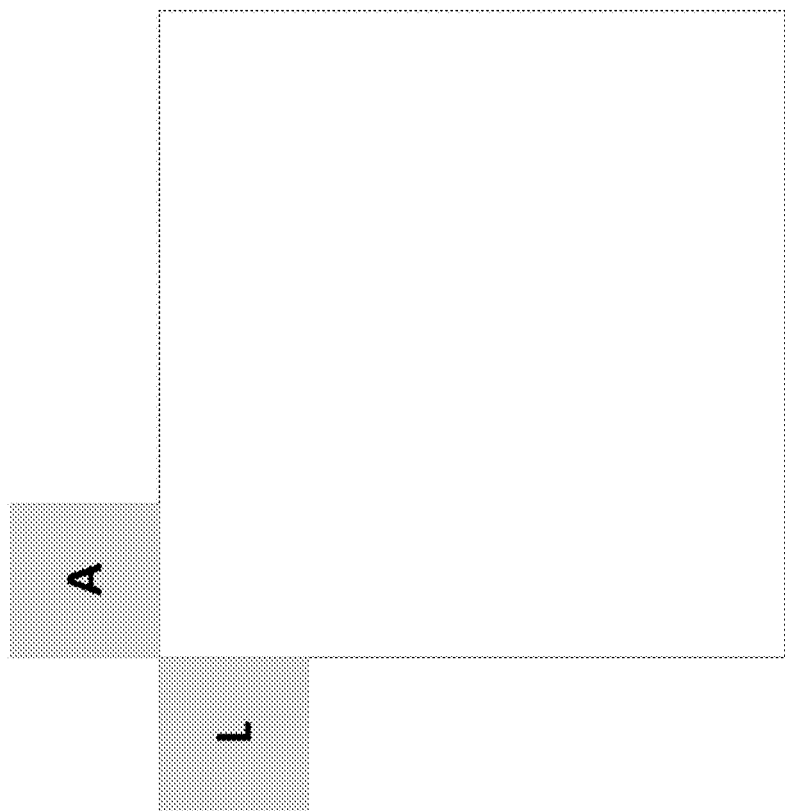
FIG. 17 shows examples of neighboring blocks (A and L) used for context selection in TPM flag coding.

The flag is coded with 3 contexts, based on the following equation (see FIG. 17)

Ctx index=((left block L available && L is coded with TPM?)1:0)+((Above block A available && A is coded with TPM?)1:0);

2.2.3.4.2 Signaling of an Indication of Two Splitting Patterns (as Depicted in FIGS. 13A-13B), and Selected Merge Indices for Each of the Two Partitions It is noted that splitting patterns, merge indices of two partitions are jointly coded. In an example, it is restricted that the two partitions couldn't use the same reference index. Therefore, there are 2 (splitting patterns)*N (maximum number of merge candidates)*(N−1) possibilities wherein N is set to 5. One indication is coded and the mapping between the splitting patterns, two merge indices and coded indication are derived from the array defined below:

```
const uint8_t
g_TriangleCombination[TRIANGLE_MAX_NUM_CANDS] [3] =
{
{ 0, 1, 0 }, { 1, 0, 1 }, { 1, 0, 2 }, { 0, 0, 1 }, { 0, 2, 0 },
{ 1, 0, 3 }, { 1, 0, 4 }, { 1, 1, 0 }, { 0, 3, 0 }, { 0, 4, 0 },
{ 0, 0, 2 }, { 0, 1, 2 }, { 1, 1, 2 }, { 0, 0, 4 }, { 0, 0, 3 },
{ 0, 1, 3 }, { 0, 1, 4 }, { 1, 1, 4 }, { 1, 1, 3 }, { 1, 2, 1 },
{ 1, 2, 0 }, { 0, 2, 1 }, { 0, 4, 3 }, { 1, 3, 0 }, { 1, 3, 2 },
{ 1, 3, 4 }, { 1, 4, 0 }, { 1, 3, 1 }, { 1, 2, 3 }, { 1, 4, 1 },
{ 0, 4, 1 }, { 0, 2, 3 }, { 1, 4, 2 }, { 0, 3, 2 }, { 1, 4, 3 },
{ 0, 3, 1 }, { 0, 2, 4 }, { 1, 2, 4 }, { 0, 4, 2 }, { 0, 3, 4 }};
``` splitting patterns (45 degree or 135 degree)=g_TriangleCombination[signaled indication][0];

Merge index of candidate A=g_TriangleCombination[signaled indication];

Merge index of candidate B=g_TriangleCombination[signaled indication];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
|---|---|---|---|
| L0 | L0 | A (L0) | B (L0) |
| L1 | L1 | B (L1) | A (L1) |
| L0 | L1 | A (L0) | B (L1) |
| L1 | L0 | B (L0) | A (L1) |

2.2.3.4.3 Entropy Coding of the Indication (Denoted by Merge_Triangle_Idx)

merge_triangle_idx is within the range [0, 39], inclusively. K-th order Exponential Golomb (EG) code is used for binarization of merge_triangle_idx wherein K is set to 1.

K-th Order EG

To encode larger numbers in fewer bits (at the expense of using more bits to encode smaller numbers), this can be generalized using a nonnegative integer parameter k. To encode a nonnegative integer x in an order-k exp-Golomb code:

1. Encode $\lfloor x/2^k \rfloor$ using order-0 exp-Golomb code described above, then
2. Encode x mod $2^k$ in binary

TABLE 2

Exp-Golomb-k coding examples

| x | k = 0 | k = 1 | k = 2 |
|---|---|---|---|
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |

TABLE 2-continued

Exp-Golomb-k coding examples

| x | k = 0 | k = 1 | k = 2 |
|---|---|---|---|
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.2.3.5 Recent Progress of TPM

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

Figure 18A:
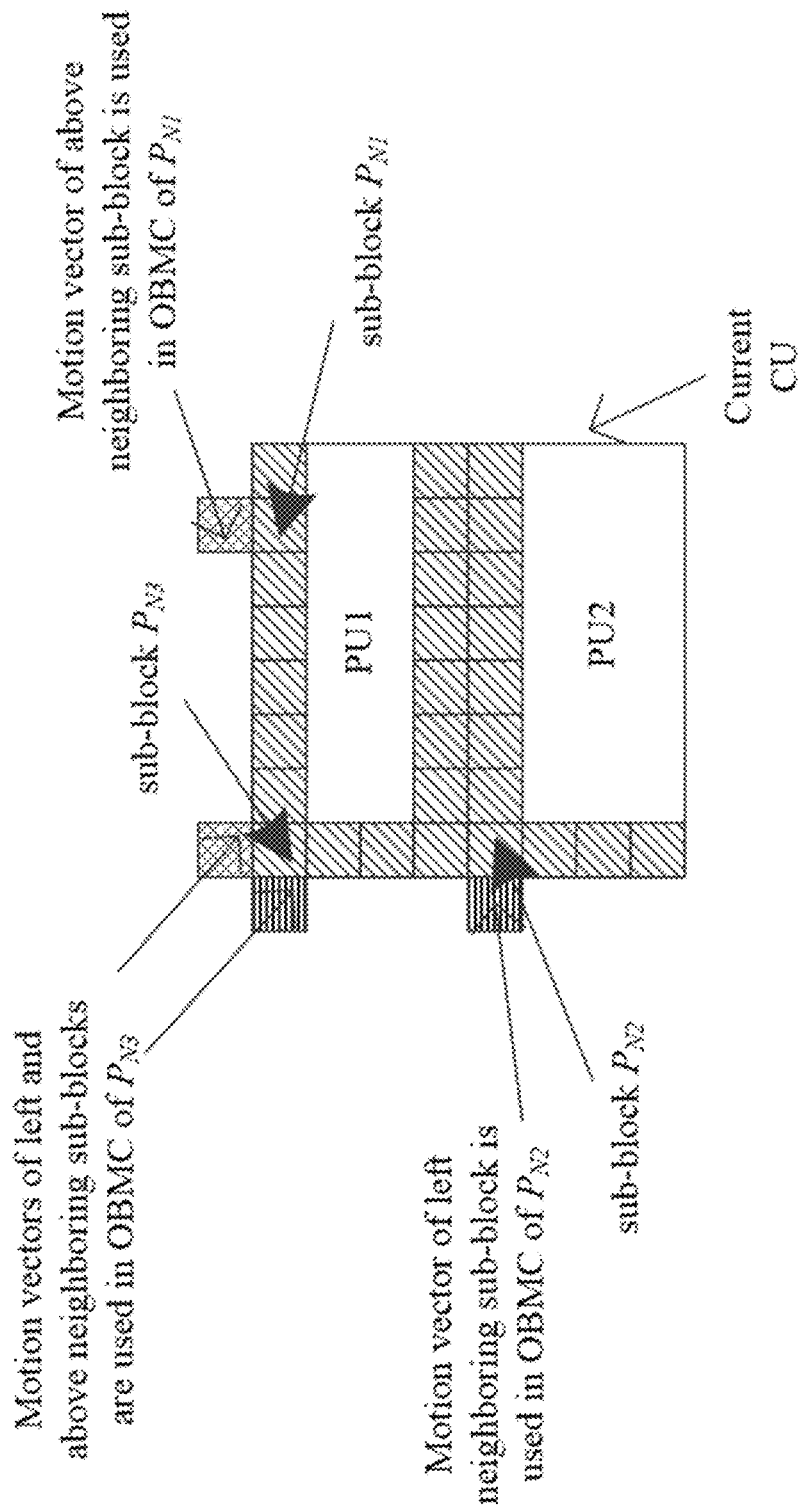
FIGS. 18A and 18B are example illustrations of sub-blocks where overlapped block motion compensation OBMC applies.
Figures 18B, 18C:
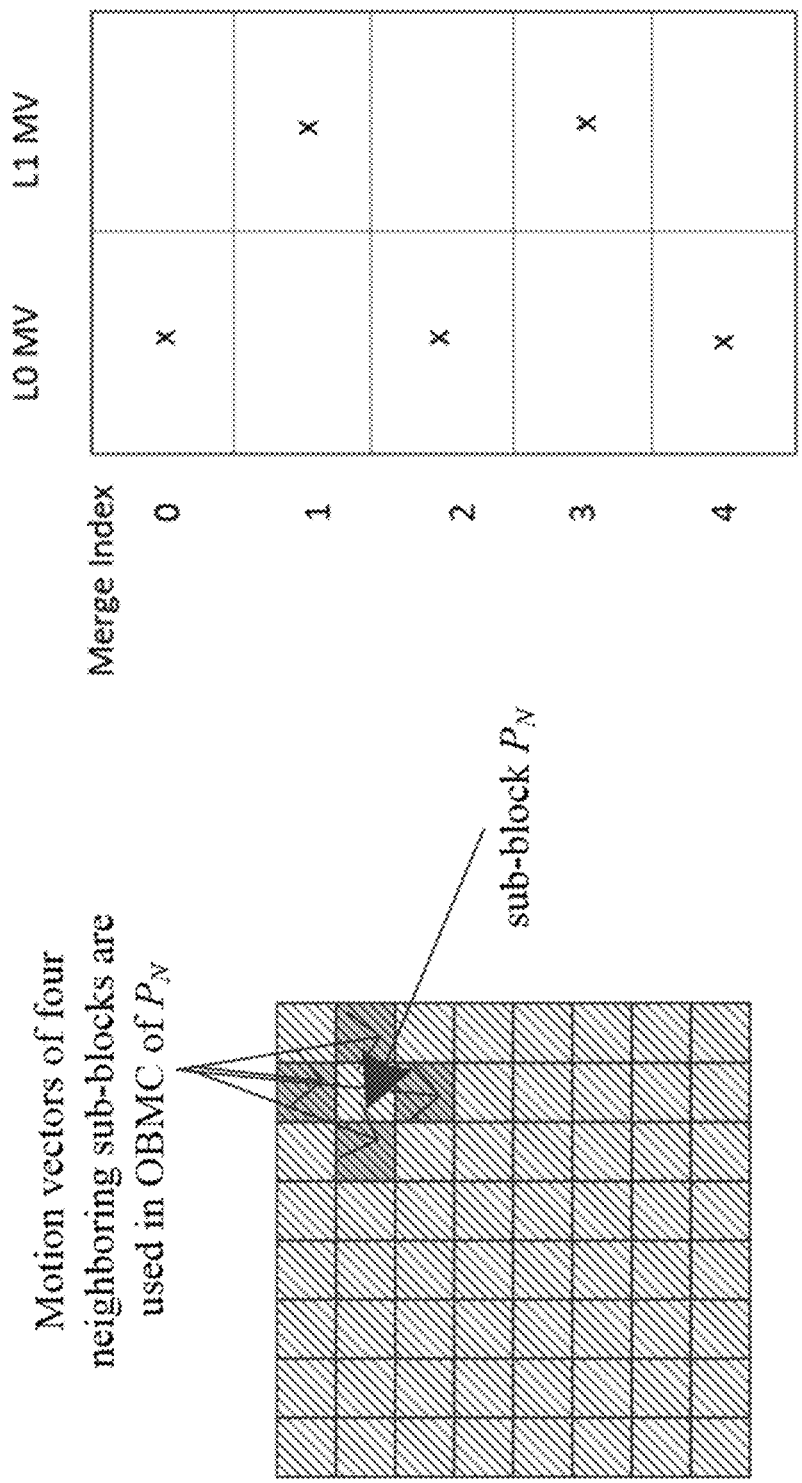
FIG. 18C shows an example of uni-prediction MV selection for triangle prediction mode.

Once the regular merge list is constructed, for each merge candidate in the regular merge candidate list, one and only one of its L0 or L1 motion vector is used for triangle prediction. In addition, the order of selecting the L0 vs. L1 motion vector is based on its merge index parity. More specifically, as shown in FIG. 18C, for a candidate with an even value index, its L0 motion vector is first chosen to be used for triangle prediction. If it is not available, its L1 motion vector would be used instead. For a candidate with an odd value index, its L1 motion vector is first chosen to be used for triangle prediction. If it is not available, its L0 motion vector would be used instead. In FIG. 18C, corresponding to each merge index, the motion vector marked with "x" is first selected for triangle prediction 7.3.7.7 Merge Data Syntax

|  | Descriptor |
|---|---|
| merge_data( x0, y0, cbWidth, cbHeight ) { |  |
|   if ( CuPredMode[ x0 ][ y0 ] = = MODE_IBC ) { |  |
|     if( MaxNumMergeCand > 1 ) |  |
|       merge_idx[ x0 ][ y0 ] | ae(v) |
|   } else { |  |
|     if( sps_mmvd_enabled_flag \|\| cbWidth * cbHeight != 32 ) |  |
|       regular_merge_flag[ x0 ][ y0 ] | ae(v) |
|     if ( regular_merge_flag[ x0 ][ y0 ] = = 1 ){ |  |
|       if( MaxNumMergeCand > 1 ) |  |
|         merge_idx[ x0 ][ y0 ] | ae(v) |
|     } else { |  |
|       if( sps_mmvd_enabled_flag && cbWidth * cbHeight != 32 ) |  |
|         mmvd_merge_flag[ x0 ][ y0 ] | ae(v) |
|       if( mmvd_merge_flag[ x0 ][ y0 ] = = 1 ) { |  |
|         if( MaxNumMergeCand > 1 ) |  |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { |  |
|         if( MaxNumSubblockMergeCand > 0 && cbWidth >= 8 && cbHeight >= 8 ) |  |
|           merge_subblock_flag[ x0 ][ y0 ] | ae(v) |
|         if( merge_subblock_flag[ x0 ][ y0 ] = = 1 ) { |  |
|           if( MaxNumSubblockMergeCand > 1 ) |  |
|             merge_subblock_idx[ x0 ][ y0 ] | ae(v) |
|         } else { |  |
|           if( sps_ciip_enabled_flag && cu_skip_flag[ x0 ][ y0 ] = = 0 && |  |
|             ( cbWidth * cbHeight ) >= 64 && cbWidth < 128 && cbHeight < 128 ) { |  |
|             ciip_flag[ x0 ][ y0 ] | ae(v) |
|           if( ciip_flag[ x0 ][ y0 ] && MaxNumMergeCand > 1 ) |  |
|             merge_idx[ x0 ][ y0 ] | ae(v) |
|           } |  |
|           if( MergeTriangleFlag[ x0 ][ y0 ] ) { |  |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } |  |
|         } |  |
|       } |  |
|     } |  |
|   } |  |
| } |  |

2.2.4 Overlapped Block Motion Compensation

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIGS. 18A-18B.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 19:
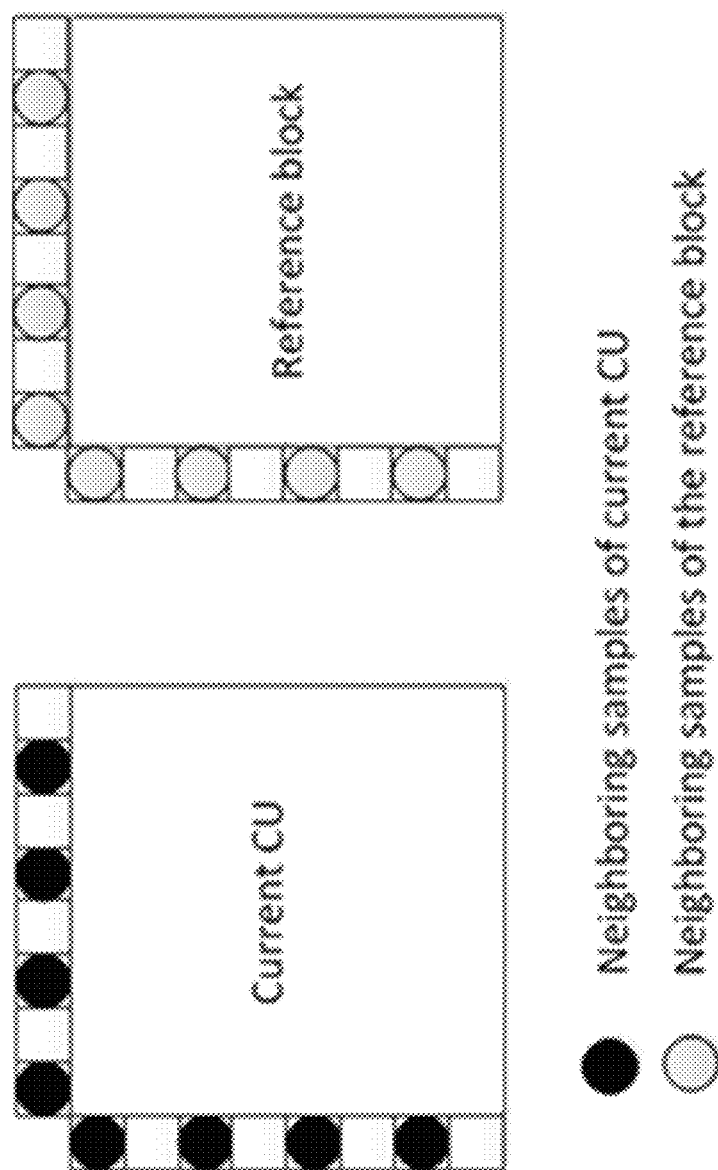
FIG. 19 shows examples of neighboring samples used for deriving IC parameters

When LIC applies for a CU, a least square error method is employed to derive the parameters a and b by using the neighbouring samples of the current CU and their corresponding reference samples. More specifically, as illustrated in FIG. 19, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6 Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIGS. 20A-20B, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1\text{-}a)$$

For 6-parameter affine, $$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (1\text{-}b)$$

Where $(v_{0x}, v_{0y})$ is motion vector of the top-left corner control point, and $(v_{1x}, v_{1y})$ is motion vector of the top-right corner control point and $(v_{2x}, v_{2y})$ is motion vector of the bottom-left corner control point, (x, y) represents the coordinate of a representative point relative to the top-left sample within current block. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip} 3\left(4, w, \dfrac{w \times MvPre}{\max(\text{abs}(v_{1x} - v_{0x}), \text{abs}(v_{1y} - v_{0y}))}\right) \\ N = \text{clip} 3\left(4, h, \dfrac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 20B:
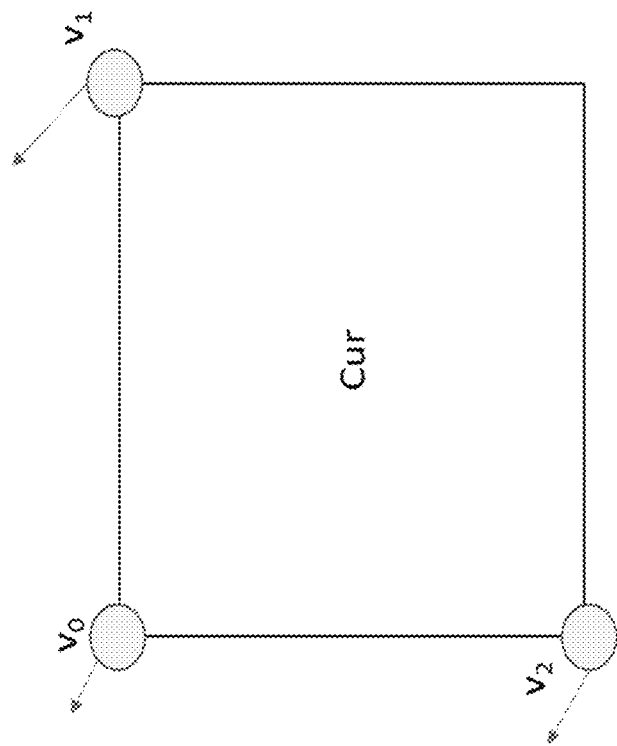
FIGS. 20A and 20B show simplified affine motion model 4-parameter affine and 6-parameter affine models.
Figure 20A:
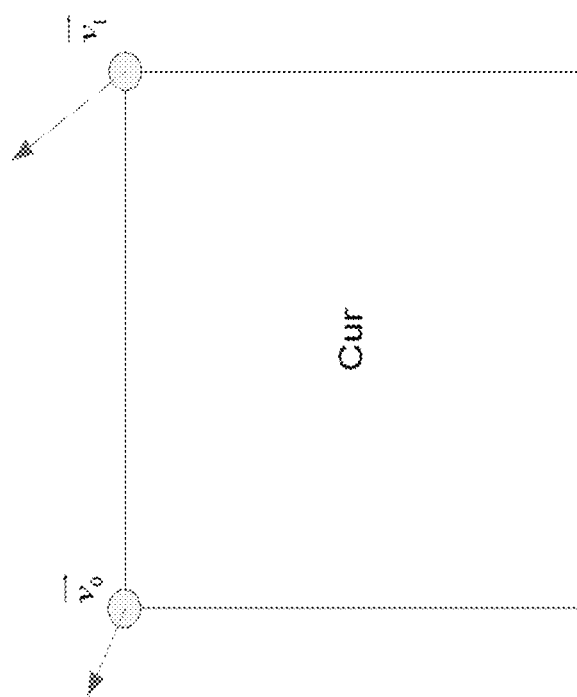

To derive motion vector of each M×N sub-block, the motion vector of the center sample of each sub-block, as shown in FIGS. 20A-20B, is calculated according to Equation 1, and rounded to 1/16 fraction accuracy. Then the motion compensation interpolation filters mentioned in Section 2.2.3 are applied to generate the prediction of each sub-block with derived motion vector.

Figure 21:
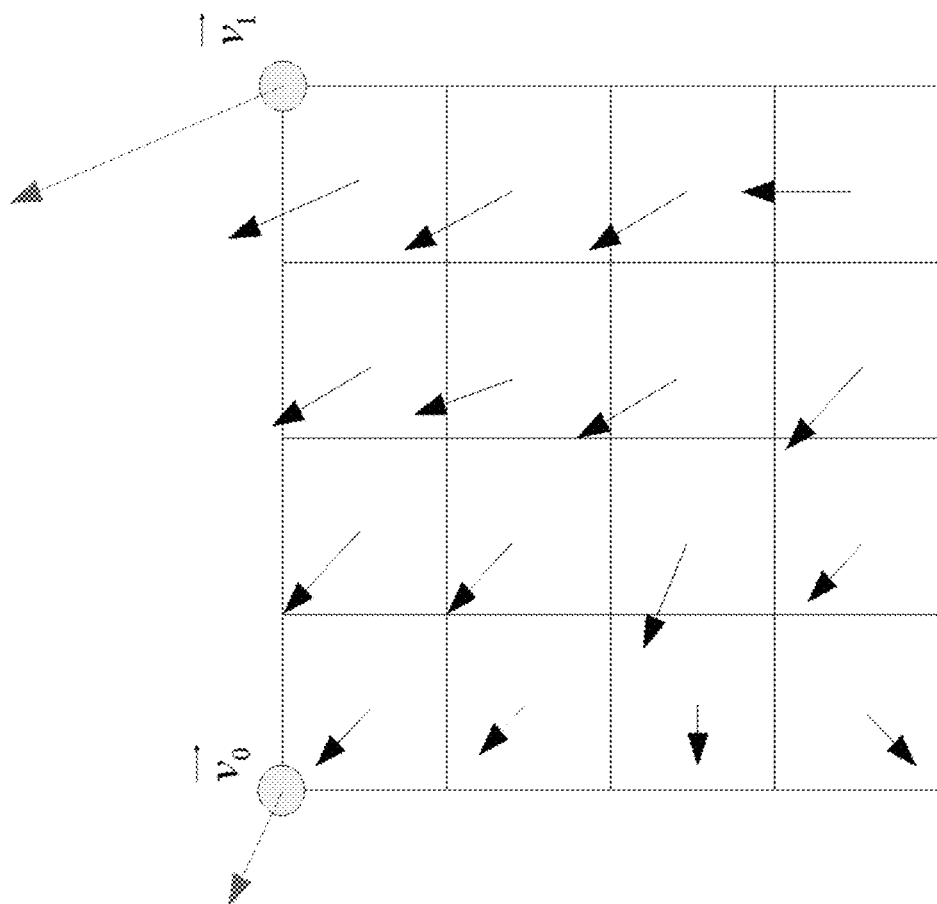
FIG. 21 shows an example of affine motion vector field MVF per sub-block.

FIG. 21 shows an example of affine motion vector field MVF per sub-block.

After MCP, the high accuracy motion vector of each sub-block is rounded and saved as the same accuracy as the normal motion vector.

2.2.6.1 AF_INTER Mode

Figure 22B:
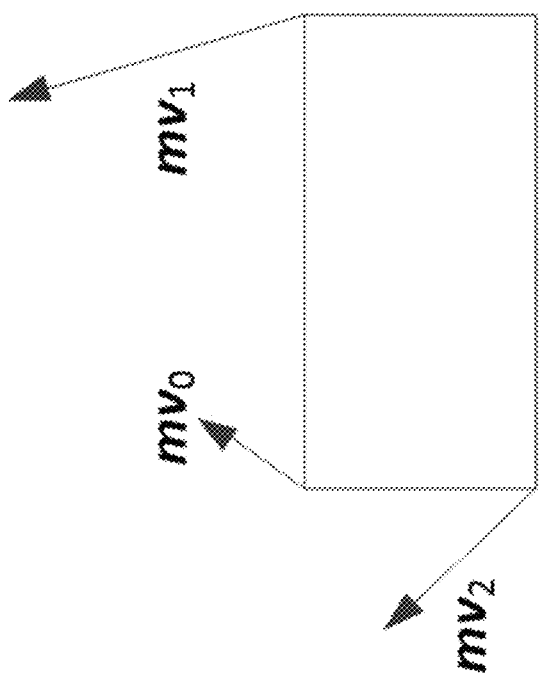
FIGS. 22A and 22B show examples of 4-parameter affine model and 6-parameter affine model.
Figure 22A:
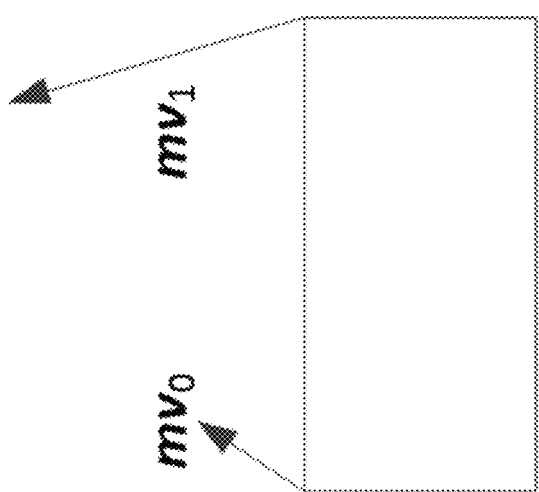

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown in FIGS. 22A-22B, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 23:
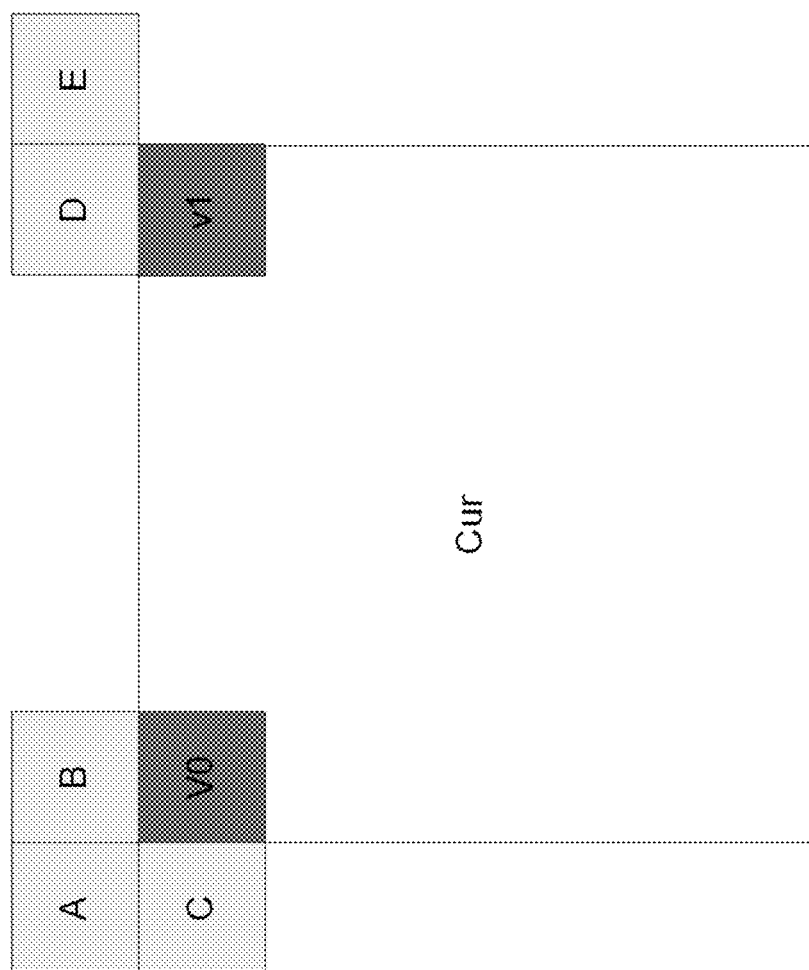
FIG. 23 shows an example of motion vector predictor MVP for AF_INTER.

FIG. 23 shows shows an example of motion vector predictor MVP for AF_INTER.

In AF_INTER mode, when 4/6 parameter affine mode is used, 2/3 control points are required, and therefore 2/3 MVD needs to be coded for these control points, as shown in FIGS. 22A-22B. In an existing implementation, it is proposed to derive the MV as follows, i.e., $mvd_1$ and $mvd_2$ are predicted from $mvd_0$.

$mv_0 = \overline{mv}_0 + mvd_0$ $mv_1 = \overline{mv}_1 + mvd_1 + mvd_0$ $mv_2 = \overline{mv}_2 + mvd_2 + mvd_0$ Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 22B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.6.2 AF_MERGE Mode

Figures 24A, 24B:
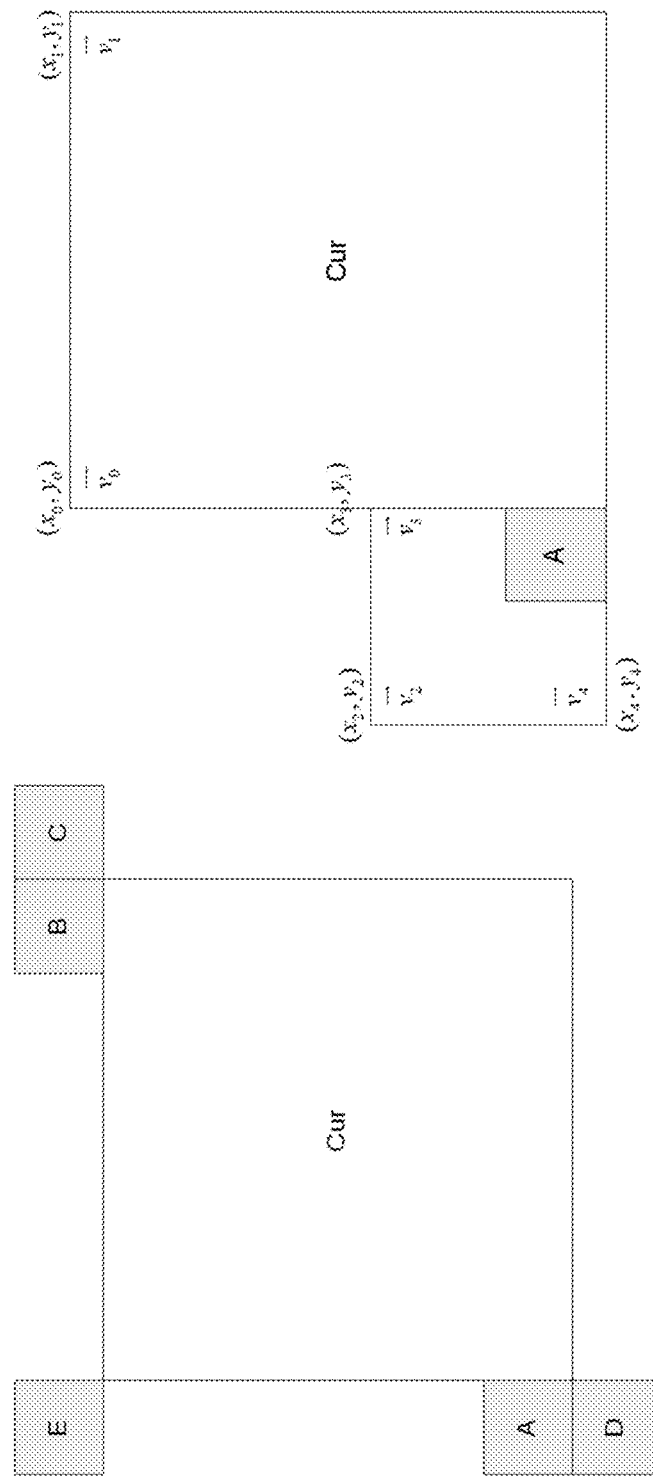
FIGS. 24A and 24B shows example candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 24A. If the neighbour left bottom block A is coded in affine mode as shown in FIG. 24B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

In some implementations, an affine merge candidate list is constructed with following steps:

Insert Inherited Affine Candidates

Inherited affine candidate means that the candidate is derived from the affine motion model of its valid neighbor affine coded block. In the common base, as shown in FIGS. 24A-24B, the scan order for the candidate positions is: A1, B1, B0, A0 and B2.

After a candidate is derived, full pruning process is performed to check whether same candidate has been inserted into the list. If a same candidate exists, the derived candidate is discarded.

Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIGS. 24A-24B. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

Figure 25:
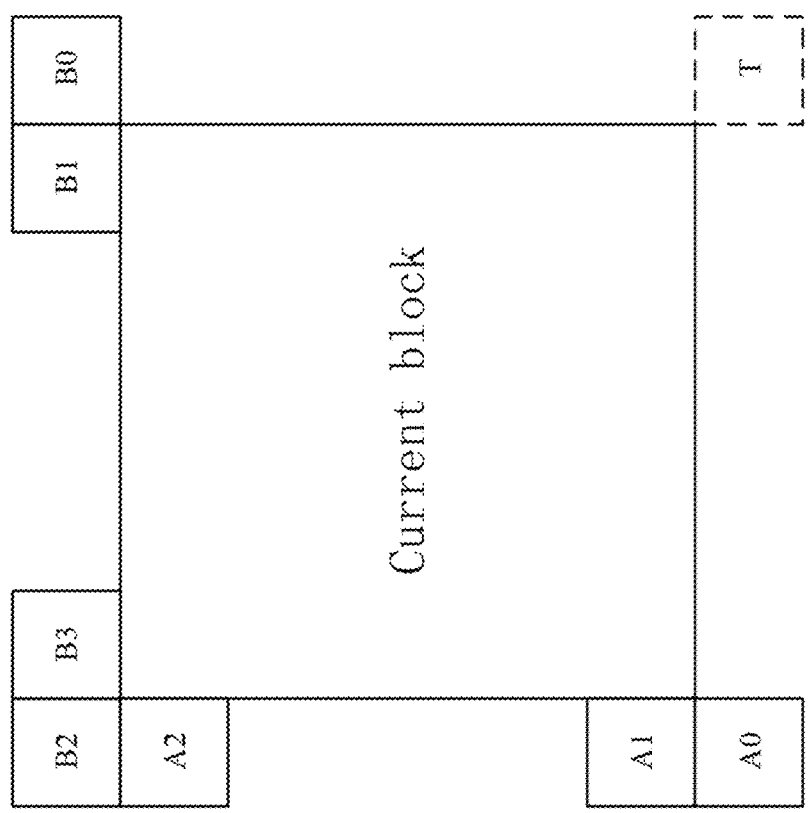
FIG. 25 shows an example of candidate positions for affine merge mode.

FIG. 25 shows an example of candidate positions for affine merge mode.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

Padding with Zero Motion Vectors

If the number of candidates in affine merge candidate list is less than 5, zero motion vectors with zero reference indices are insert into the candidate list, until the list is full.

2.2.7 Bi-Directional Optical Flow

Bi-directional Optical flow (BIO) is sample-wise motion refinement which is performed on top of block-wise motion compensation for bi-prediction. The sample-level motion refinement doesn't use signalling.

Figure 26:
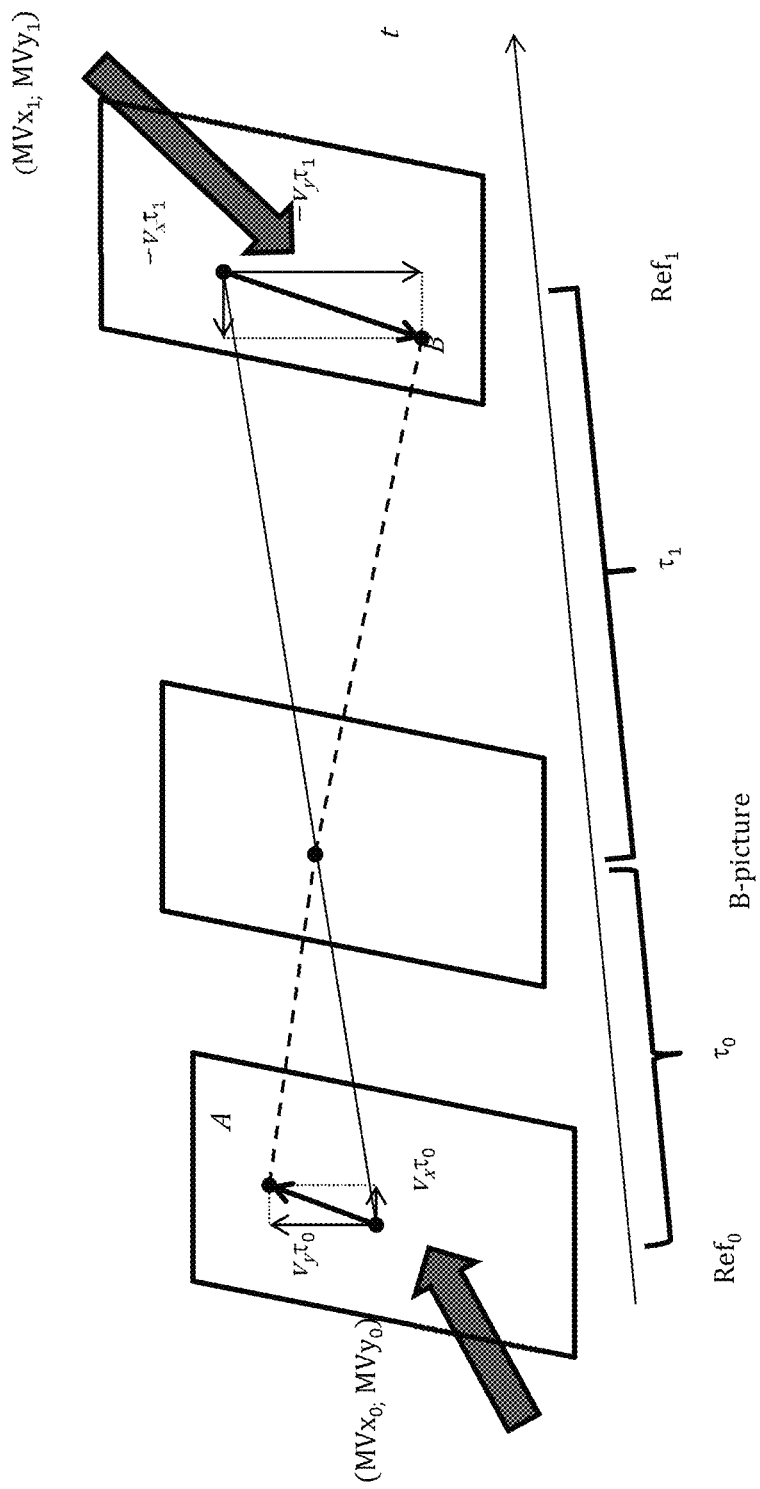
FIG. 26 shows an example of an optical flow trajectory.

FIG. 26 shows an example of an optical flow trajectory.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (3)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$pred_{BIO}=1/2\cdot(I^{(0)}+I^{(1)}+v_x/2\cdot(\tau_1 \partial I^{(1)}/\partial x - \tau_0 \partial I^{(0)}/\partial x)+v_y/2\cdot(\tau_1 \partial I^{(1)}/\partial y - \tau_0 \partial I^{(0)}/\partial y)). \quad (4)$$

Figure 28:
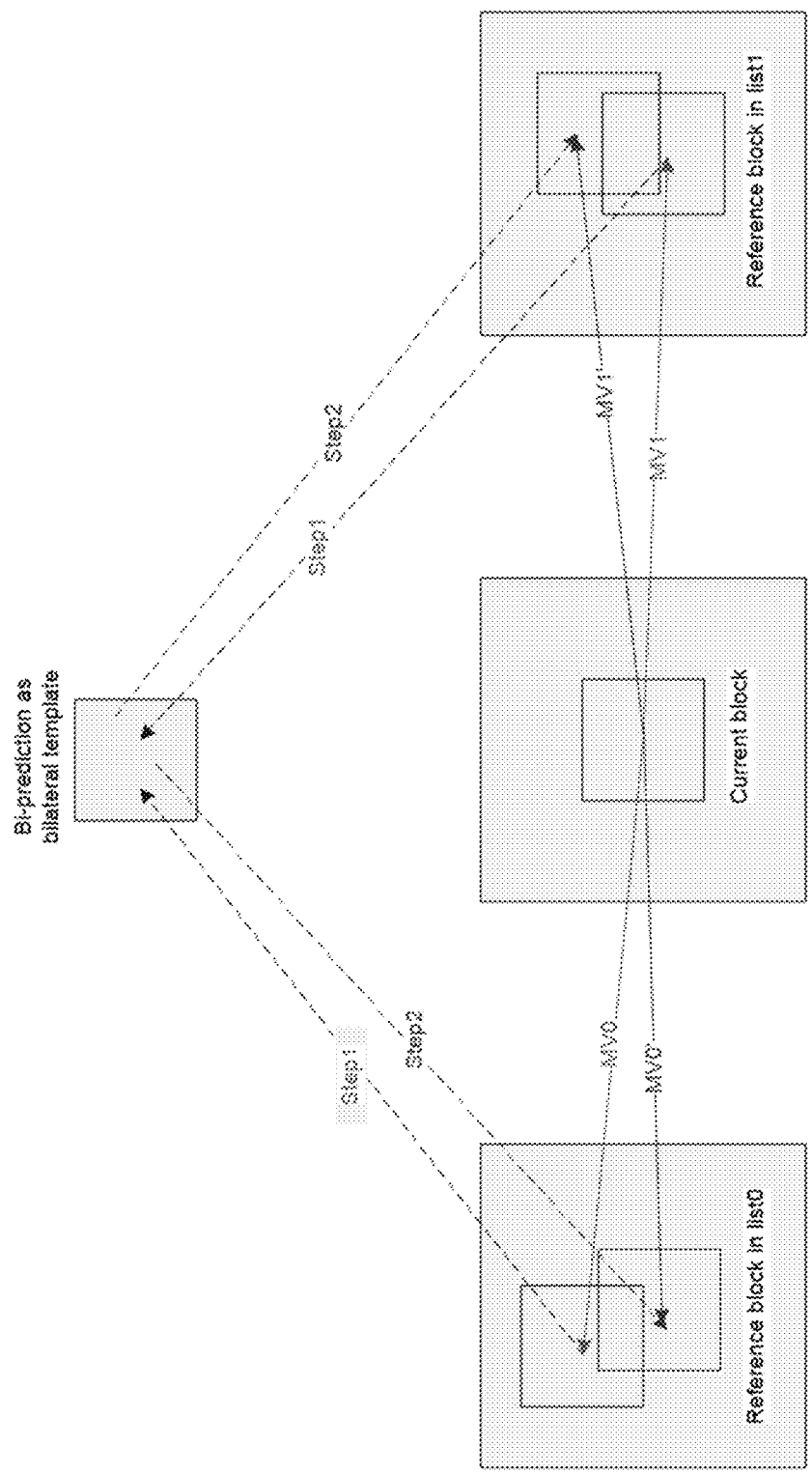
FIG. 28 shows an example of decoder-side motion vector refinement (DMVR) based on bilateral template matching.

Here, $\tau_0$ and $\tau_1$ denote the distances to the reference frames as shown on a FIG. 28. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0, MVy_0, MVx_1, MVy_1 \neq 0$) and the block motion vectors are proportional to the time distance ($MVx_0/MVx_1=MVy_0/MVy_1=-\tau_0/\tau_1$).

The motion vector field $(v_x, v_y)$ is determined by minimizing the difference $\Delta$ between values in points A and B (intersection of motion trajectory and reference frame planes on FIG. 26). Model uses only first linear term of a local Taylor expansion for $\Delta$:

$$\Delta=(I^{(0)}-I^{(1)}{}_0+v_x(\tau_1 \partial I^{(1)}/\partial x + \tau_0 \partial I^{(0)}/\partial x)+v_y(\tau_1 \partial I^{(1)}/\partial y + \tau_0 \partial I^{(0)}/\partial y)) \quad (5)$$

All values in Equation 5 depend on the sample location (i', j'), which was omitted from the notation so far. Assuming the motion is consistent in the local surrounding area, we minimize $\Delta$ inside the $(2M+1)\times(2M+1)$ square window $\Omega$ centered on the currently predicted point (i,j), where M is equal to 2:

$$(v_x, v_y) = \operatorname*{argmin}_{v_x, v_y} \sum_{[i',j']\in\Omega} \Delta^2[i', j'] \quad (6)$$

For this optimization problem, the JEM uses a simplified approach making first a minimization in the vertical direction and then in the horizontal direction. This results in $$v_x = (s_1 + r) > m ? \operatorname{clip3}\left(-thBIO, thBIO, -\frac{s_3}{(s_1+r)}\right) : 0 \quad (7)$$

$$v_y = (s_5 + r) > m ? \operatorname{clip3}\left(-thBIO, thBIO, -\frac{s_6 - v_x s_2/2}{(s_5+r)}\right) : 0 \quad (8)$$

where, $$s_1 = \sum_{[i',j']\in\Omega} (\tau_1 \partial I^{(1)}/\partial x + \tau_0 \partial I^{(0)}/\partial x)^2; \quad (9)$$

$$s_3 = \sum_{[i',j']\in\Omega} (I^{(1)} - I^{(0)})(\tau_1 \partial I^{(1)}/\partial x + \tau_0 \partial I^{(0)}/\partial x);$$

$$s_2 = \sum_{[i',j']\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j']\in\Omega} (\tau_1 \partial I^{(1)}/\partial y + \tau_0 \partial I^{(0)}/\partial y)^2;$$

$$s_6 = \sum_{[i',j']\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations 7 and 8.

$$r=500\cdot 4^{d-8} \quad (10)$$

$$m=700\cdot 4^{d-8} \quad (11)$$

Here d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 9, $(2M+1)\times(2M+1)$ square window $\Omega$ centered in currently predicted point on a boundary of predicted block needs to accesses positions outside of the block (as shown in FIG.

Figure 27B:
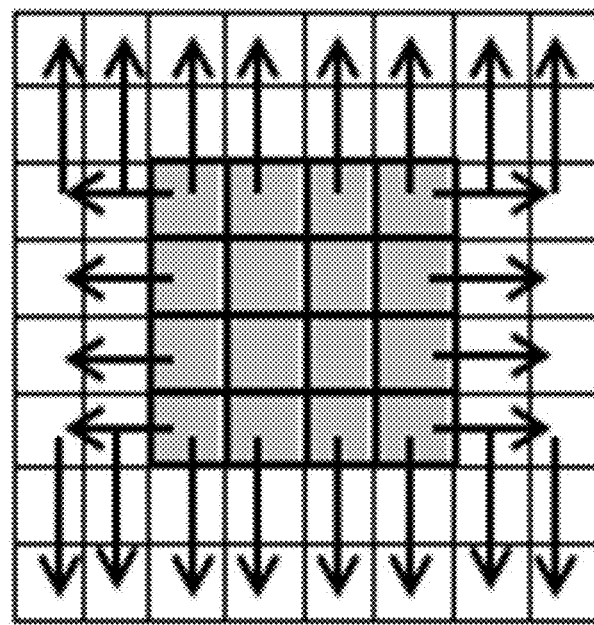
FIGS. 27A and 27B show examples of BIO w/o block extension: a) access positions outside of the block; b) padding is used in order to avoid extra memory access and calculation.
Figure 27A:
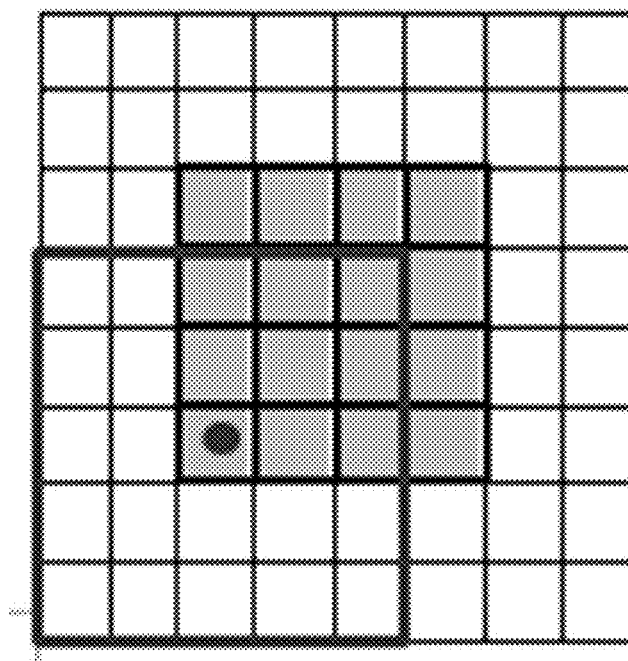

27A. In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 27B.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 9 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y)\in b_k} \sum_{[i',j]\in\Omega(x,y)} (\tau_1 \partial I^{(1)}/\partial x + \tau_0 \partial I^{(0)}/\partial x)^2; \quad (12)$$

$$s_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y)\in b_k} \sum_{[i',j]\in\Omega} (\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 7 and 8 are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times2^{14-d}$; otherwise, it is set to $12\times2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 3 shows the filters used for gradients calculation for different fractional positions of block motion vector in BIO. Table 4 shows the interpolation filters used for prediction signal generation in BIO.

TABLE 3

Filters for gradients calculation in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 4

Interpolation filters for prediction signal generation in BIO

| Fractional pel position | Interpolation filter for prediction signal(BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.8 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 28. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 28, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.2.9 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.2.9.1 Another Example of Affine Merge List Construction

In this contribution, the ATMVP merge candidate in the normal merge list is moved to the first position of the affine merge list. Such that all the merge candidates in the new list (i.e., sub-block based merge candidate list) are based on sub-block coding tools.

3. Examples of Problems Overcome by Embodiments

In the design of triangle partition, one block could be split to two partitions. To save memory bandwidth due to motion compensation, it is required that the two partitions shall be un-predicted. During the motion compensation process, bi-prediction is used for the diagonal edge and uni-prediction is used for all other remaining parts. If bi-prediction is allowed for each partition, then samples located at the diagonal edge will have four MVs with two of them from one partition and two of them from another partition. Such a design has the following problems:

1) The design of uni-prediction merge list is dependent on reference picture list, i.e., higher priority for MVs associated with reference pictures from reference picture list 0 is given. That is, TPM candidates derived from all uni-predict regular motion candidates are inserted before those derived from all bi-prediction regular motion candidates. However, typically, the position of spatial neighbouring block has stronger correlation in terms of similarity of my information.
2) Two partitions are allowed to select different TPM candidate indices, however, the same merge candidate list is utilized for both of them which is not optimal since the two partitions may have different correlations with the neighboring blocks of current block.
3) The maximum number of TPM candidates are fixed to be 5 which is not friendly at least for software design.
4) Weighting factor groups are pre-defined for all kinds of blocks.
5) Motion information is stored in 4×4 level which increases the memory requirement. How to compress them is a question to be studied.
6) The TPM motion information is dependent on the parity of two decoded merge indices. For a candidate with an even value index, its L0 motion vector is first chosen to be used for triangle prediction. If it is not available, its L1 motion vector would be used instead. For a candidate with an odd value index, its L1 motion vector is first chosen to be used for triangle prediction. If it is not available, its L0 motion vector would be used instead. Therefore, it is possible that two candidates are from the same reference picture lists.

4. Example Embodiments

The proposed methods could be applied to any of non-square/non-rectangular partitions, e.g., geometry partitions. In the following descriptions, we use 'triangular partition mode' to represent one as an example of the non-square/non-rectangular partition mode (TPM), and the motion vector prediction candidate inserted to TPM candidate list is named 'TPM candidates'. And the motion information associated with any previously coded blocks is named as 'regular motion candidate'. It should be noted other kinds of partitions may be also applicable.

The detailed list of techniques below should be considered as examples to explain general concepts. These techniques should not be interpreted in a narrow way. Furthermore, these techniques can be combined in any manner.

TPM Candidate List (AMVP/Merge/Others) Construction Process with Different Orders 1. Instead of always inserting TPM candidates derived from all uni-predict regular motion candidates before those derived from all bi-prediction regular motion candidates, it is proposed to use prediction direction as the priority criteria to decide which TPM candidates should be added firstly.
   a. In one example, all regular motion candidates with uni-prediction from List X are inserted to the candidate list as TPM candidates before those with uni-prediction from List Y.
   b. In one example, all TPM candidates derived from bi-prediction regular motion candidates (e.g., Truncated List0-predicted candidates, Truncated List1-predicted candidates) are given higher priority, that is, they could be inserted before those derived from uni-prediction regular motion candidates.
   c. In one example, the order is defined as: all TPM candidates derived from ListX of bi-prediction regular motion candidates (e.g., Truncated ListX-predicted candidates), all TPM candidates derived from ListY of bi-prediction regular motion candidates (e.g., Truncated ListY-predicted candidates), all TPM candidates derived from uni-prediction regular motion candidates (e.g., originally uni-predicted candidates).
   d. In one example, TPM candidates derived from one bi-prediction regular motion candidate may be added to the list before those derived from another bi-prediction regular motion candidate.
   e. In one example, TPM candidates derived from one bi-prediction regular motion candidate may be added in an interleaved way with those derived from another bi-prediction regular motion candidate.
      i. When there are two regular motion candidates $C_A$ and $C_B$, and four TPM candidates, including Truncated List0/1-predicted candidates derived from $C_A$ and $C_B$, respectively. The adding order to the list may be defined as: Truncated List0-predicted candidates derived from $C_A$, Truncated List1-predicted candidates derived from $C_B$, Truncated List1-predicted candidates derived from $C_A$, Truncated List0-predicted candidates derived from $C_B$.
ii. Alternatively, when there are two regular motion candidates $C_A$ and $C_B$, and four TPM candidates, including Truncated List0/1-predicted candidates derived from $C_A$ and $C_B$, respectively. The adding order to the list may be defined as: Truncated List1-predicted candidates derived from $C_A$, Truncated List0-predicted candidates derived from $C_B$, Truncated List0-predicted candidates derived from $C_A$, Truncated List1-predicted candidates derived from $C_B$.

2. Instead of always inserting TPM candidates derived from all uni-predict regular motion candidates before those derived from all bi-prediction regular motion candidates, it is proposed to use coded mode information associated with regular motion candidates as the priority criteria to decide which TPM candidates should be added firstly.
   a. Coded information may include AMVP or merge mode.
      i. In one example, if one regular motion candidate $C_A$ is derived from block A, and another one $C_B$ is derived from block B, and block A is coded with AMVP mode, and B is coded with merge mode, TPM candidates derived from $C_A$ may be added to the list before those derived from $C_B$. Alternatively, TPM candidates derived from $C_B$ may be added to the list before those derived from $C_A$.
   b. Coded information may include reference indices and/or POC differences.
      i. In one example, if one TPM candidate $C'_A$ is associated with a smaller reference index compared to another TPM candidate $C'_B$, $C'_A$ may be added to the list before $C'_B$.
      ii. In one example, if one TPM candidate $C'_A$ is associated with a smaller POC distance between the reference picture and current picture compared to another TPM candidate $C'_B$, $C'_A$ may be added to the list before $C'_B$.
   c. Coded information may include picture/slice/tile group quantization parameter (QP) of a reference picture, and/or temporal layer index of a reference picture.
      i. In one example, if one TPM candidate $C'_A$ is associated with a reference picture with a smaller QP compared to another TPM $C'_B$, $C'_A$ may be added to the list before $C'_B$.

3. Instead of always inserting TPM candidates derived from all uni-predict regular motion candidates before those derived from all bi-prediction regular motion candidates, it is proposed to use the positions where motion candidates are derived from as the priority criteria to decide which TPM candidates should be added firstly.
   a. In one example, if one regular motion candidate $C_A$ is derived from block A, and another one $C_B$ is derived from block B and B is checked after A, then those TPM motion candidates derived from $C_A$ (e.g., directly inherited if $C_A$ is uni-prediction or two TPM candidates with each one copied from one prediction direction associated with $C_A$) may be added to the list before those derived from $C_B$.
   b. Alternatively, furthermore, both positions and reference picture lists (or prediction directions) may be used as the priority criteria. For example, if one regular motion candidate $C_A$ is derived from block A, and another one $C_B$ is derived from block B and B is checked after A, then those TPM motion candidates derived from $C_A$ for List X may be added to the list before those derived from $C_B$ for List X. Those TPM motion candidates derived from $C_A$ for List Y may be added to the list before those derived from $C_B$ for List Y. X is equal to 0 or 1 and Y is equal to (1−X).

4. It is proposed to add all Truncated List1-predicted candidates before Truncated List0-predicted candidates.
   a. Alternatively, the order of Truncated List0-predicted candidates and Truncated List1-predicted candidates may be adaptively changed, e.g., based on available TPM motion candidates.
      i. In one example, if the first TPM motion candidate is an originally un-predicted candidate with uni-prediction from List 1, Truncated List1-predicted candidates may be added before Truncated List0-predicted candidates.
      ii. Alternatively, if originally uni-predicted candidates are more from List 1, Truncated List1-predicted candidates may be added before Truncated List0-predicted candidates.
   b. Alternatively, all TPM candidates derived from one bi-predictive motion candidate (e.g., one Truncated List0-predicted candidate and one Truncated List0-predicted candidate) may be added to the list before all TPM candidates derived from another bi-predictive motion candidate.
      i. Alternatively, furthermore, for those TPM candidates derived from one motion candidate, the order of adding them may further depend on the information of available TPM motion candidates in the list, e.g., with 4.a.

TPM Candidate List (AMVP/Merge/Others) Construction Process with More TPM Candidates 5. Multiple Averaged uni-prediction from List 0 and List 1 motion candidates derived from one regular motion candidate may be both added to the TPM motion candidate list.
   a. Alternatively, only one of them may be added and which one to be added is dependent on the information of available TPM candidates in the list, e.g., with 4.a.
   b. Alternatively, only one of them may be added and which one to be added is dependent on the reference picture indices of two prediction lists. The motion vector associated with smaller reference picture index will be kept and final prediction direction is associated with such a reference picture.
   c. Alternatively, only one of them may be added and which one to be added is dependent on the POC distance between reference picture and current picture for the two prediction lists. The motion vector associated with smaller POC distance will be kept and final prediction direction is associated with such a reference picture.
   d. In one example, all averaged uni-prediction from List 0 motion candidates may be inserted before all averaged uni-prediction from List 1 motion candidates. Alternatively, all averaged uni-prediction from List 1 motion candidates may be inserted before all averaged uni-prediction from List 0 motion candidates.

6. It is proposed that uni-predict regular motion candidates may be used to derive averaged uni-prediction TPM candidates.

a. Uni-predict regular motion candidates from list LX may be used to generate averaged uni-prediction candidates for list LX, e.g., with bi-predict regular motion candidates or with other uni-predict regular motion candidates from List X.

b. Uni-predict regular motion candidates from list LX may be first scaled to LY (Y=1−X) and the scaled motion vectors may be used to generate averaged uni-prediction candidates for list LY, e.g., with bi-predict regular motion candidates or with other uni-predict regular motion candidates from List X.

7. Virtual TPM motion candidates derived from available TPM motion candidates may be also added to the TPM candidate list.

a. In one example, after a certain step (e.g., after generating Truncated List1-predicted candidate), virtual candidates may be derived from those which have been added to the merge list.

b. In one example, virtual candidates may be only derived from originally un-predicted candidates.

c. In one example, virtual candidates may be only derived from originally un-predicted candidates and Truncated List1-predicted candidate.

d. In one example, virtual candidates may be only derived from candidates with a certain reference picture index (i.e., equal to 0), and/or with a certain range of POC distance between the reference picture and current picture or from one reference picture list.

e. In one example, virtual candidates may be only derived from the first K TPM motion candidates, e.g., K is set to 1.
      i. For example, the MVs of two TPM motion candidates can be averaged to get the virtual candidate.

f. For a TPM motion candidate with its motion vector denoted by $C_{mv}$ and reference index denoted by $C_{refidx}$, a virtual may be derived using the following methods:
      i. Adding an offset to either horizontal or vertical component of $C_{mv}$, and use the same $C_{refidx}$.
      ii. Adding offsets to both horizontal and vertical component of $C_{mv}$, and use the same $C_{refidx}$.
      iii. Scale Cmv to another reference picture which is not pointed by $C_{refidx}$. Using the scaled motion vector and the index of the reference picture where Cmv is scaled to as a new TPM motion candidate.

g. Pruning may not be applied when adding a virtual TPM candidate.
      i. Alternatively, pruning may be applied to candidates excluding those the virtual TPM candidates are generated from.

TPM Candidate List (AMVP/Merge/Others) Construction Process with Adaptive Inserting Orders 8. The inserting order (priority criteria) of TPM candidates may be changed from sequence to sequence, picture to picture, slice to slice, tile groups to tile groups, block to block, etc. al.

a. In one example, it may depend on block size/block shape/splitting patterns.

b. Alternatively, the order can be signaled from the encoder to the decoder in VPS/SPS/PPS/slice header/tile group header/tile/CTU/CU.

Multiple TPM Lists for Partitions in a TPM Coded Block

Figure 29:
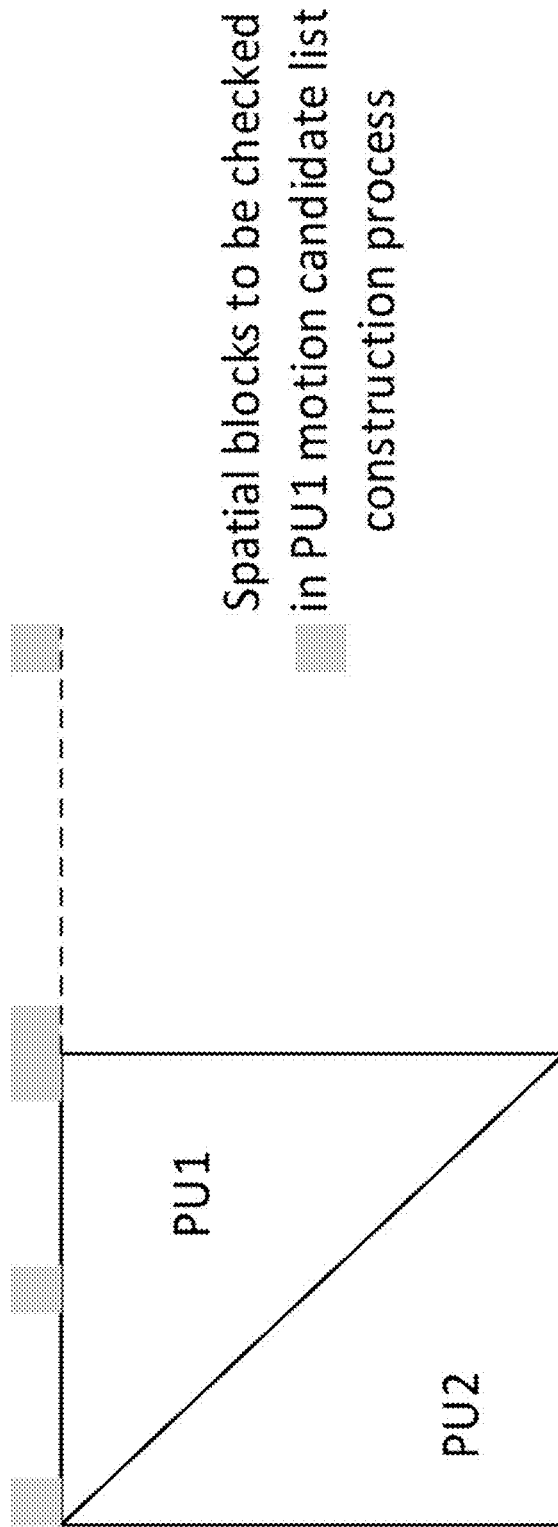
FIG. 29 shows examples of blocks used for different partition's motion candidate list construction processes.

9. For each geometry partition, one separate motion candidate list may be constructed instead of using one list for all partitions.

a. In one example, for one partition, its associated candidate list only contains motion candidates predicted from List X, and for the other partition, its associated candidate list only contains motion candidates predicted from List Y wherein Y is unequal to X.

b. In one example, different spatial and/or temporal blocks may be accessed to derive motion candidates to be added to the merge lists.

c. In one example, the location of spatial and/or temporal blocks for one geometry partition may be dependent on the position of the partition.

d. In one example, the location of spatial and/or temporal blocks for one geometry partition may be dependent on the splitting way (top-left to bottom-right (45 degree) or top-right to bottom-left (135 degree)).

e. In one example, for the 135 degree splitting pattern (as depicted in FIGS. 13A-13B), more above blocks may be checked for constructing the merge list of PU1. Some examples of above blocks (marked with grey color) are depicted in FIG. 29.

f. In one example, for the 135 degree splitting pattern (as depicted in FIGS. 13A-13B), more left blocks may be checked for constructing the merge list of PU2. Some examples of left blocks (marked with grey color) are depicted in FIG. 29.

g. In one example, for the 45 degree splitting pattern (as depicted in FIGS. 13A-13B), more left blocks and above blocks may be checked for constructing the merge list of PU1. Some examples of left and above blocks (marked with grey color) are depicted in FIG. 29.

h. In one example, for the 45 degree splitting pattern (as depicted in FIGS. 13A-13B), more temporal blocks may be checked for constructing the merge list of PU2.

i. In one example, an index of TPM list is signaled for each partition.

10. Multiple TPM lists may be constructed and shared for all partitions, and each partition could select one of them (e.g., each partition could select the same TPM list from the multiple TPM lists).

a. In one example, a index of TPM list may be firstly signaled. Then indices of TPM candidates may be further signaled.

b. In another example, the index of TPM list and indices of TPM candidates may be jointly coded.

Signaling of Maximum Allowed TPM Candidates

11. The maximumly allowed TPM candidates for merge/AMVP is signaled in SPS/VPS/PPS/picture header/slice header/tile group header/LCU row/group of LCUs.

a. Alternatively, the maximumly allowed TPM motion candidates is set to that used for non-TPM coded blocks, e.g., non-TPM merge candidate list size, or sub-block merge candidate list size.

b. The maximum number is binarized with unary coding or truncated unary coding when being signaled.

c. Instead of signaling the maximum number directly, (M—maximum number) may be signalled, e.g., M=5 or 6.

d. One bit flag may be signaled to indicate whether the maximum number of TPM candidates is the same as that for regular motion candidates/sub-block motion candidates.

Weighting Factor Groups

12. Selection of weighting factor group may be dependent on width and/or height of the current block.
    a. In one example, if the ratio between width and height is larger than a threshold, a specific weighting factor group (e.g., group 1) may be selected.
    b. In one example, if the ratio between height and width is larger than a threshold, a specific weighting factor group (e.g., group 1) may be selected.
    c. Multiple sets of weighting factor groups may be pre-defined, for different block width and/or height, one weighting factor group may be selected from one or two of them.
13. Weighting factors may be changed on-the-fly based on the sample's location.
    a. In one example, it may be dependent on the angle of the edge distinguish the two partitions.
    b. In one example, the weighting factors may be defined as a function of the sample's location.
    c. In one example, the final prediction block of one TPM coded block is set to $(f(x, y)*P1(x,y)+(2^{M}-f(x,y))*P2(x,y)+\text{offset})>>M$ wherein P1, P2 are two prediction values for sample located at (x, y), M is an integer value, offset may be set to $(1<<(M-1))$, $f(x, y)$ is a function which returns the weights applied to the first prediction value.
14. For the blocks located at the weighted area, the motion compensation is performed in 8×8 level instead of 4×4 level to reduce memory bandwidth.
    a. Alternatively, for the blocks located at the weighted area, the motion compensation is performed in 8×4 or 4×8 level instead of 4×4 level to reduce memory bandwidth.
    b. Alternatively, if 8×4 or 4×8 based motion compensation is allowed, the selection of 8×4 or 4×8 may depend on
        i. The block width and/or height
        ii. The splitting pattern (e.g., 45 degree or 135 degree).

Storage of Motion Information

15. After decoding a TPM coded block, one or multiple HMVP tables may be updated.
    a. In one example, one or multiple HMVP tables may be updated according to one partition's motion information excluding other partition's motion information.
    b. In one example, one or multiple HMVP tables may be updated according to the stored motion information for the weighted area excluding the non-weighted area/or the non-weighted area excluding the weighted area.
    c. In one example, one or multiple HMVP tables may be updated according to one merge candidate in the merge candidate list which is used for derivation of TPM coded blocks' motion information.
        i. In one example, the one merge candidate is associated with a merge index of the decoded merge index (e.g., merge_triangle_idx0 or merge_triangle_idx1).
        ii. In one example, the one merge candidate is associated with a merge index equal to k (e.g., k=0).
16. The derivation process of triangular motion information for one partition may depend on the decoded motion information from another partition, e.g., according to the prediction direction of the other partition.
    d. In one example, suppose a first reference picture list denoted as LX of one decoded candidate with index equal to merge_triangle_idx0 is chosen (e.g., according to parity of merge_triangle_idx0 and availability of LX). Regardless the parity of the second decoded candidate index, the motion information associated with a second reference picture list denoted as LY (Y=1−X) of the second candidate, is chosen as the motion information for a triangular partition if it is available. In the following discussion, the motion information associated with a reference picture list LX or LY may also be referred as LX motion information or LY motion information.
        i. Alternatively, furthermore, if LY (Y=1−X) motion information of the second candidate with merge_triangle_idx1 is unavailable, LX motion information of the second candidate may be used instead.
        ii. Alternatively, furthermore, if LY (Y=1−X) motion information of the second candidate with merge_triangle_idx1 is unavailable, LX motion information of the second candidate may be used to derive motion information for LY. And the derived LY motion information may be used for TPM coding.
            1) In one example, the derivation process may comprise a scaling of a motion vector referring to a reference picture in LX to a reference picture in LY.
    e. In one example, suppose a first reference picture list denoted as LX of one decoded candidate with index equal to merge_triangle_idx1 is chosen (e.g., according to parity of merge_triangle_idx1 and availability of LX). Regardless the parity of the second decoded candidate index, LY (Y=1−X) motion information, is chosen as the motion information for a triangular partition if it is available.
        i. Alternatively, furthermore, if LY (Y=1−X) motion information of the candidate with merge_triangle_idx0 is unavailable, LX motion information may be used instead.
        ii. Alternatively, furthermore, if LY (Y=1−X) motion information of the candidate with merge_triangle_idx0 is unavailable, LX motion information of the candidate with merge_triangle_idx0 may be used to derive motion information for LY. And the derived LY motion information may be used for TPM coding.
            1) In one example, the derivation process may comprise a scaling of a motion vector referring to a reference picture in LX to a reference picture in LY.
17. It is disallowed to use motion information from the same reference picture list for multiple triangular partitions.
    f. In one example, a conformance bitstream shall satisfy that the two triangular partitions are predicted from different reference picture lists.
    g. Alternatively, the derivation process of motion information from the parity of merge index may always output that the two partitions are predicted from two different lists, e.g., using methods disclosed in bullet 15.
18. How to store the motion information and/or how to derive the motion information to be stored for weighted area and/or non-weighted area may depend on the splitting direction and/or decoded merge indices for the triangular partitions and/or merge candidate lists utilized for derivation of motion information for triangular partitions and/or reference pictures in the reference picture lists (e.g., all reference pictures have smaller or no greater POC values compared to current picture).
a. In one example, the motion information of the merge candidate associated with the selected decoded merge index for one partition may be stored.
   i. In one example, the selected decoded merge index may be set to one of decoded merge candidate index, e.g., merge_triangle_idx0 or merge_triangle_idx1.
   ii. In one example, the selected decoded merge index is set to a variable k.
      1) In one example, k is set to 0.
      2) In one example, all information of the k-th merge candidate may be inherited and stored.
      3) In one example, partial information of the k-th merge candidate may be inherited, and the remaining information may be modified before being stored.
         (a) In one example, indication of weighting factors used in Generalized-Bi prediction (GBi) of the k-th merge candidate may not be inherited. Alternatively, furthermore, a specific GBi weighting index may be assigned (e.g., 0) to the TPM stored motion information.
         (b) In one example, indication of motion vector precisions of the k-th merge candidate may not be inherited.
   iii. Alternatively, furthermore, the selected decoded merge index may depend on the splitting direction.
   iv. In one example, if the merge candidate with index equal to the selected decoded merge index is bi-prediction, bi-prediction motion information may be stored.
   v. In one example, if the merge candidate with index equal to the selected decoded merge index is uni-prediction, uni-prediction motion information may be stored.
      1) Alternatively, bi-prediction motion information may be stored, and the stored motion information may be derived from the merge candidate.
   vi. Alternatively, a function on motion information for the two partitions may be stored.
      1) For example, the average of motion vectors for the two partitions may be stored.
b. In one example, suppose the Mvinfo1 and Mvinfo2 indicate the motion information of the two partitions, virtual bi-prediction motion information may be stored by modifying one prediction direction from LX in MvinfoA to LY (Y=1−X) (A being 1 or 2).
   i. In one example, the motion vectors and reference indices of MvinfoA are kept unchanged.
   ii. In one example, furthermore, the reference index of MvinfoA is kept unchanged, while the motion vectors of MvinfoA are set to opposite values.
   iii. The Virtual bi-prediction motion information may include the modified MvinfoA and unmodified MvinfoB (with B=3−A).
   iv. In one example, such modification may be applied only when both Mvinfo1 and Mvinfo2 are from one same prediction direction.
c. In one example, suppose the Mvinfo1 and Mvinfo2 indicate the motion information of the two partitions, how to store motion information may depend on the low delay check flag which indicates whether all reference pictures have smaller or no greater POC values compared to current picture.
   i. In one example, the following apply in order:
      if Mvinfo1 and Mvinfo2 are from different reference picture lists, MvInof0 and Mvinfo1 may be combined and stored as bi-prediction motion information.
   ii. if Mvinfo1 and Mvinfo2 are from the same LX (X=0 or 1) direction, the following may apply:
      If low delay check flag is true (e.g., all reference pictures have smaller or no greater POC values compared to current picture), MvinfoA (e.g., A=2) may be modified by setting prediction direction list from LX to LY (Y=1−X), the modified MvinfoA and unmodified MvinfoC (C=3−A) are combined to form virtual bi-prediction motion information and stored.
      Otherwise, MvinfoB (e.g., B=2) is stored. That is, uni-prediction motion information is stored.
   iii. In one example, Mvinfo1 is associated with PU1 in FIG. 13A and PU1 in FIG. 13B; MvInfo2 is associated with PU2 in FIG. 13A and PU2 in FIG. 13B.
d. In one example, the above method may be applied to the storage of motion information for certain sub-blocks within one block.
   i. In one example, the certain sub-blocks may be those sub-blocks in the weighted area.
   ii. In one example, the certain sub-blocks may be those sub-blocks which contains the diagonal or anti-diagonal line in the block.
   iii. In one example, the certain sub-blocks may be those sub-blocks which are in the right-below corner of the block.
   iv. In one example, the certain sub-blocks may be those sub-blocks which are in the right-column or bottom row of the block.
   v. Alternatively, the above method may be applied to the storage of motion information for all sub-blocks within one block.

19. For the TPM mode, it is proposed that the motion information for a sub-region within the block may be different from that are used in the motion compensation process for the reconstruction of this sub-region.
   a. In one example, for a M×N sub-region (e.g., 4×4 in the current coding unit with the triangular prediction mode) located at the weighted area, motion compensation may be done as bi-prediction, but only one set of motion information from list 0 or list 1 of the bi-prediction may be stored.
      i. Alternatively, for a M×N sub-region (e.g., 4×4 in the current coding unit with the triangular prediction mode) located at the weighted area, motion compensation may be done as bi-prediction, but only uni-prediction information from list X may be stored and the stored information is different from the motion information from list X utilized in the motion compensated process.
      ii. Alternatively, for a M×N sub-region (e.g., 4×4 in the current coding unit with the triangular prediction mode) located at the weighted area, motion compensation may be done as bi-prediction, but bi-prediction information which is different (e.g., different MVs and/or different reference pictures) from what is utilized in the motion compensation process may be stored.

b. In one example, for a M×N sub-region (e.g., 4×4 in the current coding unit with the triangular prediction mode) located at the non-weighted area, motion compensation may be done as uni-prediction, but bi-prediction motion information may be stored.
  i. Alternatively, for a M×N sub-region (e.g., 4×4 in the current coding unit with the triangular prediction mode) located at the non-weighted area, motion compensation may be done as uni-prediction, but the uni-prediction motion information may be stored may be different from what is utilized in the motion compensation process.
c. The stored motion information may be utilized for coding the other blocks (e.g., as spatial motion candidates in merge/AMVP modes of neighboring blocks).
d. The stored motion information may be utilized for coding the future blocks in different pictures (e.g., used to derive temporal motion vector candidate).
e. The stored motion information may be utilized in in-loop processing such as deblocking or ALF.
f. In one example, the motion information for a first sub-region within the block may be different from that are used in the motion compensation process for the reconstruction of the first sub-region, while the motion information for a second sub-region within the block may be the same as that are used in the motion compensation process for the reconstruction of the second sub-region, and the first sub-region and the second sub-region may be in the same coding unit with the triangular prediction mode.

20. It is proposed to store the same set of motion information for the whole block, regardless it is located in the weighted area or not. Suppose the Mvinfo1 and MvInfo2 indicate the motion information of the two partitions (e.g., according to the decoded/derived two merge candidate indices), respectively.
  a. In one example, uni-prediction motion information (e.g., inheriting from the one of the two partitions, or derived from motion information of two partitions) may be stored.
    i. In one example, Mvinfo1 may be stored for the whole block.
      1. In one example, Mvinfo1 may be stored for all sub-regions within the block.
    ii. In one example, MvInfo2 may be stored for the whole block.
      1. In one example, Mvinfo1 may be stored for all sub-regions within the block.
    iii. In one example, which partition's motion information to be stored may depend on the POC distance relative to the current picture.
      1. For example, Mvinfo1 may be stored if the absolute value of POC distance between the current picture and the reference picture which is referred by Mvinfo1 is smaller than that value between the current picture and the reference picture which is referred by MvInfo2.
    iv. In one example, which partition's motion information to be stored may depend on QPs of the reference pictures.
      1. For example, Mvinfo1 may be stored the QP of the reference picture which is referred by Mvinfo1 is smaller than that value of the reference picture which is referred by Mvinfo2.
    v. In one example, which partition's motion information to be stored may depend on reference indices of the reference pictures.
      1. For example, Mvinfo1 may be stored the QP of the reference picture which is referred by Mvinfo1 is smaller than that value of the reference picture which is referred by Mvinfo2.
      2. For example, Mvinfo1 may be stored if the reference index of the reference picture which is referred by Mvinfo1 is smaller than that value of the reference picture which is referred by Mvinfo2.
    vi. In one example, which partition's motion information to be stored may depend on the merge index associated with one partition.
      1. For example, Mvinfo1 may be stored if the associated merge index that Mvinfo1 is derived from is smaller than that Mvinfo2 is derived from.
      2. For example, the motion information which is derived from merge_triangle_idx0 may be stored if merge_triangle_idx0 is smaller than merge_triangle_idx1.
    vii. In one example, a third set of motion information (denoted as Mvinfo3) derived from Mvinfo1 and Mvinfo2 may be stored.
      1. In one example, the MV of Mvinfo3 may be derived as the average of the two MVs of Mvinof1 and Mvinfo2 or the scaled or mapped motion vector from one MV of Mvnof1 and Mvinfo2 and the other MV may be averaged to generate the MV of Mvinfo3.
      2. In one example, the reference picture of Mvinfo3 may be one of the two reference pictures of Mvinof1 and Mvinfo2.
    viii. In one example, one motion vector in MvinfoX (X being 0 or 1) may be scaled to the reference picture in MvinfoY (with Y being 1−X), and then it may be used to derive the motion information to be stored.
      1. In one example, the scaled Mvinfo1 and Mvinfo2 may be used to derive the motion information to be stored, such as specified in bullet vii.
    ix. The above methods may be only applicable to sub-regions located at weighted areas.
      1. Alternatively, the above methods may be only applicable to sub-regions located at not weighted areas.
      2. Alternatively, the above methods may be only applicable to certain sub-regions located at weighted areas.
        a. For example, they may be applied to the top-right and/or bottom-left sub-regions located at weighted areas.
        b. For example, they may be applied to the top-left and/or bottom-right sub-regions located at weighted areas.
        c. Which sub-regions to be applied to may depend on the splitting direction.
  b. In one example, bi-prediction motion vector is derived and stored from MvInfo1 and Mvinfo2.
    i. In the case MvInfo1 and Mvinfo2 have motion vector from different directions (L0 or L1), MvInfo1 and Mvinfo2 are simply combined to form the bi-prediction motion vector.

ii. In the case that both MvInfo1 and Mvinfo2 are from the same LX (X=0 or 1) direction,
   1. The stored MV for LX may be derived from one motion vector of MvInfo1 and Mvinfo2 or from two of them (e.g., via averaging).
   2. If the reference picture of MvInfo1 or Mvinfo2 is included in LY (Y=1−X), MvInfo1 and MvInfo2 are simply combined to form the bi-prediction motion vector, and one of the prediction direction is set to LY.
   3. One motion vector may be scaled to a reference picture in LY (Y=1−X), and the scaled MV as well as the other are combined to form the bi-prediction motion vector. In one example, the target reference picture in LY that the scaled MV refers to may be pre-defined (e.g., with reference picture index equal to 0), or may be signaled.
   4. One motion vector may be mapped to a reference picture in LY (Y=1−X), and the mapped MV as well as the other are combined to form the bi-prediction motion vector. In one example, the target reference picture in LY that the mapped MV refers to may be pre-defined (e.g., with reference picture index equal to 0), or may be signaled. In one example, the mapping process may be done without scaling. E.g., the mapped MV may be equal to or opposite to the original MV.
   i. The above methods may be only applicable to sub-regions located at weighted areas.
      1) Alternatively, the above methods may be only applicable to sub-regions located at not weighted areas
      2) Alternatively, the above methods may be only applicable to certain sub-regions located at weighted areas.
         (a) For example, they may be applied to the top-right and/or bottom-left sub-regions located at weighted areas.
         (b) For example, they may be applied to the top-left and/or bottom-right sub-regions located at weighted areas.
         (c) Which sub-regions to be applied to may depend on the splitting direction.
c. Whether to store uni- or bi-prediction motion information may depend on the decoded motion information of the two partitions.
   i. In one example, if both Mvinfo1 and Mvinfo2 are from the same LX reference list, uni-prediction motion information may be stored.
   ii. In one example, if MvInfo1 and Mvinfo2 are from different reference lists (one from L0 and the other from L1), bi-prediction motion information may be stored.
   iii. In one example, if both MvInfo1 and Mvinfo2 are from the same LX reference list, but at least one of the reference pictures referred by MvInfo1 or Mvinfo2 is also in the other reference list LY(Y=1−X), bi-prediction motion information may be stored
d. Alternatively, the storage of motion information is still based on whether one sub-block is located at the weighted area. For those located at the weighted area, the stored motion information is derived following the rules below:
   i. In one example, if MvInfo1 and Mvinfo2 are from the same LX (X=0 or 1) direction,
      1. If the reference picture of either MvInfo1 or Mvinfo2 is included in LY (Y=1−X), MvInfo1 and Mvinfo2 are simply combined to form the bi-prediction motion vector, and one of the prediction direction is set to LY.
      2. One motion vector may be scaled to a reference picture in LY (Y=1−X), and the scaled MV as well as the other are combined to form the bi-prediction motion vector. In one example, the target reference picture in LY that the scaled MV refers to may be pre-defined (e.g., with reference picture index equal to 0) or may be signaled.
      3. One motion vector may be mapped to a reference picture in LY (Y=1−X), and the mapped MV as well as the other are combined to form the bi-prediction motion vector. In one example, the target reference picture in LY that the mapped MV refers to may be pre-defined (e.g., with reference picture index equal to 0) or may be signaled. In one example, the mapping process may be done without scaling. E.g., the mapped MV may be equal to or opposite to the original MV.
   ii. In one example, if Mvinfo1 and Mvinfo2 are from the same LX (X=0 or 1) direction, either Mvinfo1 or Mvinfo2 is stored. That is, uni-prediction motion vector is stored.
   iii. In one example, if Mvinfo1 and Mvinfo2 are from the same LX (X=0 or 1) direction, one motion vector may be scaled to the reference picture of the other one, and the average or weighted average of the scaled motion vector and the other motion vector may be stored.
   iv. In one example, if Mvinfo1 and Mvinfo2 are from the same LX (X=0 or 1) direction, and the average or weighted average of the two motion vectors may be stored, the reference picture may be one of the two reference pictures of Mvinof1 and Mvinfo2.
   v. In one example, the stored motion information for the whole block may be derived from the motion information in each sub-block. For example, the MVs in all or some sub-blocks are weighted summed to derive the stored MV for the whole block.
   vi. For above examples, different sub-regions may store different motion information.
   vii. For above examples, a sub-region in the weighted area may store uni or bi-prediction motion information.
e. Alternatively, the storage of motion information is still based on the position of sub-blocks. However, for each sub-block, only uni-prediction motion information may be stored.
   i. In one example, the motion information of a sub-region in the weighted area may be inherited or derived from Mvinfo1 and/or Mvinfo2, which may be stored.
f. In one example, the stored motion information is only used in some modules.
   i. In one example, the stored motion information is used in temporal motion prediction.
   ii. Alternatively, in addition, the stored motion information is used in spatial motion prediction.

iii. Alternatively, in addition, the stored motion information is used in filtering (e.g., deblocking) process.
   g. In one example, the stored motion information may be used in the motion compensation process of the block.
   h. In one example, one or multiple HMVP tables may be updated according to the stored motion information.
21. It is proposed that the storage of motion information is based on M×N block unit (wherein M and N couldn't be equal to 4 at the same time). Each M×N block share the same motion information.
   a. In one example, M and N are set to 8.
   b. In one example, for an M×N block, if part of it belongs to the weighted area, part of it belongs to the non-weighted area, such a block follows the rule of weighted area for motion vector storage.
   c. Alternatively, for an M×N block, if a first part of it belongs to the weighted area, but a second part of it belongs to the non-weighted area, such a block may follow the rule of non-weighted area to store the motion information.
22. Whether to enable or disable TPM for two partitions to be predicted from one same reference picture may be under conditions, such as, motion vectors of the two partitions shall be different enough.
   a. In one example, reference samples of the two partitions shall not be overlapped.
   b. In one example, abs(MV0[0]−MV1[0]) shall be smaller than TH, wherein MV0 and MV1 are the motion vectors of the two partitions, and MVX[0] and MVX[1] are the horizontal and vertical component of MVX respectively. Function abs(x) returns the absolute value of x.
   c. In one example, abs(MV0[1]−MV1[1]) shall be smaller than TH.
   d. In one example, abs(MV0[0]−MV1[0])+abs(MV0[1]−MV1[1]) shall be smaller than TH.
   e. In one example, Max(abs(MV0[0]−MV1[0]), abs(MV0[1]−MV1[1])) shall be smaller than TH, wherein function Max(x, y) returns the larger one of x and y.
   f. A conformance bitstream shall satisfy that when TPM is enabled for a block, one or more above-mentioned bullets are true.
23. In the disclosed methods, the stored motion information may be used to predict the motion information of following blocks to be decoded, in the current picture or in other pictures to be decoded.
   a. The stored motion information may comprise:
   vii. Motion vectors
   viii. Reference indices
   ix. The indication of uni-prediction or bi-prediction
   x. The indication of inter-prediction direction
   xi. The indication of Generalized-Bi prediction (GBi)
   xii. Motion vector resolution
   xiii. The indication of affine prediction

5. Exemplary Embodiments of the Disclosed Technology

5.1 Embodiment #1

Motion vector storing process for triangle merge mode
The variables numSbX and numSbY specifying the number of 4×4 blocks in the current coding block in horizontal and vertical direction are set equal to numSbX=cbWidth>>2 and numSbY=cbHeight>>2.
Where cbWidth and cbHeight specifying the width and the height of the current coding block in luma samples,
The variable minSb is set equal to min(numSbX, numSbY)−1.
The variable cbRatio is derived as follows:

$$cbRatio=(cbWidth>cbHeight)?(cbWidth/cbHeight):(cbHeight/cbWidth)$$

For each 4×4 subblock at subblock index (xSbIdx, ySbIdx) with xSbIdx=0 . . . numSbX−1, and ySbIdx=0 . . . numSbY−1, the following applies:
   The variables xIdx and yIdx are derived as follows:

$$xIdx=(cbWidth>cbHeight)?(xSbIdx/cbRatio):xSbIdx$$

$$yIdx=(cbWidth>cbHeight)?ySbIdx:(ySbIdx/cbRatio)$$

The variable sType is derived as follows:
   If triangleDir is equal to 0, the following applies:

$$sType=(xIdx==yIdx)?2:((xIdx>yIdx)?0:1)$$

Figure 30B:
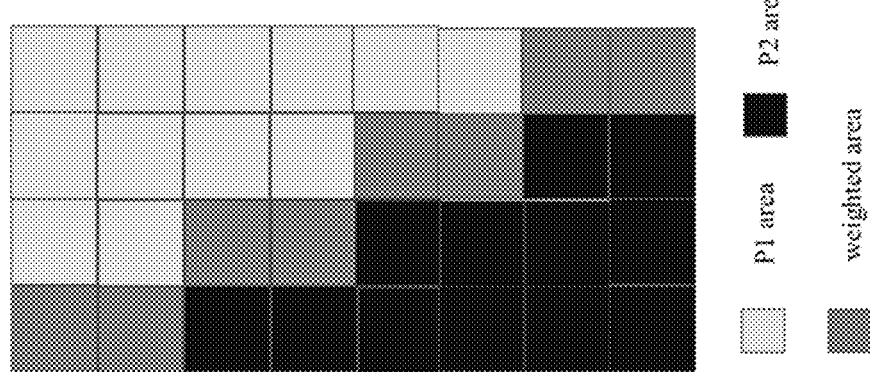
FIGS. 30A-30C show three examples of MV storage areas for triangleDir equal to 0.
Figure 30A:
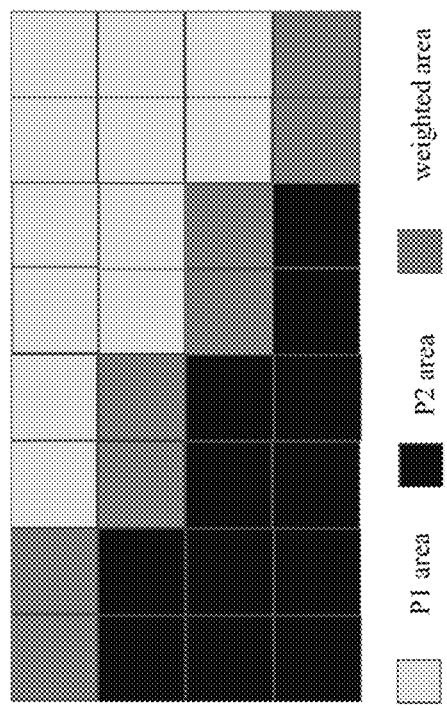
Figure 30C:
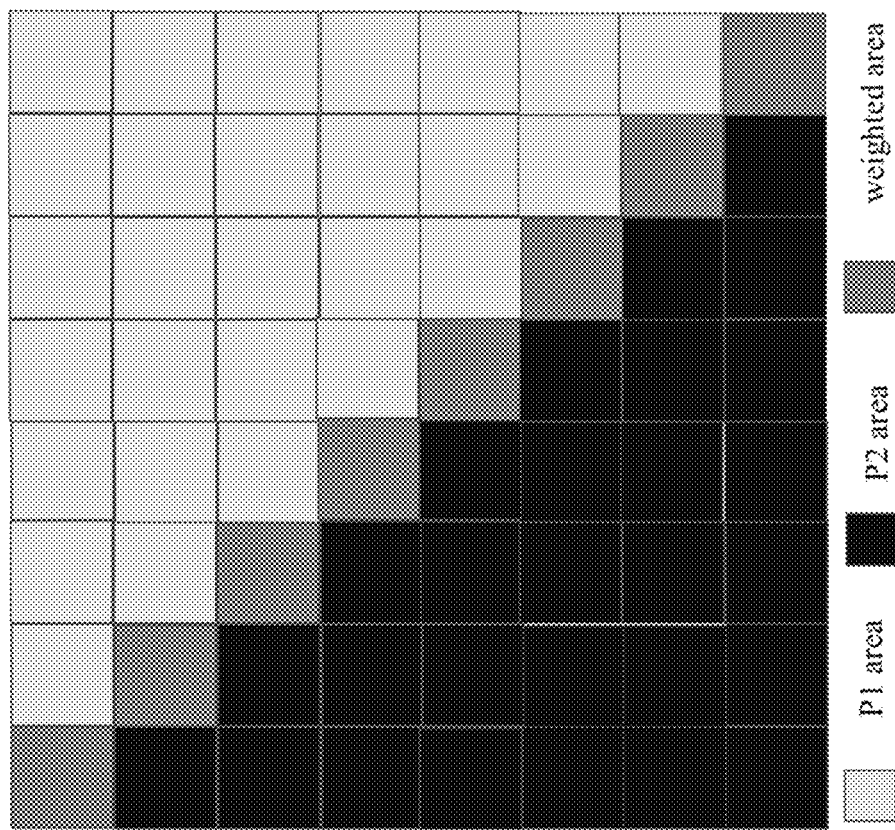

Otherwise (triangleDir is equal to 1), the following applies:

$$sType=(xIdx+yIdx==\min Sb)?2:((xIdx+yIdx<\min Sb)?0:1)$$

where triangleDir specifies the partition direction.
As shown in FIGS. 30A-30C, sType equal to 0 corresponds to P1 area; sType equal to 1 corresponds to P2 area; sType equal to 2 corresponds to the weighted area.
The motion information of P1 area is denoted as (Mv1, refIdx1); the motion information of P2 area is denoted as (Mv2, refIdx2).
   Depending on the value of sType, the following assignments are made:
      If sType is equal to 0, the motion information of the 4×4 subblock is (Mv1, refIdx1).
      Otherwise, if sType is equal to 1 or sType is equal to 2 and if both Mv1 and Mv2 are from the same reference list and current block is located in a slice with backward reference picture (slice.getCheckLDC( ) is false), the motion information of the 4×4 subblock is (Mv2, refIdx2).
      Otherwise (sType is equal to 2), the following applies:

$$refIdxL0=(predListFlagA==0)?refIdx1:refIdx2$$

$$refIdxL1=(predListFlagA==0)?refIdx2:refIdx1$$

$$mvL0=(predListFlagA==0)?Mv1:Mv2$$

$$mvL1=(predListFlagA==0)?Mv2:Mv1$$

predListFlagA is the prediction list flag of P1 area.

5.2 Embodiment #2

For each 4×4 subblock at subblock index (xSbIdx, ySbIdx) with xSbIdx=0 . . . numSbX−1, and ySbIdx=0 . . . numSbY−1, the following applies:
   Depending on the value of sType, the following assignments are made:
      If sType is equal to 0, the motion information of the 4×4 subblock is (Mv1, refIdx1).
      Otherwise, if sType is equal to 1, the motion information of the 4×4 subblock is (Mv2, refIdx2).

Otherwise (sType is equal to 2), the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.3 Embodiment #3

For each 4×4 subblock at subblock index (xSbIdx, ySbIdx) with xSbIdx=0 ... numSbX−1, and ySbIdx=0 ... numSbY−1, the following applies:
Depending on the value of sType, the following assignments are made:
If sType is equal to 0, the motion information of the 4×4 subblock is (Mv1,refIdx1).
Otherwise, if sType is equal to 1 or sType is equal to 2 and if both Mv1 and Mv2 are from the same reference list, the motion information of the 4×4 subblock is (Mv2,refIdx2).
Otherwise (sType is equal to 2), the following applies:
If Mv1 and Mv2 are from different reference lists refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.4 Embodiment #4

For each 4×4 subblock at subblock index (xSbIdx, ySbIdx) with xSbIdx=0 ... numSbX−1, and ySbIdx=0 ... numSbY−1, the following applies:
Depending on the value of sType, the following assignments are made:
If sType is equal to 0 or sType is equal to 2 and if both Mv1 and Mv2 are from the same reference list and current block is located in a slice with backward reference picture (slice.getCheckLDC( ) is false), the motion information of the 4×4 subblock is (Mv1, refIdx1).
Otherwise, if sType is equal to 1, the motion information of the 4×4 subblock is (Mv2,refIdx2).
Otherwise (sType is equal to 2), the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.5 Embodiment #5

For each 4×4 subblock at subblock index (xSbIdx, ySbIdx) with xSbIdx=0 ... numSbX−1, and ySbIdx=0 ... numSbY−1, the following applies:
Depending on the value of sType, the following assignments are made:
If sType is equal to 0 or sType is equal to 2 and if both Mv1 and Mv2 are from the same reference list, the motion information of the 4×4 subblock is (Mv1, refIdx1).
Otherwise, if sType is equal to 1, the motion information of the 4×4 subblock is (Mv2,refIdx2).
Otherwise (sType is equal to 2), the following applies:
If Mv1 and Mv2 are from different reference lists refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.6 Embodiment #6

For each 4×4 subblock at subblock index (xSbIdx, ySbIdx) with xSbIdx=0 ... numSbX−1, and ySbIdx=0 ... numSbY−1, the following applies:
Depending on the value of sType, the following assignments are made:
If sType is equal to 0, the motion information of the 4×4 subblock is (Mv1,refIdx1).
Otherwise, if sType is equal to 1, the motion information of the 4×4 subblock is (Mv2,refIdx2).
Otherwise (sType is equal to 2), the following applies:
If Mv1 and Mv2 are from different reference lists refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.
Otherwise, the motion information of the 4×4 subblock is ((Mv1+Mv2)/2,refIdx1)

5.7 Embodiment #7

For each 4×4 subblock at subblock index (xSbIdx, ySbIdx) with xSbIdx=0 ... numSbX−1, and ySbIdx=0 ... numSbY−1, the following applies:
Depending on the value of sType, the following assignments are made:
If sType is equal to 0, the motion information of the 4×4 subblock is (Mv1,refIdx1).
Otherwise, if sType is equal to 1, the motion information of the 4×4 subblock is (Mv2,refIdx2).
Otherwise (sType is equal to 2), the motion information of the 4×4 subblock is the motion of the original merge candidate corresponding to merge_triangle_idx0

5.8 Embodiment #8

For each 4×4 subblock at subblock index (xSbIdx, ySbIdx) with xSbIdx=0 ... numSbX−1, and ySbIdx=0 ... numSbY−1, the following applies:
Depending on the value of sType, the following assignments are made:
If sType is equal to 0 or sType is equal to 2 and if both Mv1 and Mv2 are from the same reference list and triangleDir is equal to 0 and ySbIdx<numSbY−1, the motion information of the 4×4 subblock is (Mv1, refIdx1).

Otherwise, if sType is equal to 1 or sType is equal to 2 and if both Mv1 and Mv2 are from the same reference list and (triangleDir is equal to 0 and ySbIdx=numSbY−1 or triangleDir is equal to 1), the motion information of the 4×4 subblock is (Mv2, refIdx2).

Otherwise (sType is equal to 2), the following applies:
If Mv1 and Mv2 are from different reference lists refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.9 Embodiment #9

For each 4×4 subblock at subblock index (xSbIdx, ySbIdx) with xSbIdx=0 . . . numSbX−1, and ySbIdx=0 . . . numSbY−1, the following applies:
If both Mv1 and Mv2 are from the same reference list and current block is located in a slice with backward reference picture (slice.getCheckLDC( ) is false), the motion information of the 4×4 subblock is (Mv2, refIdx2).
Otherwise, the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.10 Embodiment #10

For each 4×4 subblock at subblock index (xSbIdx, ySbIdx) with xSbIdx=0 . . . numSbX−1, and ySbIdx=0 . . . numSbY−1, the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.11 Embodiment #11

For each 4×4 subblock at subblock index (xSbIdx, ySbIdx) with xSbIdx=0 . . . numSbX−1, and ySbIdx=0 . . . numSbY−1, the following applies:
If both Mv1 and Mv2 are from the same reference list, the motion information of the 4×4 subblock is (Mv2, refIdx2).
Otherwise, the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.12 Embodiment #12

For each 4×4 subblock at subblock index (xSbIdx, ySbIdx) with xSbIdx=0 . . . numSbX−1, and ySbIdx=0 . . . numSbY−1, the following applies:
If both Mv1 and Mv2 are from the same reference list and current block is located in a slice with backward reference picture (slice.getCheckLDC( ) is false), the motion information of the 4×4 subblock is (Mv1, refIdx1).
Otherwise, the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.13 Embodiment #13

For each 4×4 subblock at subblock index (xSbIdx, ySbIdx) with xSbIdx=0 . . . numSbX−1, and ySbIdx=0 . . . numSbY−1, the following applies:
If both Mv1 and Mv2 are from the same reference list, the motion information of the 4×4 subblock is (Mv1, refIdx1).
Otherwise, the following applies:
If Mv1 and Mv2 are from different reference lists refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

5.14 Embodiment #14

For each 4×4 subblock at subblock index (xSbIdx, ySbIdx) with xSbIdx=0 . . . numSbX−1, and ySbIdx=0 . . . numSbY−1, the following applies:
If Mv1 and Mv2 are from different reference lists refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.
Otherwise, the motion information of the 4×4 subblock is ((Mv1+Mv2)/2,refIdx1)

5.15 Embodiment #15

For each 4×4 subblock at subblock index (xSbIdx, ySbIdx) with xSbIdx=0 . . . numSbX−1, and ySbIdx=0 . . . numSbY−

1, the motion information of the 4×4 subblock is the motion of the original merge candidate corresponding to merge_triangle_idx0

5.16 Embodiment #16

For each 4×4 subblock at subblock index (xSbIdx, ySbIdx) with xSbIdx=0 . . . numSbX−1, and ySbIdx=0 . . . numSbY−1, the following applies:
  If both Mv1 and Mv2 are from the same reference list and triangleDir is equal to 0 and ySbIdx<numSbY−1, the motion information of the 4×4 subblock is (Mv1, refIdx1).
  Otherwise, if both Mv1 and Mv2 are from the same reference list and (triangleDir is equal to 0 and ySbIdx=numSbY−1 or triangleDir is equal to 1), the motion information of the 4×4 subblock is (Mv2, refIdx2).
  Otherwise, the following applies:

refIdx$L$0=(predListFlag$A$==0)?refIdx1:refIdx2 refIdx$L$1=(predListFlag$A$==0)?refIdx2:refIdx1 mv$L$0=(predListFlag$A$==0)?Mv1:Mv2 mv$L$1=(predListFlag$A$==0)?Mv2:Mv1 predListFlagA is the prediction list flag of P1 area.

FIG. 31 is a flowchart for a method 3100 for video processing. The method 3100 includes, at operation 3102, making a decision, based on a priority rule, regarding an order of insertion of motion candidates into a motion candidate list for a conversion between a current block of video and a bitstream representation of the video, wherein the current block is coded using a geometry partition mode.

The method 3100 includes, at operation 3104, performing, based on the decision and the motion candidate list, the conversion.

FIG. 32 is a flowchart for a method 3200 for video processing. The method 3200 includes, at operation 3202, inserting, into a motion candidate list for a conversion between a current block of video and a bitstream representation of the video, one or more averaged uni-prediction motion candidates from List 0 and List 1 derived from one regular motion candidate, wherein the current block is coded using a geometry partition mode.

The method 3200 includes, at operation 3204, performing, based on the motion candidate list, the conversion.

FIG. 33 is a flowchart for a method 3300 for video processing. The method 3300 includes, at operation 3302, inserting, into a motion candidate list for a conversion between a current block of video and a bitstream representation of the video, one or more averaged motion candidates with uni-prediction derived from regular motion candidates with uni-prediction, wherein the current block is coded using a geometry partition mode.

The method 3300 includes, at operation 3304, performing, based on the motion candidate list, the conversion.

FIG. 34 is a flowchart for a method 3400 for video processing. The method 3400 includes, at operation 3402, inserting, into a motion candidate list for a conversion between a current block of video and a bitstream representation of the video, one or more virtual motion candidates derived from available motion candidates, wherein the current block is coded using a geometry partition mode.

The method 3400 includes, at operation 3404, performing, based on the motion candidate list, the conversion.

Figure 35:
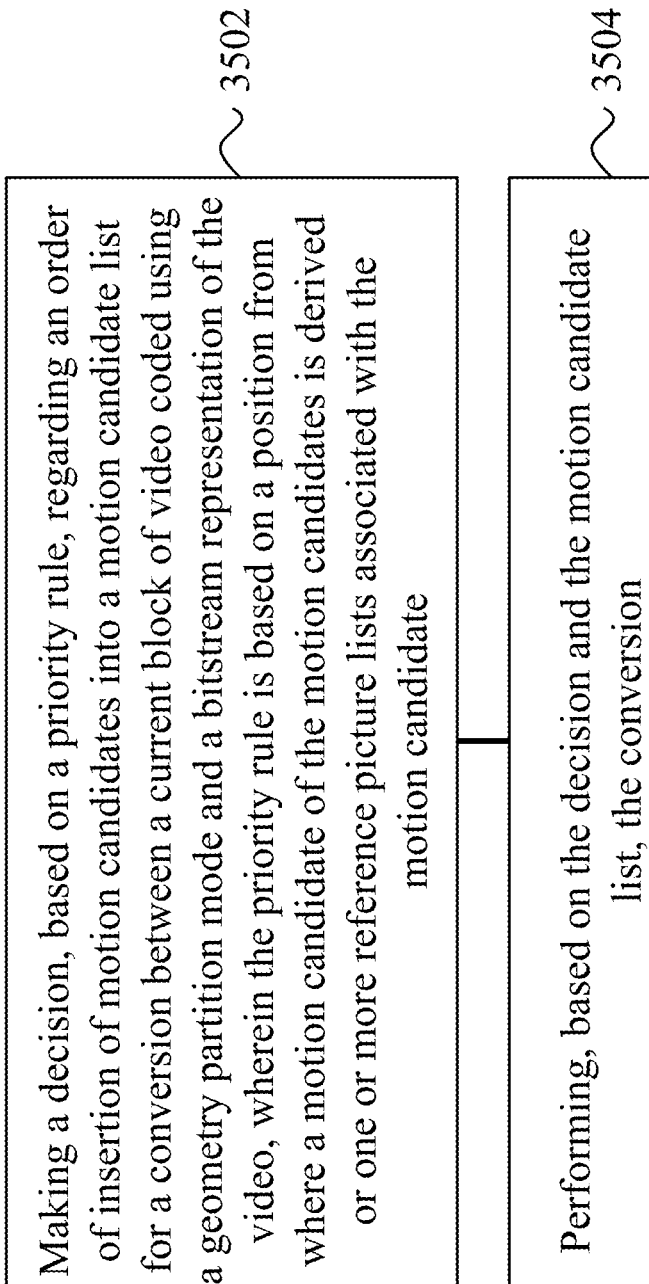

FIG. 35 is a flowchart for a method 3500 for video processing. The method 3500 includes, at operation 3502, making a decision, based on a priority rule, regarding an order of insertion of motion candidates into a motion candidate list for a conversion between a current block of video coded using a geometry partition mode and a bitstream representation of the video, wherein the priority rule is based on a position from where a motion candidate of the motion candidates is derived or one or more reference picture lists associated with the motion candidate.

The method 3500 includes, at operation 3504, performing, based on the decision and the motion candidate list, the conversion.

Figure 36:
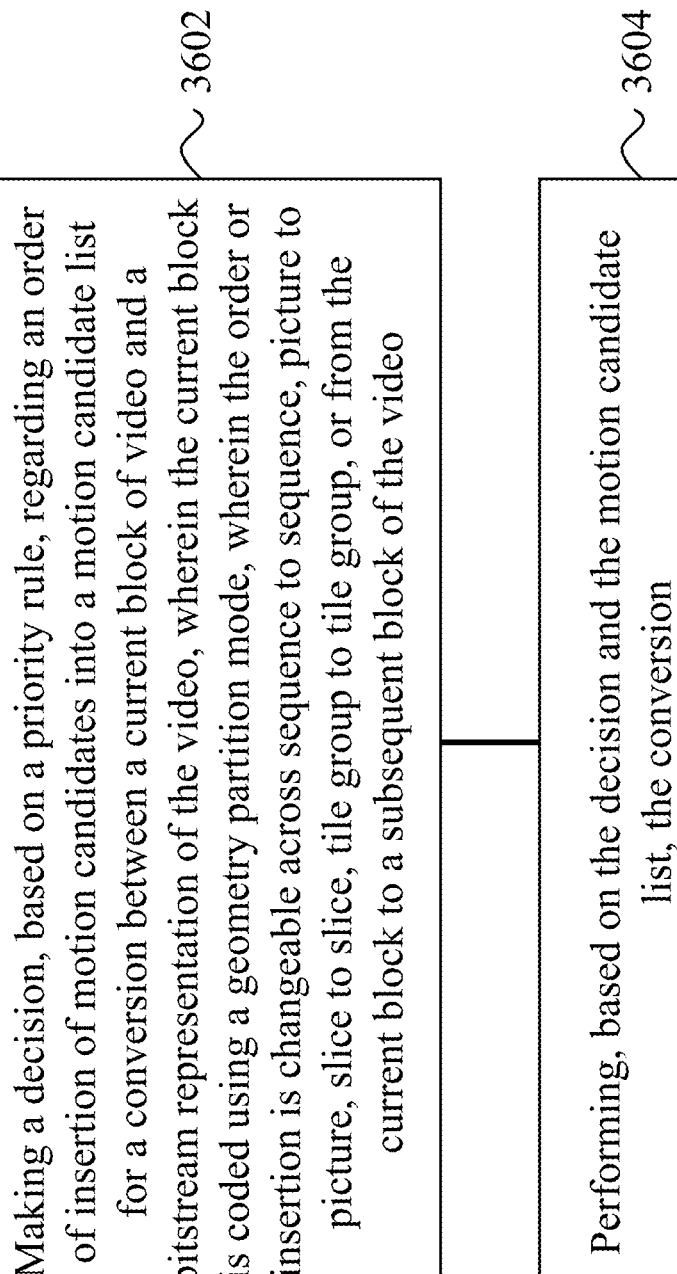

FIG. 36 is a flowchart for a method 3600 for video processing. The method 3600 includes, at operation 3602, making a decision, based on a priority rule, regarding an order of insertion of motion candidates into a motion candidate list for a conversion between a current block of video and a bitstream representation of the video, wherein the current block is coded using a geometry partition mode, wherein the order or insertion is changeable across sequence to sequence, picture to picture, slice to slice, tile group to tile group, or from the current block to a subsequent block of the video.

The method 3600 includes, at operation 3604, performing, based on the decision and the motion candidate list, the conversion.

Figure 37:
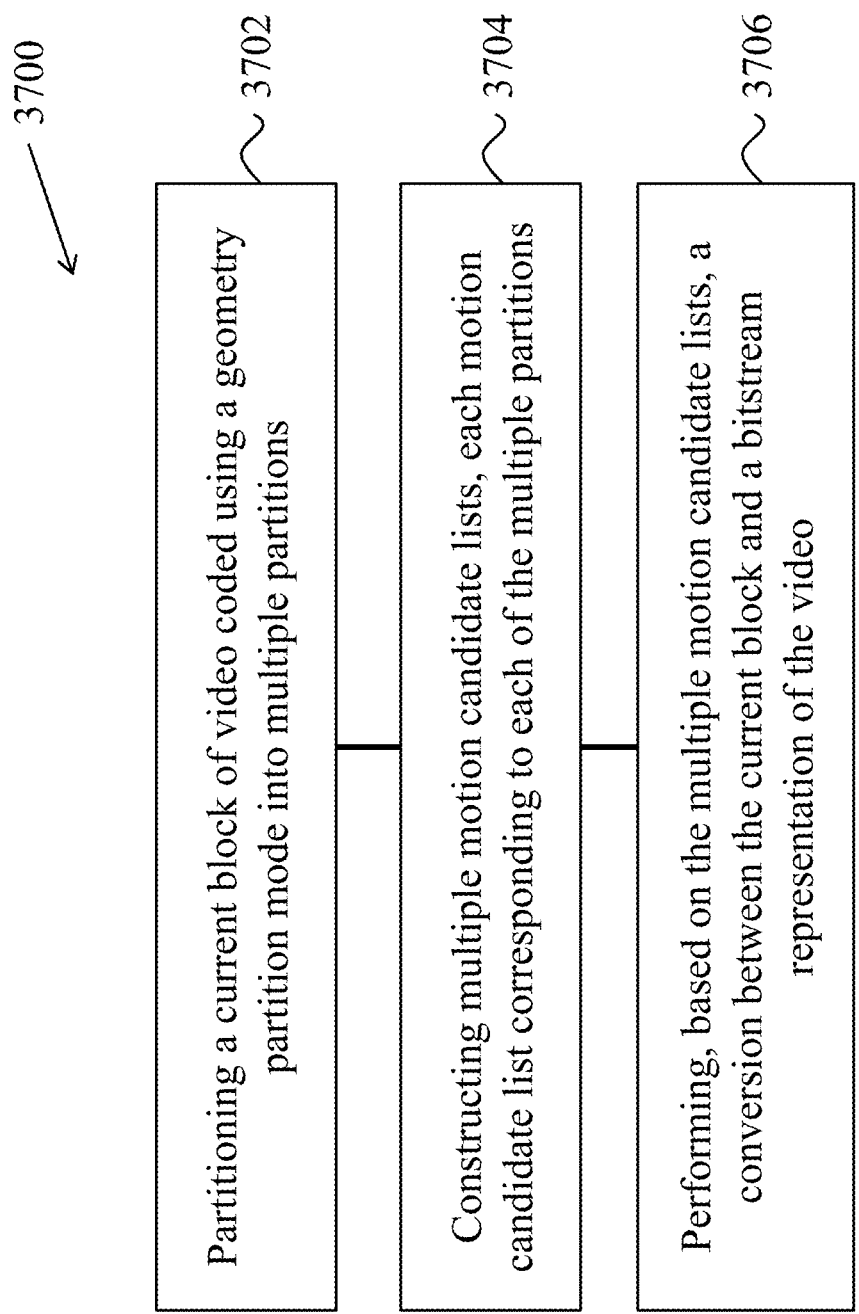

FIG. 37 is a flowchart for a method 3700 for video processing. The method 3700 includes, at operation 3702, partitioning a current block of video coded using a geometry partition mode into multiple partitions.

The method 3700 includes, at operation 3704, constructing multiple motion candidate lists, each motion candidate list corresponding to each of the multiple partitions.

The method 3700 includes, at operation 3706, performing, based on the multiple motion candidate lists, a conversion between the current block and a bitstream representation of the video.

Figure 38:
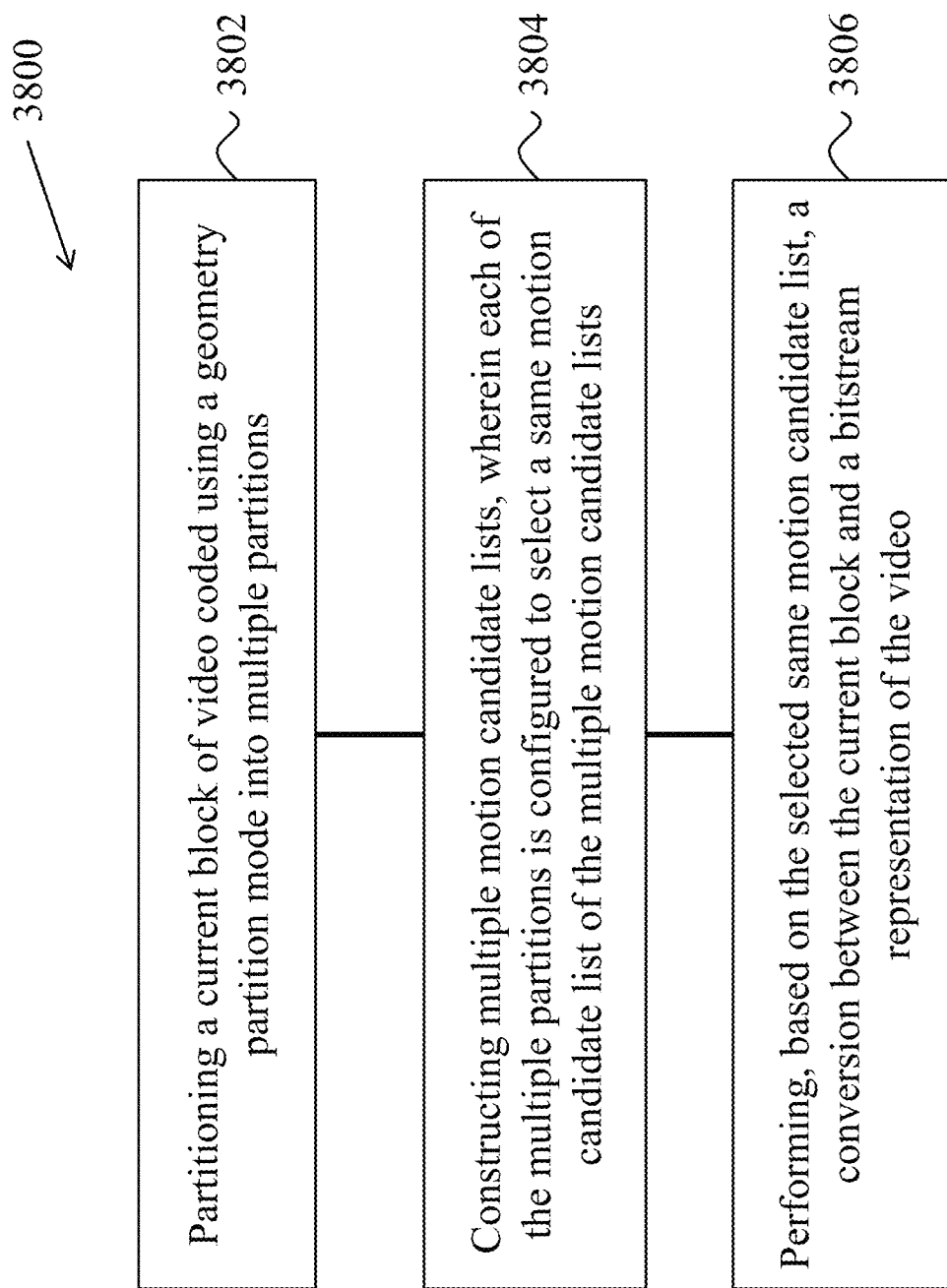

FIG. 38 is a flowchart for a method 3800 for video processing. The method 3800 includes, at operation 3802, partitioning a current block of video coded using a geometry partition mode into multiple partitions.

The method 3800 includes, at operation 3804, constructing multiple motion candidate lists, wherein each of the multiple partitions is configured to select a same motion candidate list of the multiple motion candidate lists.

The method 3800 includes, at operation 3806, performing, based on the selected same motion candidate list, a conversion between the current block and a bitstream representation of the video.

Figure 39:
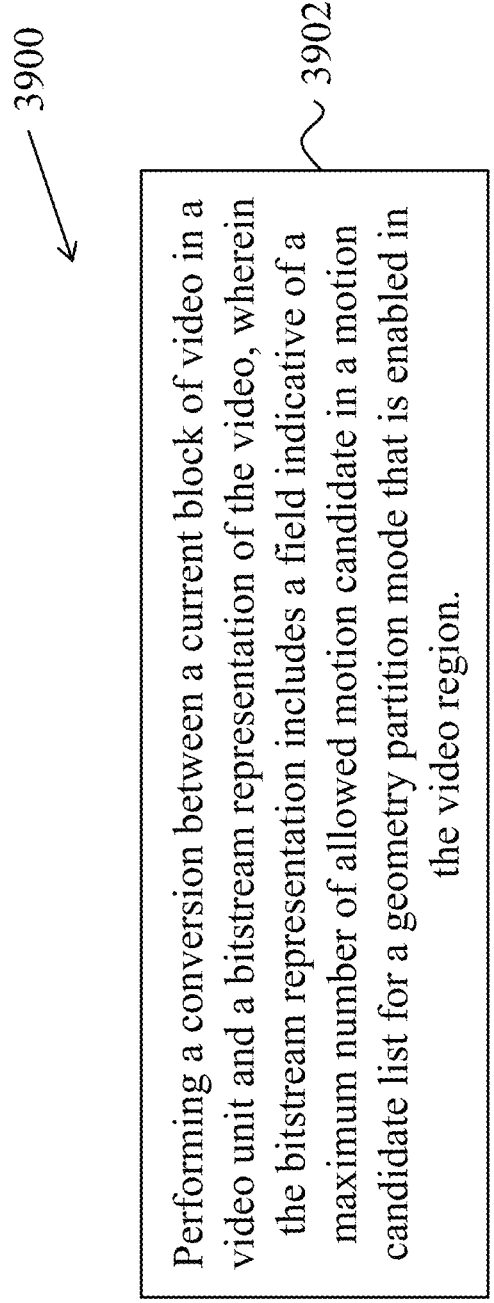

FIG. 39 is a flowchart for a method 3900 for video processing. The method 3900 includes, at operation 3902, performing a conversion between a current block of video in a video unit and a bitstream representation of the video, wherein the bitstream representation includes a field indicative of a maximum number of allowed motion candidate in a motion candidate list for a geometry partition mode that is enabled in the video region.

FIG. 40 is a flowchart for a method 4000 for video processing. The method 4000 includes, at operation 4002, selecting, for a current block of video that is partitioned into multiple partitions using a geometry partition mode, a weighting factor group from a plurality of weighting factor groups, wherein the weighting factor group is selected based on at least a width or a height of the current block.

The method 4000 includes, at operation 4004, applying, as part of a conversion between the current block and a bitstream representation of the video, the weighting factor group to samples along a common boundary of at least two of the multiple partitions.

FIG. 41 is a flowchart for a method 4100 for video processing. The method 4100 includes, at operation 4102, determining, for a sample within a current block of video that is partitioned into multiple partitions using a geometry partition mode, at least one weighting factor based on an angle of a common boundary of at least two of the multiple partitions.

The method 4100 includes, at operation 4104, performing, based on the at least one weighting factor, a conversion between the current block and a bitstream representation of the video.

FIG. 42 is a flowchart for a method 4200 for video processing. The method 4200 includes, at operation 4202, performing, for a current block of video that is partitioned into multiple partitions using a geometry partition mode, a motion compensation process on samples along a common boundary of at least two of the multiple partitions with a sample size that is different from a 4×4 sample size.

The method 4200 includes, at operation 4204, performing, based on the motion compensation process, a conversion between the current block and a bitstream representation of the video.

Figure 43:
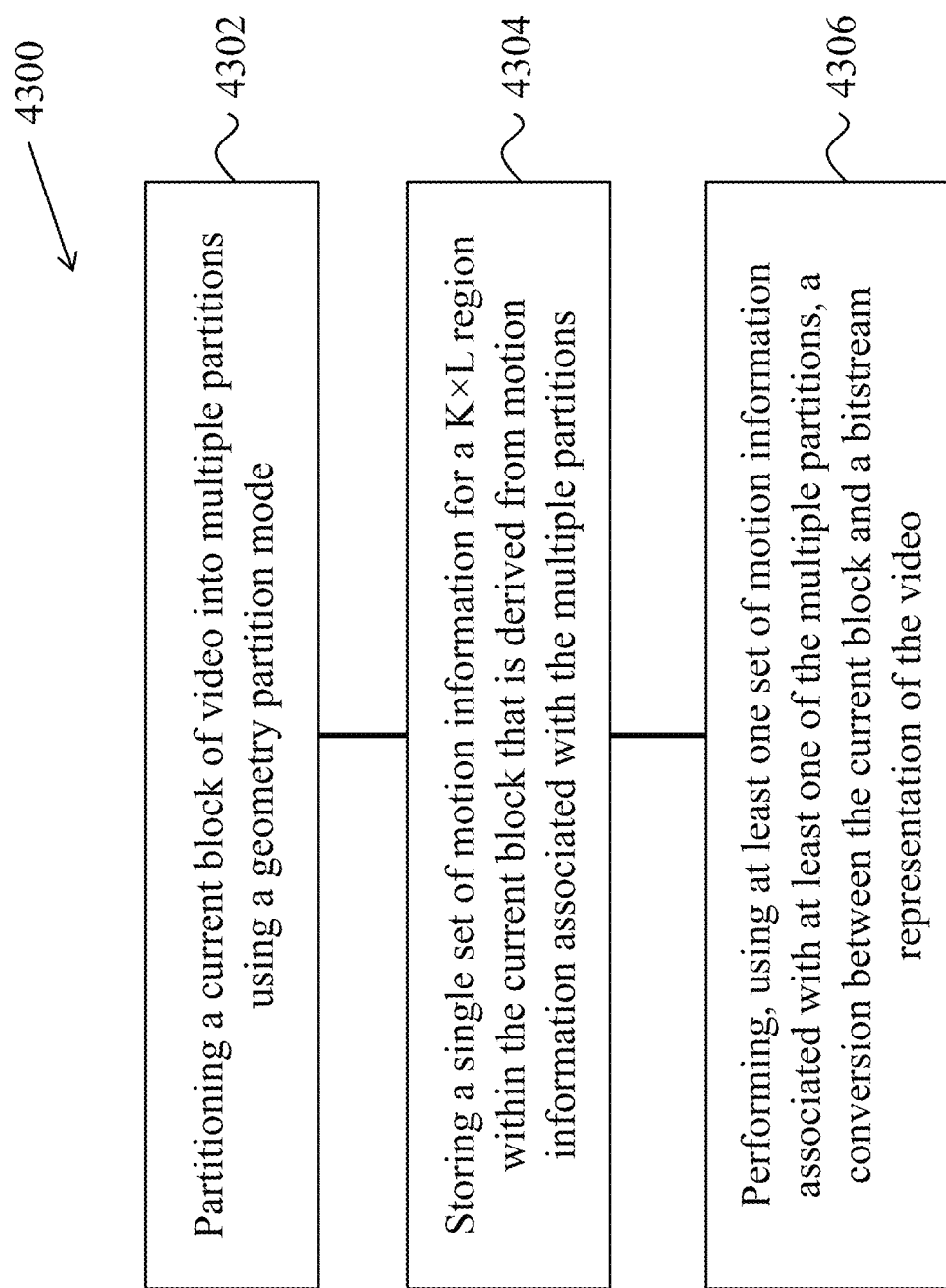

FIG. 43 is a flowchart for a method 4300 for video processing. The method 4300 includes, at operation 4302, partitioning a current block of video into multiple partitions using a geometry partition mode.

The method 4300 includes, at operation 4304, storing a single set of motion information for a K×L region within the current block that is derived from motion information associated with the multiple partitions.

The method 4300 includes, at operation 4306, performing, using at least one set of motion information associated with at least one of the multiple partitions, a conversion between the current block and a bitstream representation of the video.

Figure 44:
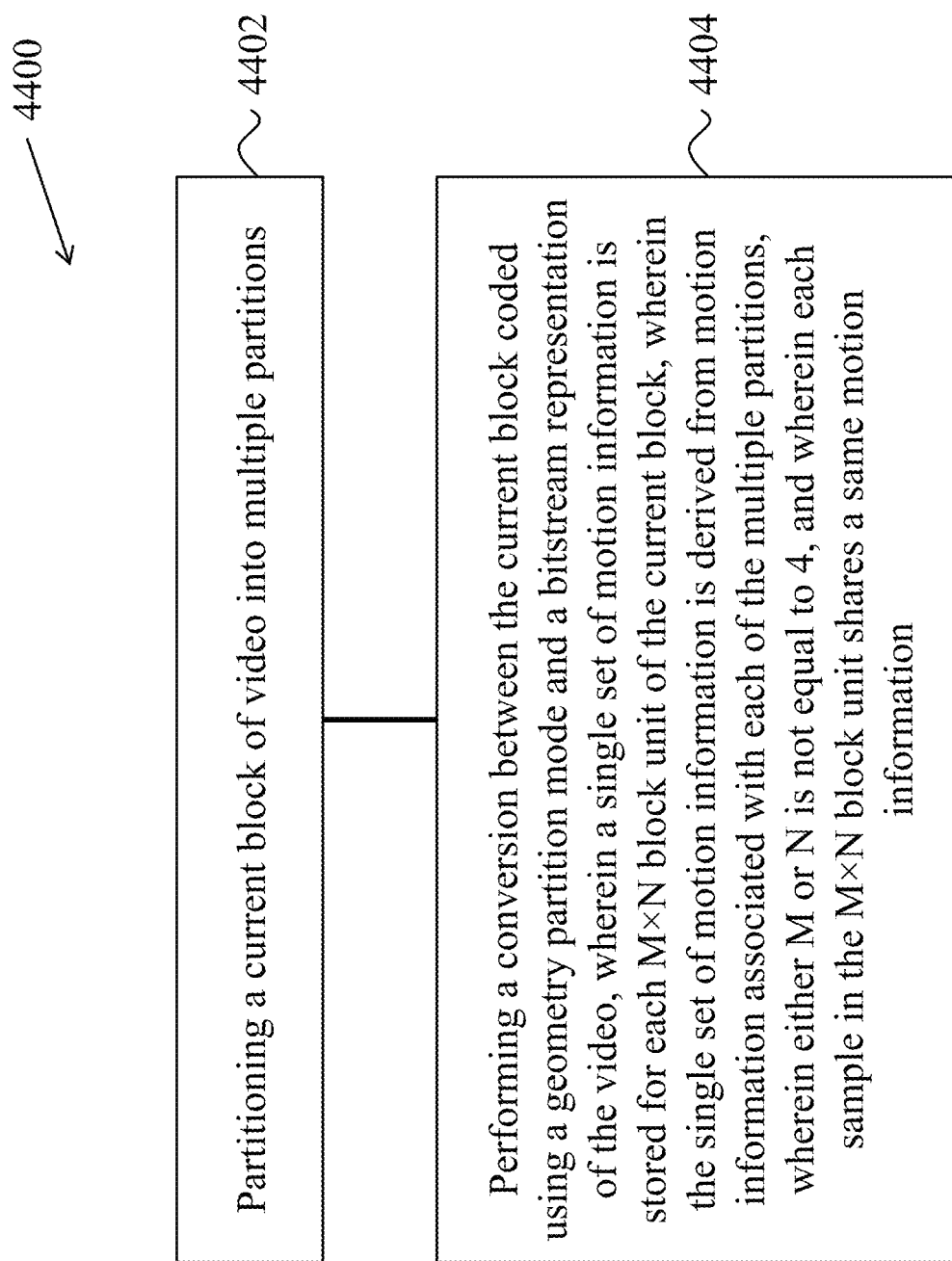

FIG. 44 is a flowchart for a method 4400 for video processing. The method 4400 includes, at operation 4402, partitioning a current block of video into multiple partitions.

The method 4400 includes, at operation 4404, performing a conversion between the current block coded using a geometry partition mode and a bitstream representation of the video, wherein a single set of motion information is stored for each M×N block unit of the current block, wherein the single set of motion information is derived from motion information associated with each of the multiple partitions, wherein either M or N is not equal to 4, and wherein each sample in the M×N block unit shares a same motion information.

Figure 45:
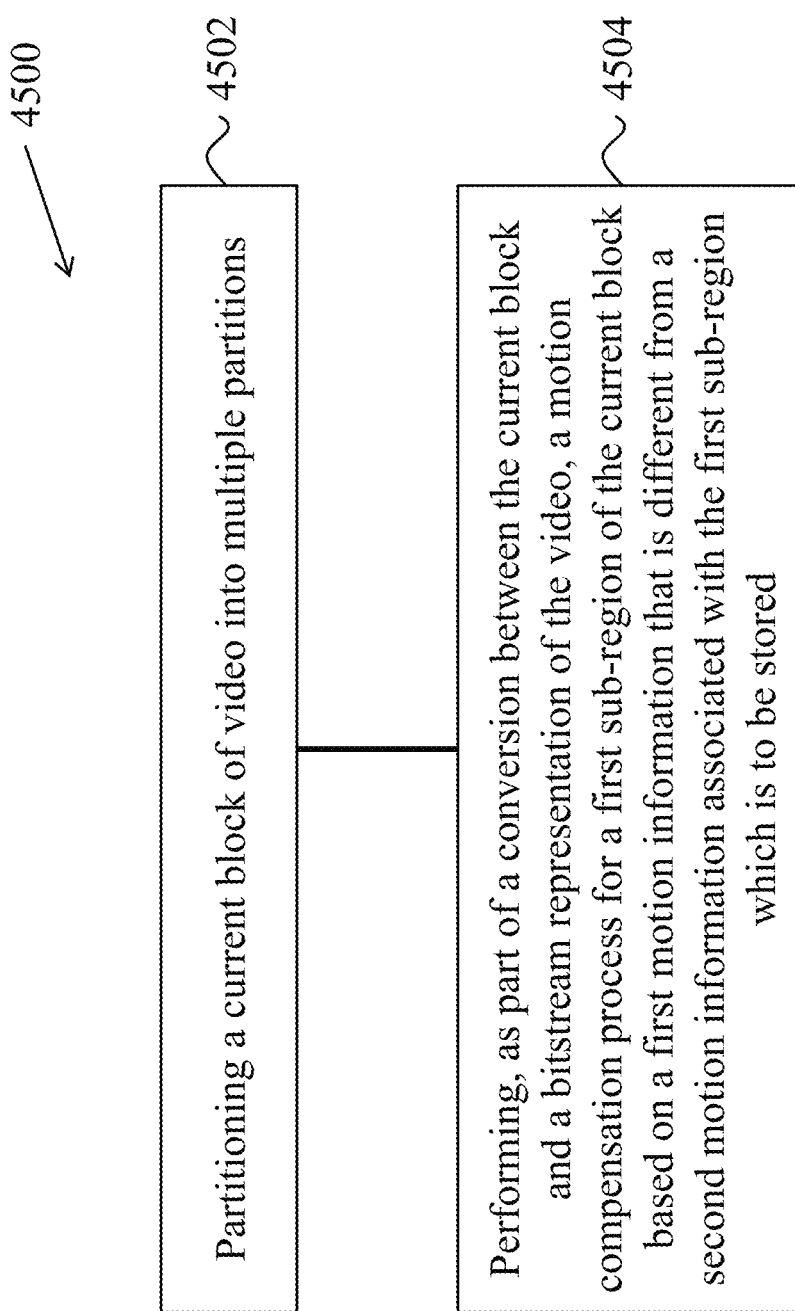

FIG. 45 is a flowchart for a method 4500 for video processing. The method 4500 includes, at operation 4502, partitioning a current block of video into multiple partitions.

The method 4500 includes, at operation 4504, performing, as part of a conversion between the current block and a bitstream representation of the video, a motion compensation process for a first sub-region of the current block based on a first motion information that is different from a second motion information associated with the first sub-region which is to be stored.

Figure 46:
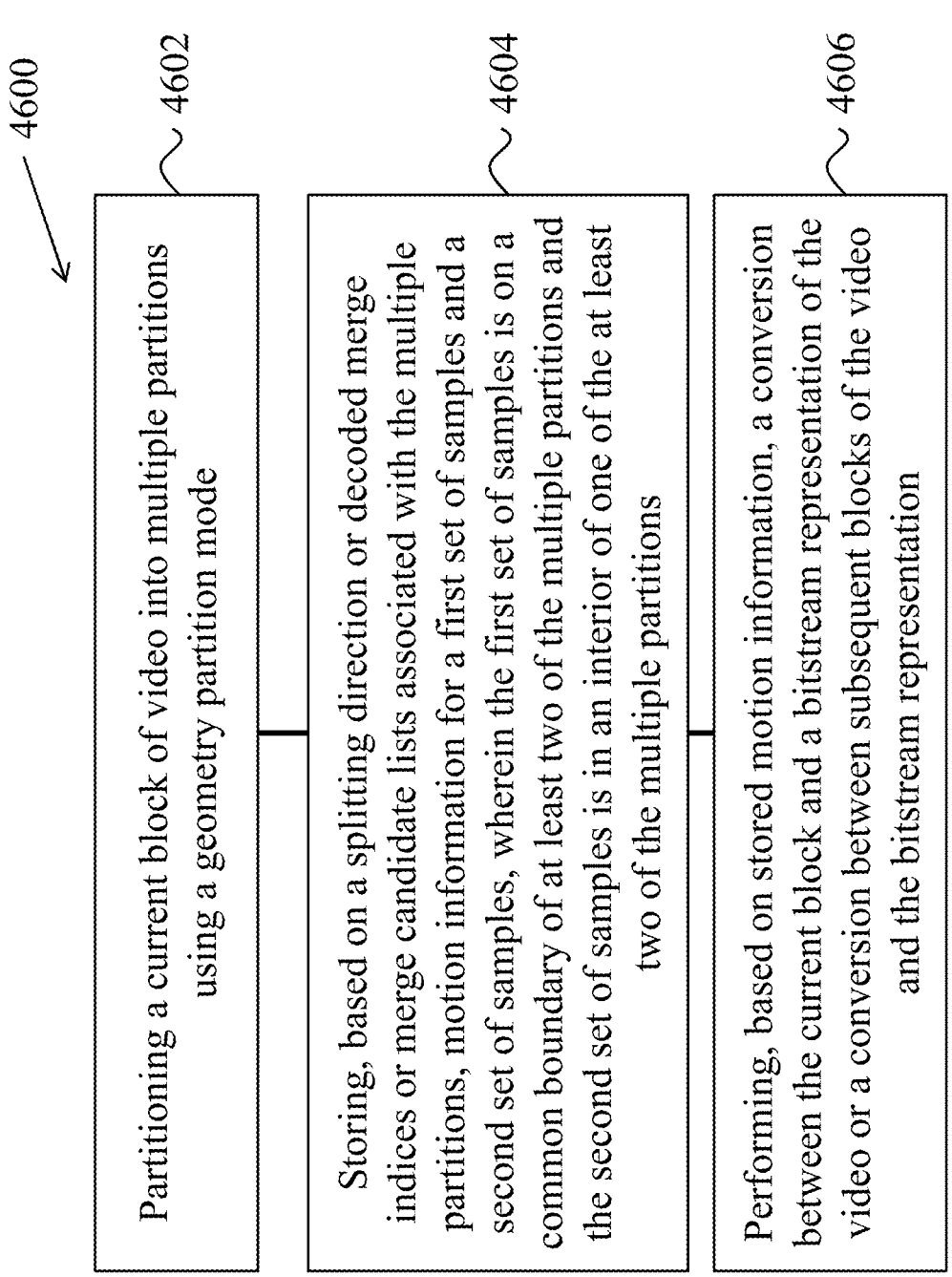

FIG. 46 is a flowchart for a method 4600 for video processing. The method 4600 includes, at operation 4602, partitioning a current block of video into multiple partitions using a geometry partition mode.

The method 4600 includes, at operation 4604, storing, based on a splitting direction or decoded merge indices or merge candidate lists associated with the multiple partitions, motion information for a first set of samples and a second set of samples, wherein the first set of samples is on a common boundary of at least two of the multiple partitions and the second set of samples is in an interior of one of the at least two of the multiple partitions.

The method 4600 includes, at operation 4606, performing, based on stored motion information, a conversion between the current block and a bitstream representation of the video or a conversion between subsequent blocks of the video and the bitstream representation.

Figure 47:
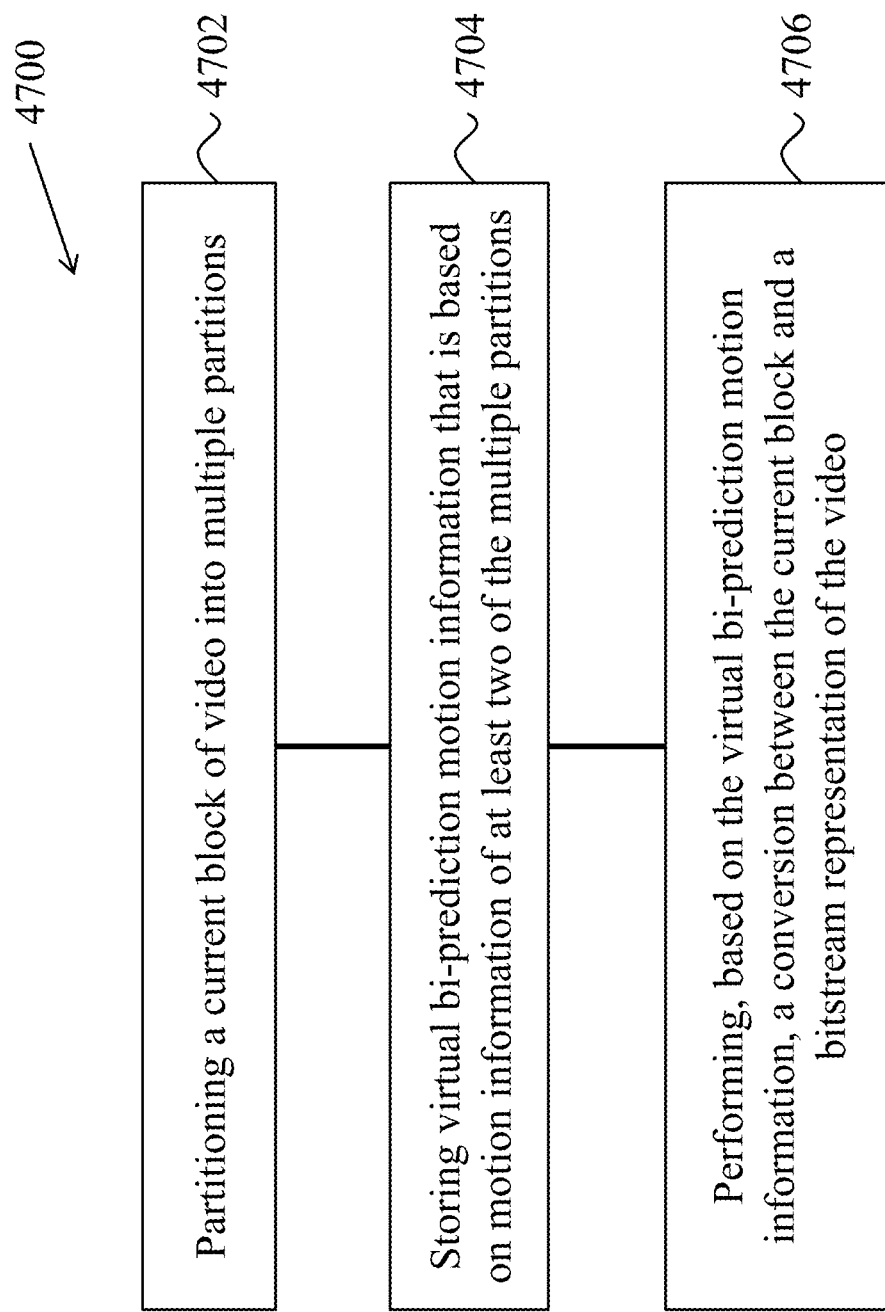

FIG. 47 is a flowchart for a method 4700 for video processing. The method 4700 includes, at operation 4702, partitioning a current block of video into multiple partitions.

The method 4700 includes, at operation 4704, storing virtual bi-prediction motion information that is based on motion information of at least two of the multiple partitions.

The method 4700 includes, at operation 4706, performing, based on the virtual bi-prediction motion information, a conversion between the current block and a bitstream representation of the video.

Figure 48:
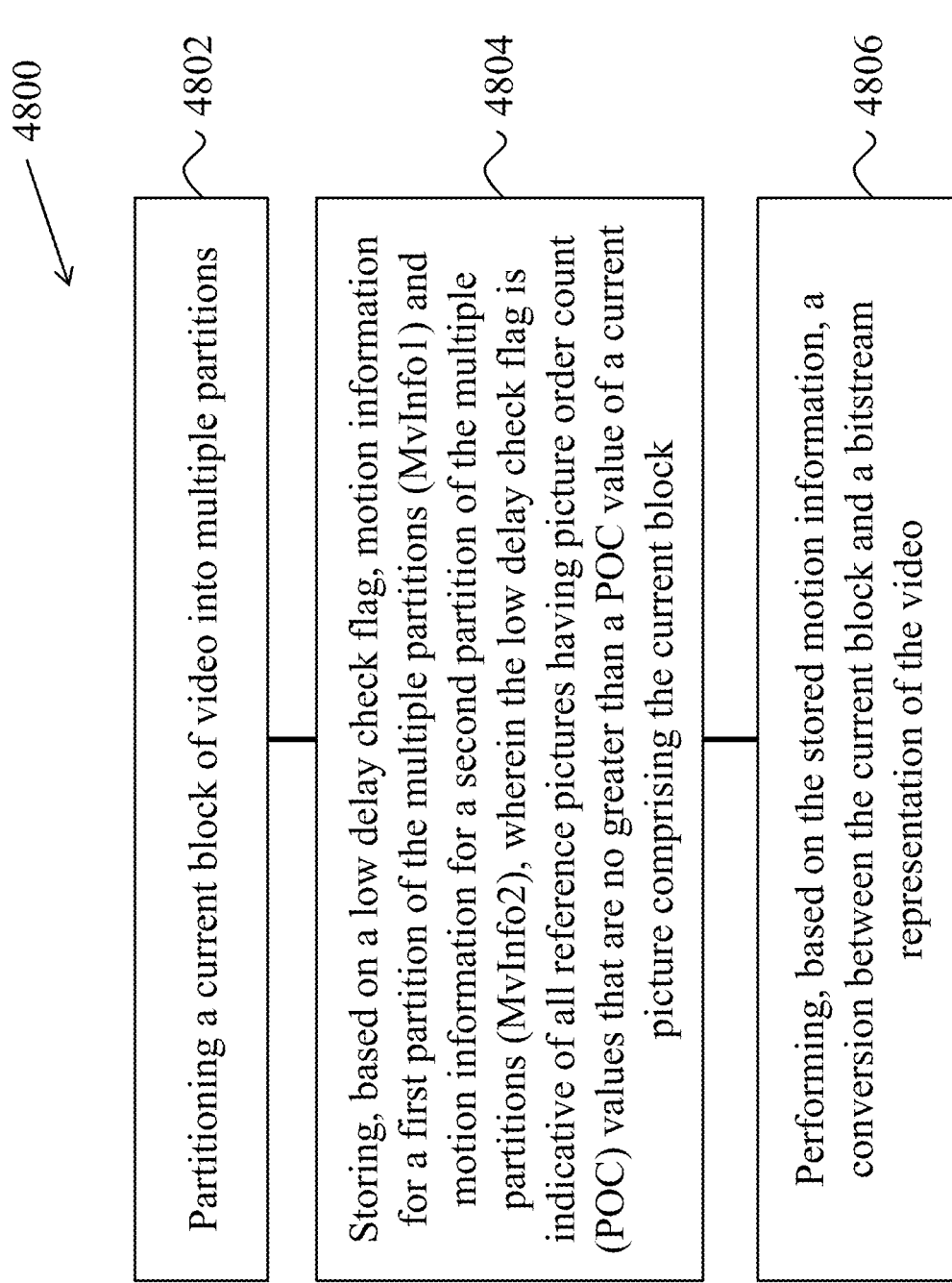

FIG. 48 is a flowchart for a method 4800 for video processing. The method 4800 includes, at operation 4802, partitioning a current block of video into multiple partitions.

The method 4800 includes, at operation 4804, storing, based on a low delay check flag, motion information for a first partition of the multiple partitions (MvInfo1) and motion information for a second partition of the multiple partitions (MvInfo2), wherein the low delay check flag is indicative of all reference pictures having picture order count (POC) values that are no greater than a POC value of a current picture comprising the current block.

The method 4800 includes, at operation 4806, performing, based on the stored motion information, a conversion between the current block and a bitstream representation of the video.

In some embodiments, the following technical solutions can be implemented:

A1. A method for video processing, comprising: making a decision, based on a priority rule, regarding an order of insertion of motion candidates into a motion candidate list for a conversion between a current block of video and a bitstream representation of the video, wherein the current block is coded using a geometry partition mode; and performing, based on the decision and the motion candidate list, the conversion.

A2. The method of solution A1, wherein the priority rule is based on a prediction direction of at least one of the motion candidates.

A3. The method of solution A2, wherein the order of insertion comprises inserting regular motion candidates with uni-prediction from List X before inserting any regular motion candidates with uni-prediction from List Y.

A4. The method of solution A2, wherein the order of insertion comprises inserting motion candidates with bi-prediction before inserting any motion candidates with uni-prediction.

A5. The method of solution A2, wherein the order of insertion is defined as: motion candidates of List X derived from regular motion candidates with bi-prediction, followed by motion candidates of List X derived from regular motion candidates with bi-prediction, followed by regular motion candidates with uni-prediction, wherein X=0 or X=1.

A6. The method of solution A2, wherein the order of insertion comprises inserting motion candidates derived from a first regular motion candidate with bi-prediction before inserting motion candidates derived from a second regular motion candidate with bi-prediction, and wherein the order of insertion for the current block is identical to an order of insertion for a block of video coded using a non-geometry partition mode.

A7. The method of solution A2, wherein the order of insertion comprises inserting motion candidates derived from a first regular motion candidate with bi-prediction and motion candidates derived from a second regular motion candidate with bi-prediction in an interleaved manner.

A8. The method of solution A7, wherein the interleaved manner comprises inserting a truncated List0-predicted candidate derived from CA, a truncated List1-predicted candidate derived from CB, a truncated List1-predicted candidate derived from CA, and a truncated List0-predicted candidate derived from CB, wherein CA and CB are two regular motion candidates.

A9. The method of solution A7, wherein the interleaved manner comprises inserting a truncated List1-predicted candidate derived from CA, a truncated List0-predicted candidate derived from CB, a truncated List0-predicted candidate derived from CA, and a truncated List1-predicted candidate derived from CB, wherein CA and CB are two regular motion candidates.

A10. The method of any solutions A1 to A9, wherein the regular motion candidate is a motion candidate derived for a block of video coded using a non-geometry partition mode.

A11. The method of solution A1, wherein the priority rule is based on coded mode information associated with regular motion candidates.

A12. The method of solution A11, wherein the coded mode information comprises coding using a merge mode or an advanced motion vector prediction (AMVP) mode.

A13. The method of solution A12, wherein the order of insertion comprises inserting motion candidates derived from a block coded with the AMVP mode before inserting motion candidates derived from a block coded with the merge mode.

A14. The method of solution A12, wherein the order of insertion comprises inserting motion candidates derived from a block coded with the merge mode before inserting motion candidates derived from a block coded with the AMVP mode.

A15. The method of solution A11, wherein the coded mode information comprises a reference index or a picture order count (POC) difference.

A16. The method of solution A15, wherein the order of insertion comprises inserting a motion candidate associated with a first reference index before inserting a motion candidate associated with a second reference index that is greater than the first reference index.

A17. The method of solution A15, wherein the order of insertion comprises inserting a motion candidate associated with a first POC difference before inserting a motion candidate associated with a second POC difference reference index that is greater than the first POC difference.

A18. The method of solution A11, wherein the coded mode information comprises a quantization parameter (QP) or a temporal layer index of a reference picture associated with a picture, a slice or a tile group comprising the current block.

A19. The method of solution A18, wherein the order of insertion comprises inserting a motion candidate associated with a first QP before inserting a motion candidate associated with a second QP that is greater than the first QP.

A20. The method of solution A1, wherein the order of insertion comprises inserting all Truncated List1-predicted candidates before any of Truncated List0-predicted candidates.

A21. The method of solution A1, wherein the order of insertion comprises inserting, based on available geometric motion candidates, one or more Truncated List0-predicted candidates and one or more Truncated List1-predicted candidates.

A22. The method of solution A1, wherein the order of insertion comprises inserting, based on available geometric motion candidates, a first motion candidate with bi-prediction before inserting a second motion candidate with bi-prediction.

A23. A method for video processing, comprising: inserting, into a motion candidate list for a conversion between a current block of video and a bitstream representation of the video, one or more averaged uni-prediction motion candidates from List 0 and List 1 derived from one regular motion candidate, wherein the current block is coded using a geometry partition mode; and performing, based on the motion candidate list, the conversion.

A24. The method of solution A23, further comprising: selecting a single averaged uni-prediction motion candidate from the one or more averaged uni-prediction motion candidates for insertion into the motion candidate list.

A25. The method of solution A24, wherein the selecting is based on available geometric motion candidates in the motion candidate list.

A26. The method of solution A24, wherein the selecting is based on reference picture indices of List 0 and List 1.

A27. The method of solution A24, wherein the selecting is based on a picture order count (POC) distance between a reference picture and a current picture for List 0 and List 1.

A28. The method of solution A23, wherein all averaged uni-prediction motion candidates from List 0 are inserted before any averaged uni-prediction motion candidates from List 1 are inserted.

A29. The method of solution A23, wherein all averaged uni-prediction motion candidates from List 1 are inserted before any averaged uni-prediction motion candidates from List 0 are inserted.

A30. A method for video processing, comprising: inserting, into a motion candidate list for a conversion between a current block of video and a bitstream representation of the video, one or more averaged motion candidates with uni-prediction derived from regular motion candidates with uni-prediction, wherein the current block is coded using a geometry partition mode; and performing, based on the motion candidate list, the conversion.

A31. The method of solution A30, wherein an averaged motion candidate with uni-prediction from List LX is derived from a regular motion candidate with uni-prediction from List LX, wherein X=0 or X=1.

A32. The method of solution A30, wherein an averaged motion candidate with uni-prediction from List LY is derived from a scaled regular motion candidate, wherein a regular motion candidate from List LX is scaled to List LY to generate the scaled regular motion candidate, wherein X=0 or X=1, and wherein Y=1−X.

A33. A method for video processing, comprising: inserting, into a motion candidate list for a conversion between a current block of video and a bitstream representation of the video, one or more virtual motion candidates derived from available motion candidates, wherein the current block is coded using a geometry partition mode; and performing, based on the motion candidate list, the conversion.

A34. The method of solution A33, wherein the one or more virtual motion candidates are derived by first generating a truncated list of motion candidates in the motion candidate list.

A35. The method of solution A33, wherein the one or more virtual motion candidates are derived based only on motion candidates with uni-prediction.

A36. The method of solution A33, wherein the one or more virtual motion candidates are derived based only on motion candidates with uni-prediction and a truncated list of motion candidates predicted from List 1.

A37. The method of solution A33, wherein the one or more virtual motion candidates are derived based on motion candidates with a predetermined reference picture index or with a picture order count (POC) distance within a certain range.

A38. The method of solution A33, wherein the one or more virtual motion candidates are derived without an application of a pruning operation.

A39. The method of any of solutions A1 to A38, wherein the current block is split into multiple partitions based on a splitting pattern.

A40. The method of any of solutions A1 to A39, wherein at least one partition of the multiple partitions is non-square and non-rectangular.

A41. The method of any of solutions A1 to A39, wherein the geometry partition mode comprises a triangular partitioning mode.

A42. The method of any of solutions A1 to A41, wherein the conversion generates the current block from the bitstream representation.

A43. The method of any of solutions A1 to A41, wherein the conversion generates the bitstream representation from the current block.

A44. An apparatus in a video system comprising a processor and a non-transitory memory with instructions thereon, wherein the instructions upon execution by the processor, cause the processor to implement the method in any one of solutions A1 to A43.

A45. A computer program product stored on a non-transitory computer readable media, the computer program product including program code for carrying out the method in any one of solutions A1 to A43.

In some embodiments, the following technical solutions can be implemented:

B1. A method of video processing, comprising: making a decision, based on a priority rule, regarding an order of insertion of motion candidates into a motion candidate list for a conversion between a current block of video coded using a geometry partition mode and a bitstream representation of the video, wherein the priority rule is based on a position from where a motion candidate of the motion candidates is derived or one or more reference picture lists associated with the motion candidate; and performing, based on the decision and the motion candidate list, the conversion.

B2. The method of solution B1, wherein upon a determination that a first motion candidate CA is derived from block A, a second motion candidate CB is derived from block B, and block B is checked after block A, the order of insertion comprises inserting motion candidates derived from CB after inserting motion candidates derived from CA into the motion candidate list.

B3. The method of solution B2, further comprising: checking block B after block A in a construction process of a regular motion candidate list.

B4. The method of solution B2, the order of insertion further comprises inserting motion candidates with prediction from List X derived from CB after inserting motion candidates with prediction from List X derived from CA, wherein X=0 or X=1.

B5. The method of solution B2, wherein the order of insertion further comprises inserting motion candidates with prediction from List Y derived from CB after inserting motion candidates with prediction from List Y derived from CA, wherein X=0 or X=1, and wherein Y=(1−X).

B6. The method of solution B2, wherein the order of insertion further comprises inserting motion candidates with prediction from List X derived from CB after inserting motion candidates with prediction from List Y derived from CA, wherein X=0 or X=1, and wherein Y=(1−X).

B7. The method of any of solutions B1 to B6, wherein the current block is partitioned into multiple partitions based on a splitting pattern.

B8. The method of any of solutions B1 to B6, wherein the geometry partition mode comprises a triangular partitioning mode.

B9. The method of any of solutions B1 to B6, wherein the current block is partitioned into multiple partitions with at least one partition being non-square and non-rectangular.

B10. The method of any of solutions B1 to B9, wherein the conversion generates the current block from the bitstream representation.

B11. The method of any of solutions B1 to B9, wherein the conversion generates the bitstream representation from the current block.

B12. An apparatus in a video system comprising a processor and a non-transitory memory with instructions thereon, wherein the instructions upon execution by the processor, cause the processor to implement the method in any one of solutions B1 to B11.

B13. A computer program product stored on a non-transitory computer readable media, the computer program product including program code for carrying out the method in any one of solutions B1 to B11.

In some embodiments, the following technical solutions can be implemented:

C1. A method of video processing, comprising: making a decision, based on a priority rule, regarding an order of insertion of motion candidates into a motion candidate list for a conversion between a current block of video and a bitstream representation of the video, wherein the current block is coded using a geometry partition mode, wherein the order or insertion is changeable across sequence to sequence, picture to picture, slice to slice, tile group to tile group, or from the current block to a subsequent block of the video; and performing, based on the decision and the motion candidate list, the conversion.

C2. The method of solution C1, wherein the order of insertion is based on the current block, or a sequence, a picture, a slice or a tile group comprising the current block.

C3. The method of solution C2, wherein the priority rule is based on at least one of a size, a shape or a splitting pattern of the current block.

C4. The method of any of solutions C1 to C3, wherein the order of insertion is signaled from an encoder to a decoder in a sequence parameter set (SPS), a video parameter set (VPS), a picture parameter set (PPS), a slice header, a tile group header, a tile, a coding tree unit (CTU) or a coding unit (CU) in the bitstream representation.

C5. A method of video processing, comprising: partitioning a current block of video coded using a geometry partition mode into multiple partitions; constructing multiple motion candidate lists, each motion candidate list corresponding to each of the multiple partitions; and performing, based on the multiple motion candidate lists, a conversion between the current block and a bitstream representation of the video.

C6. The method of solution C5, wherein a first of the multiple motion candidate lists for a first of the multiple partitions comprises only motion candidates predicted from List X, wherein a second of the multiple motion candidate lists for a second of the multiple partitions comprises only motion candidates predicted from List Y, wherein X=0 or X=1, and wherein Y=(1−X).

C7. The method of solution C5, wherein one or more motion candidates that are inserted into the multiple motion candidate lists are based on motion information associated with different spatial or temporal blocks.

C8. The method of solution C7, wherein a location of the different spatial or temporal blocks used to derive the one or more motion candidates for a first partition of the multiple partitions is based on a location of the first partition or a second partition of the multiple partitions in the current block.

C9. The method of solution C7, wherein a location of the different spatial or temporal blocks used to derive the one or more motion candidates for a first partition or a second partition of the multiple partitions is based on a splitting pattern of the current block.

C10. The method of solution C9, wherein the splitting pattern comprises splitting from a top-right corner to a bottom-left corner or from a top-left corner to a bottom-right corner, denoted by a 45 degree splitting pattern or a 135 degree splitting pattern, respectively.

C11. The method of solution C10, wherein the splitting pattern comprises the 135 degree splitting pattern, and wherein the method further comprises: checking more above blocks for a partition comprising the top-right corner of the current block.

C12. The method of solution C10, wherein the splitting pattern comprises the 135 degree splitting pattern, and wherein the method further comprises: checking more left blocks for a partition comprising the bottom-left corner of the current block.

C13. The method of solution C5, wherein an index for each of the multiple motion candidate lists corresponding to the multiple partitions is signaled.

C14. The method of solution C5, wherein the bitstream representation comprising an index for each of the multiple motion candidate lists is parsed for the conversion.

C15. A method of video processing, comprising: partitioning a current block of video coded using a geometry partition mode into multiple partitions; constructing multiple motion candidate lists, wherein each of the multiple partitions is configured to select a same motion candidate list of the multiple motion candidate lists; and performing, based on the selected same motion candidate list, a conversion between the current block and a bitstream representation of the video.

C16. The method of solution C15, wherein the bitstream representation comprises an index of a first motion candidate list of the multiple motion candidate lists.

C17. The method of solution C16, wherein the bitstream representation further comprises indexes of motion candidates from the first motion candidate list, and wherein the indexes of the motion candidate are signaled subsequent to the index of the first motion candidate list.

C18. The method of solution C16, wherein the bitstream representation further comprises indexes of motion candidates from the first motion candidate list subsequent to the index of the first motion candidate list, and wherein the bitstream representation is parsed for the conversion C19. The method of solution C15, wherein the index of the first motion candidate list is jointly coded with indexes of motion candidates from the first motion candidate list in the bitstream representation.

C20. The method of solution C15, wherein the bitstream representing comprising the index of the first motion candidate list jointly coded with indexes of motion candidates from the first motion candidate list is parsed for the conversion.

C21. The method of any of solutions C1 to C20, wherein the current block is split into multiple partitions based on at least a splitting pattern.

C22. The method of any of solutions C1 to C21, wherein the geometry partition mode comprises a triangular partitioning mode.

C23. The method of any of solutions C1 to C21, wherein the current block is split into multiple partitions with at least one partition being non-square and non-rectangular.

C24. The method of any of solutions C1 to C23, wherein the conversion generates the current block from the bitstream representation.

C25. The method of any of solutions C1 to C23, wherein the conversion generates the bitstream representation from the current block.

C26. An apparatus in a video system comprising a processor and a non-transitory memory with instructions thereon, wherein the instructions upon execution by the processor, cause the processor to implement the method in any one of solutions C1 to C25.

C27. A computer program product stored on a non-transitory computer readable media, the computer program product including program code for carrying out the method in any one of solutions C1 to C25.

In some embodiments, the following technical solutions can be implemented:

D1. A method of video processing comprising: performing a conversion between a current block of video in a video unit and a bitstream representation of the video, wherein the bitstream representation includes a field indicative of a maximum number of allowed motion candidate in a motion candidate list for a geometry partition mode that is enabled in the video region.

D2. The method of solution D1, wherein the field comprises explicit signaling of an indication of the maximum number of allowed motion candidates in the bitstream representation.

D3. The method of solution D1, wherein the field implicitly indicates that the maximum number of allowed motion candidates is equal to a maximum number of allowed motion candidates in a motion candidate list for another block that is coded using a non-geometry partition mode.

D4. The method of any of solutions D1 to D3, wherein the current block is further coded using a merge mode or an advanced motion vector prediction (AMVP) mode.

D5. The method of any of solutions D1 to D3, wherein the video unit comprises a sequence, a video, a picture, a slice, a tile group, a largest coding unit (LCU) row, or a group of largest coding units (LCUs).

D6. The method of any of solutions D1 to D3, wherein the indication of the maximum number of allowed motion candidates in the field is signaled in a sequence parameter set (SPS), a video parameter set (VPS), a picture parameter set (PPS), a picture header, a slice header, a tile group header, a largest coding unit (LCU) row or a group of largest coding units (LCUs).

D7. The method of any of solutions D1 to D6, wherein the indication of the maximum number of allowed motion candidates in the field is binarized with unary coding or truncated unary coding.

D8. The method of solution D2, wherein explicitly signaling the indication of the maximum number of allowed motion candidates in the field comprises signaling a difference between M and the maximum number of allowed motion candidates, wherein M is an integer.

D9. The method of solution D8, wherein the maximum number of allowed motion candidates for a block coded using the geometry partition mode is set to M minus a parsed indicator.

D10. The method of solution D8 or 9, wherein M=5 or M=6.

D11. The method of any of solutions D1 to D8, wherein the bitstream representation comprising an indication of the maximum number of allowed motion candidates in the field is parsed for the conversion.

D12. The method of solution D1, wherein the bitstream representation comprises a one bit flag that indicates wherein the maximum number of allowed motion candidates for blocks of the video coded using the geometry partition mode is the same as a maximum number of allowed regular motion candidates or sub-block motion candidates.

D13. The method of solution D12, wherein the bitstream representation comprising the one bit flag is parsed for the conversion.

D14. The method of any of solutions D1 to D13, wherein the current block is split into multiple partitions according to a splitting pattern.

D15. The method of any of solutions D1 to D14, wherein the geometry partition mode comprises a triangular partitioning mode.

D16. The method of any of solutions D1 to D14, wherein the current block is split into multiple partitions with at least one partition of the multiple partitions being non-square and non-rectangular.

D17. The method of any of solutions D1 to D16, wherein the conversion generates the current block from the bitstream representation.

D18. The method of any of solutions D1 to D16, wherein the conversion generates the bitstream representation from the current block.

D19. An apparatus in a video system comprising a processor and a non-transitory memory with instructions thereon, wherein the instructions upon execution by the processor, cause the processor to implement the method in any one of solutions D1 to D18.

D20. A computer program product stored on a non-transitory computer readable media, the computer program product including program code for carrying out the method in any one of solutions D1 to D18.

In some embodiments, the following technical solutions can be implemented:

E1. A method of video processing. comprising: selecting, for a current block of video that is partitioned into multiple partitions using a geometry partition mode, a weighting factor group from a plurality of weighting factor groups, wherein the weighting factor group is selected based on at least a width or a height of the current block; and applying, as part of a conversion between the current block and a bitstream representation of the video, the weighting factor group to samples along a common boundary of at least two of the multiple partitions.

E2. The method of solution E1, wherein the selecting is based on a ratio between the width and the height being larger than a threshold.

E3. The method of solution E1, wherein the selecting is based on a ratio between the height and the width being larger than a threshold.

E4. The method of solution E1, wherein the plurality of weighting factor groups are predefined based on the width or the height of the current block.

E5. The method of solution E4, wherein one or two weighting factor groups are selected from the plurality of weighting factor groups.

E6. A method of video processing. comprising: determining, for a sample within a current block of video that is partitioned into multiple partitions using a geometry partition mode, at least one weighting factor based on an angle of a common boundary of at least two of the multiple partitions; and performing, based on the at least one weighting factor, a conversion between the current block and a bitstream representation of the video.

E7. The method of solution E6, wherein the determining is further based on a location of the sample.

E8. The method of any solutions E of 1 to 7, wherein a final prediction value for the sample in the current block is derived as a weighted sum of two prediction values based on the at least one weighting factor.

E9. The method of solution E8, wherein the final prediction block for the current block is $(f(x, y) \times P1(x,y)+(2M-f(x,y)) \times P2(x,y)+\text{offset})>>M$, wherein $P1(x,y)$ and $P2(x,y)$ are a first prediction value and a second prediction value, respectively, for the sample with coordinates $(x, y)$, wherein M and offset are integers, and wherein $f(x,y)$ is a function that returns a weight applied to the first prediction value.

E10. The method of solution E9, wherein offset=$(1<<(M-1))$.

E11. The method of any of solutions E1 to E10, wherein the current block is split into multiple partitions based on a splitting pattern.

E12. The method of any of solutions E1 to E11, wherein the geometry partition mode comprises a triangular partitioning mode.

E13. The method of solution E12, wherein the geometry partition mode comprises splitting one block into two partitions.

E12. The method of any of solutions E1 to E10, wherein the current block is split into multiple partitions with at least one partition of the multiple partitions being non-square and non-rectangular.

E13. The method of any of solutions E1 to E12, wherein the conversion generates the current block from the bitstream representation.

E14. The method of any of solutions E1 to E12, wherein the conversion generates the bitstream representation from the current block.

E15. An apparatus in a video system comprising a processor and a non-transitory memory with instructions thereon, wherein the instructions upon execution by the processor, cause the processor to implement the method in any one of solutions E1 to E14.

E16. A computer program product stored on a non-transitory computer readable media, the computer program product including program code for carrying out the method in any one of solutions E1 to E14.

In some embodiments, the following technical solutions can be implemented:

F1. A method of video processing. comprising: performing, for a current block of video that is partitioned into multiple partitions using a geometry partition mode, a motion compensation process on samples along a common boundary of at least two of the multiple partitions with a sample size that is different from a 4×4 sample size; and performing, based on the motion compensation process, a conversion between the current block and a bitstream representation of the video.

F2. The method of solution F1, wherein the motion compensation process is performed with an 8×8 sample size to reduce a memory bandwidth required for the conversion.

F3. The method of solution F1, wherein the motion compensation process is performed with an 8×4 sample size or a 4×8 sample size to reduce a memory bandwidth required for the conversion.

F4. The method of solution F3, wherein the sample size is based on a height or a width of the current block.

F5. The method of solution F3, wherein the sample size is based on a splitting pattern for the multiple partitions of the current block.

F6. The method of solution F5, wherein the splitting pattern comprises splitting from a top-right corner to a bottom-left corner or from a top-left corner to a bottom-right corner, denoted by a 45 degree splitting pattern or a 135 degree splitting pattern, respectively.

F7. A method of video processing, comprising: partitioning a current block of video into multiple partitions using a geometry partition mode; storing a single set of motion information for a K×L region within the current block that is derived from motion information associated with the multiple partitions; and performing, using at least one set of motion information associated with at least one of the multiple partitions, a conversion between the current block and a bitstream representation of the video.

F8. The method of solution F7, wherein MVInfoi represents motion information of an i-th partition, wherein i=1 and i=2, wherein upon a determination that MVInfo1 is from a first reference picture list LX and MVInfo2 is from a second reference picture list LY, the single set of motion information comprises bi-prediction and associated motion information for the current block based on combining MVInfo1 and MVInfo2, wherein X=0 or X=1, and wherein Y=(1−X).

F9. The method of solution F7, wherein MVInfoi represents motion information of an i-th partition, wherein i=1 and i=2, wherein upon a determination that both MVInfo1 and MVInfo2 are from a reference list LX, the single set of motion information uni-prediction and associated motion information for the current block based on MVInfoj, wherein j=1 or j=2, and wherein X=0 or X=1.

F10. The method of solution F8, wherein the single set of motion information comprising bi-prediction is derived by combining motion vectors and reference picture indices of MVInfo1 and MVInfo2.

F11. The method of solution F9, wherein the single set of motion information comprising uni-prediction is based on MVInfo1.

F12. The method of solution F9, wherein the single set of motion information comprising uni-prediction is based on MVInfo2.

F13. The method of any solutions F1 to F12, wherein MVInfo1 comprises a set of motion information associated with a partition covering a top-right corner sample and MVInfo2 comprises a set of motion information associated with a partition covering a bottom-left corner sample upon a determination that the top-right corner sample and the bottom-left corner sample are in two different partitions.

F14. The method of solution F13, wherein a splitting direction for the current block is from a top-left corner to a bottom-right corner.

F15. The method of any solutions F1 to F12, wherein MVInfo1 comprises a set of motion information associated with a partition covering a top-left corner sample and MVInfo2 comprises a set of motion information associated with a partition covering a bottom-right corner sample upon a determination that the top-left corner sample and the bottom-right corner sample are in two different partitions.

F16. The method of solution F15, wherein a splitting direction for the current block is from a top-right corner to a bottom-left corner.

F17. The method of solution F7, wherein the stored single set of motion information is used in one of temporal motion prediction, spatial motion prediction for subsequent blocks of the video or a filtering process for the current block.

F18. The method of solution F7, wherein the stored single set of motion information is used in processing other blocks in different pictures.

F19. The method of solution F17, wherein the filtering process comprises deblocking or adaptive loop filtering (ALF).

F20. The method of solution F7, wherein MVInfoi and MVInfoj represent motion information of an i-th and a j-th partition, respectively, wherein both MVInfoi and MVInfoj are from a reference picture list LX, wherein X=0 or X=1, and wherein the single set of motion information is based on combining MVInfoi and a scaled motion vector that is generated by scaling MVInfoj to a reference picture list LY, wherein Y=(1−X).

F21. The method of solution F20, wherein a value of X is either predetermined or signaled in the bitstream representation.

F22. The method of solution F7, wherein MVInfoi and MVInfoj represent motion information of an i-th and a j-th partition, respectively, wherein both MVInfoi and MVInfoj are from a reference picture list LX, wherein X=0 or X=1, and wherein the single set of motion information is based on combining MVInfoi and a mapped motion vector that is generated by mapping MVInfoj to a reference picture list LY, wherein Y=(1−X).

F23. The method of solution F22, wherein the single set of motion information comprises a bi-prediction motion vector.

F24. The method of solution F22, wherein mapping MVInfoj to the reference picture in List LY excludes a scaling operation.

F25. The method of solution F7, wherein storing the single set of motion information is based on decoded motion information associated with the multiple partitions.

F26. The method of solution F25, wherein MVInfoi and MVInfoj represent motion information of an i-th and a j-th partition, respectively, wherein both MVInfoi and MVInfoj are from the same reference picture list LX, wherein X=0 or X=1, and wherein the single set of motion information comprises uni-prediction motion information.

F27. The method of solution F25, wherein MVInfoi and MVInfoj represent motion information of an i-th and a j-th partition, respectively, wherein MVInfoi is from a reference picture list LX and MVInfoj is from a reference picture list LY, wherein X=0 or X=1, wherein Y=(1−X), and wherein the single set of motion information comprises bi-prediction motion information.

F28. The method of solution F25, wherein MVInfoi and MVInfoj represent motion information of an i-th and a j-th partition, respectively, wherein both MVInfoi and MVInfoj are from a reference picture list LX, wherein X=0 or X=1, wherein a reference picture list LY comprises MVInfoi or MVInfoj, wherein Y=(1−X), and wherein the single set of motion information comprises bi-prediction motion information.

F29. The method of solution F7, wherein storing the single set of motion information is based on a sub-region of the current block being located along a common boundary of at least two of the multiple partitions.

F30. The method of solution F29, wherein different sub-regions store different motion information.

F31. The method of solution F29, wherein the sub-region stores uni-prediction or bi-prediction motion information.

F32. The method of solution F7, wherein storing the single set of motion information is based on a position of a sub-block in the current block, and wherein the sub-block only stores uni-prediction motion information.

F33. The method of any of solution F1 to F32, wherein the single set of motion information is used in a motion compensation process applied to the current block.

F34. The method of solution F7, wherein MVInfoi and MVInfoj represent motion information of an i-th and a j-th partition, respectively, wherein both MVInfoi and MVInfoj are from a reference picture list LX, wherein X=0 or X=1, and wherein the single set of motion information comprises a bi-prediction motion vector for the reference picture list LX that is derived from either (a) MVInfoi, (b) MVInfoj or (c) averaging MVInfoi and MVInfoj.

F35. The method of solution F7, wherein MVInfoi and MVInfoj represent motion information of an i-th and a j-th partition, respectively, wherein both MVInfoi and MVInfoj are from a reference picture list LX, wherein X=0 or X=1, and wherein the single set of motion information comprises an average or a weighted average of MVInfoi and MVInfoj, and wherein the reference picture associated with the single set of motion information comprises either a reference picture of MVInfoi or a reference picture of MVInfoj.

F36. The method of any of solutions F1 to F35, wherein the K×L region contains at least one sample on a common boundary between at least two of the multiple partitions.

F37. The method of any of solutions F1 to F36, wherein the geometry partition mode comprises a triangular partitioning mode.

F38. The method of any of solutions F1 to F36, wherein at least one partition of the multiple partitions is non-square and non-rectangular.

F39. The method of any of solutions F1 to F38, wherein the conversion generates the current block from the bitstream representation.

F40. The method of any of solutions F1 to F38, wherein the conversion generates the bitstream representation from the current block.

F41. An apparatus in a video system comprising a processor and a non-transitory memory with instructions thereon, wherein the instructions upon execution by the processor, cause the processor to implement the method in any one of solutions F1 to F40.

F42. A computer program product stored on a non-transitory computer readable media, the computer program product including program code for carrying out the method in any one of solutions F1 to F40.

In some embodiments, the following technical solutions can be implemented:

G1. A method of video processing, comprising: partitioning a current block of video into multiple partitions; and performing a conversion between the current block coded using a geometry partition mode and a bitstream representation of the video, wherein a single set of motion information is stored for each M×N block unit of the current block, wherein the single set of motion information is derived from motion information associated with each of the multiple partitions, wherein either M or N is not equal to 4, and wherein each sample in the M×N block unit shares a same motion information.

G2. The method of solution G1, wherein M=8 and N=8.

G3. The method of solution G1, wherein a first portion of an M×N block unit comprises a first set of samples on a common boundary of at least two of the multiple partitions, and wherein a second portion of the M×N block unit comprises a second set of samples in an interior of one of the at least two of the multiple partitions.

G4. The method of solution G3, wherein MVInfoi represents motion information of an i-th partition, wherein i=1 and i=2, wherein upon a determination that MVInfo1 is from a first reference picture list LX and MVInfo2 is from a second reference picture list LY, the same motion information comprises bi-prediction and associated motion information for the current block based on MVInfoi for the multiple partitions, wherein X=0 or X=1, and wherein Y=(1−X).

G5. The method of solution G3, wherein MVInfoi represents motion information of an i-th partition, wherein i=1 and i=2, wherein upon a determination that both MVInfo1 and MVInfo2 are from a reference picture list LX, the same motion information comprises uni-prediction and associated motion information for the current block based on MVInfoj, wherein j=1 or j=2, and wherein X=0 or X=1.

G6. The method of solution G3, wherein MVInfoi represents motion information of an i-th partition, wherein i=1 and i=2, and wherein the same motion information comprises uni-prediction and associated motion information for the current block based on MVInfoj, wherein j=1 or j=2.

G7. A method of video processing, comprising: partitioning a current block of video into multiple partitions; and performing, as part of a conversion between the current block and a bitstream representation of the video, a motion compensation process for a first sub-region of the current block based on a first motion information that is different from a second motion information associated with the first sub-region which is to be stored.

G8. The method of solution G7, wherein the first sub-region comprises a set of M×N samples on a common boundary of at least two of the multiple partitions, wherein the motion compensation process comprises a bi-prediction, and wherein only one set of motion information from List0 or List1 of the bi-prediction is stored.

G9. The method of solution G8, wherein the one set of motion information is used to derive a spatial motion candidate for a neighboring block that is coded using a merge mode or an advanced motion vector prediction (AMVP) mode.

G10. The method of solution G8, wherein the one set of motion information is used to derive a temporal motion candidate for a subsequent block in a picture different from a current picture comprising the current block.

G11. The method of solution G8, wherein the one set of motion information is used for in-loop processing of the current block.

G12. The method of solution G11, wherein the in-loop processing comprises deblocking or adaptive loop filtering.

G13. The method of solution G7, wherein the motion compensation process for a second sub-region of the current block based on a third motion information that is associated with the second sub-region, and wherein the first sub-region and the second sub-region are in a same coding unit (CU) that comprises the multiple partitions.

G14. A method of video processing, comprising: partitioning a current block of video into multiple partitions using a geometry partition mode; storing, based on a splitting direction or decoded merge indices or merge candidate lists associated with the multiple partitions, motion information for a first set of samples and a second set of samples, wherein the first set of samples is on a common boundary of at least two of the multiple partitions and the second set of samples is in an interior of one of the at least two of the multiple partitions; and performing, based on stored motion information, a conversion between the current block and a bitstream representation of the video or a conversion between subsequent blocks of the video and the bitstream representation.

G15. The method of solution G14, wherein the stored motion information corresponds to motion information associated with one of the multiple partitions associated with a selected decoded merge index.

G16. The method of solution G14, wherein the stored motion information corresponds to the motion candidate in a motion candidate list with a selected merge index set to a variable k.

G17. The method of solution G16, wherein k=0.

G18. The method of solution G16, wherein the stored motion information corresponds to motion information for the k-th merge candidate in one of the merge candidate lists.

G19. The method of solution G15, wherein the selected decoded merge index is based on the splitting direction.

G20. The method of solution G15, wherein stored motion information comprises bi-prediction motion information upon a determination that a merge candidate with an index equal to the selected decoded merge index is based on bi-prediction.

G21. The method of solution G15, wherein stored motion information comprises uni-prediction motion information upon a determination that a merge candidate with an index equal to the selected decoded merge index is based on uni-prediction.

G22. The method of solution G6, wherein the first sub-region comprises M×N samples on a common boundary of at least two of the multiple partitions, wherein the motion compensation process comprises a bi-prediction, and wherein only one set of motion information from List0 or List1 of the bi-prediction is stored.

G23. The method of solution G6, wherein the first sub-region comprises M×N samples on a common boundary of at least two of the multiple partitions, wherein the motion compensation process comprises a bi-prediction, wherein only uni-prediction information from ListX is stored, and wherein X=0 and X=1.

G24. The method of solution G6, wherein the first sub-region comprises M×N samples on a common boundary of at least two of the multiple partitions, wherein the motion compensation process comprises a uni-prediction, wherein the second motion information comprises uni-prediction information from ListX that is stored, and wherein X=0 and X=1.

G25. A method of video processing, comprising: partitioning a current block of video into multiple partitions; storing virtual bi-prediction motion information that is based on motion information of at least two of the multiple partitions; and performing, based on the virtual bi-prediction motion information, a conversion between the current block and a bitstream representation of the video.

G26. The method of solution G25, wherein Mvinfo1 and Mvinfo2 are motion information for a first partition and a second partition, respectively, and wherein the virtual bi-prediction motion information is based om modifying a prediction direction of MvinfoA from ListX to ListY, wherein A=1 or A=2, wherein X=0 or X=1, and wherein Y=(1−X).

G27. The method of solution G26, wherein motion vectors and reference indices of MvinfoA are kept unchanged.

G28. The method of solution G26, wherein reference indices of MvinfoA are kept unchanged and motion vectors of MvinfoA are set to opposite values.

G29. The method of any of solutions G26 to G28, wherein Mvinfo1 and Mvinfo2 are from a same prediction direction.

G30. A method of video processing, comprising: partitioning a current block of video into multiple partitions; storing, based on a low delay check flag, motion information for a first partition of the multiple partitions (Mvinfo1) and motion information for a second partition of the multiple partitions (Mvinfo2), wherein the low delay check flag is indicative of all reference pictures having picture order count (POC) values that are no greater than a POC value of a current picture comprising the current block; and performing, based on the stored motion information, a conversion between the current block and a bitstream representation of the video.

G31. The method of solution G30, wherein Mvinfo1 and Mvinfo2 are from different prediction directions, and wherein storing the motion information comprises storing bi-prediction motion information that is generated by combining Mvinfo1 and Mvinfo2.

G32. The method of solution G30, wherein Mvinfo1 and Mvinfo2 are from a same prediction direction (ListX), wherein X=0 or X=1, and wherein the method further comprises: modifying Mvinfo2 by setting a prediction direction list of Mvinfo2 from ListX to ListY, wherein Y=(1−X), and wherein storing the motion information comprises storing bi-prediction motion information that is generated by combining Mvinfo1 and the modified Mvinfo2.

G33. The method of any one of solutions G25 to G32, wherein storing motion information comprises storing motion information for a sub-block of the current block.

G34. The method of solution G33, wherein the sub-block comprises samples on a common boundary of at least two of the multiple partitions.

G35. The method of solution G33, wherein the sub-block comprises a diagonal line or an anti-diagonal line in the current block.

G36. The method of solution G33, wherein the sub-block is in a lower-right corner of the current block.

G37. The method of solution G33, wherein the sub-block is in a right column or a bottom row of the current block.

G38. The method of any of solutions G1 to G37, wherein at least one partition of the multiple partitions is non-square and non-rectangular.

G39. The method of any of solutions G1 to G38, wherein the conversion generates the current block from the bitstream representation.

G40. The method of any of solutions G1 to G38, wherein the conversion generates the bitstream representation from the current block.

G41. An apparatus in a video system comprising a processor and a non-transitory memory with instructions thereon, wherein the instructions upon execution by the processor, cause the processor to implement the method in any one of solutions G1 to G40.

G42. A computer program product stored on a non-transitory computer readable media, the computer program product including program code for carrying out the method in any one of solutions G1 to G40.

Figure 49:
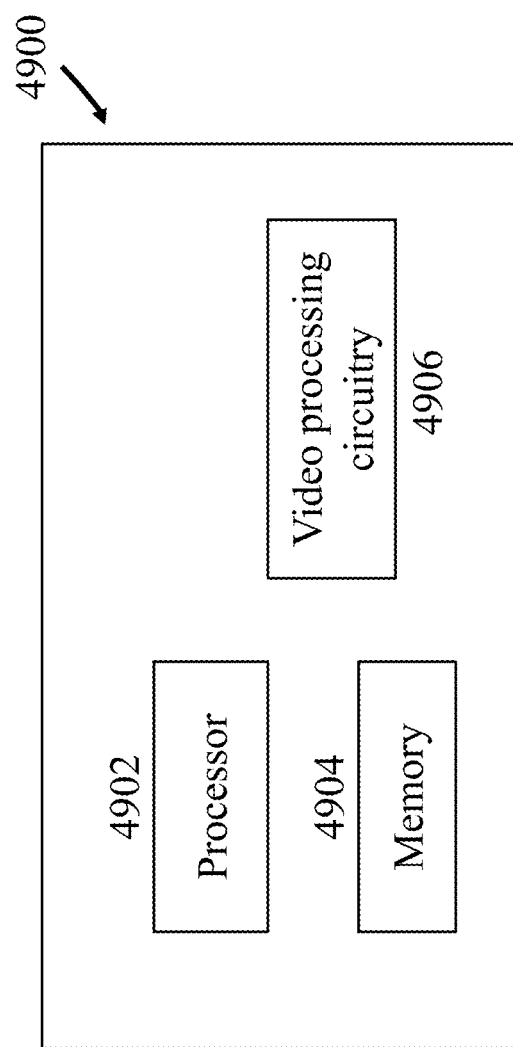
FIG. 49 is a block diagram of an example of a hardware platform for implementing a visual media decoding or a visual media encoding technique described in the present document.

FIG. 49 is a block diagram of a video processing apparatus 4900. The apparatus 4900 may be used to implement one or more of the methods described herein. The apparatus 4900 may be embodied in a smartphone, tablet, computer, Internet of Things (IoT) receiver, and so on. The apparatus 4900 may include one or more processors 4902, one or more memories 4904 and video processing hardware 4906. The processor(s) 4902 may be configured to implement one or more methods described in the present document. The memory (memories) 4904 may be used for storing data and code used for implementing the methods and techniques described herein. The video processing hardware 4906 may be used to implement, in hardware circuitry, some techniques described in the present document.

In some embodiments, the video coding methods may be implemented using an apparatus that is implemented on a hardware platform as described with respect to FIG. 49.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 50:
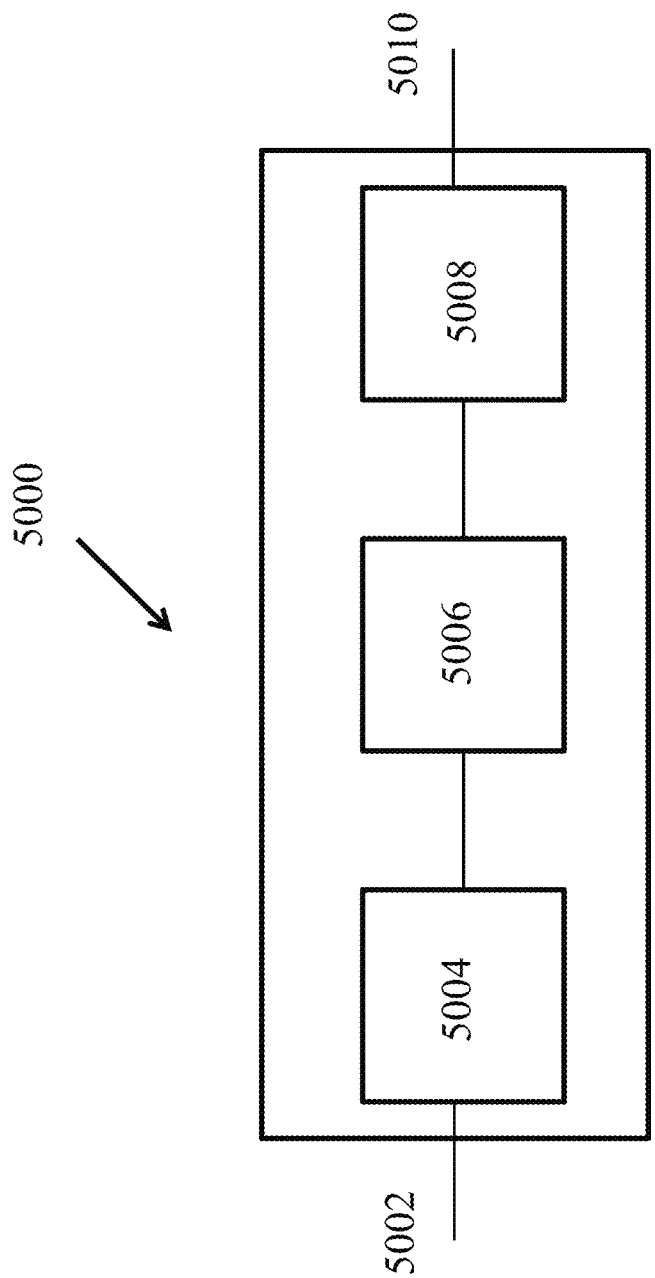
FIG. 50 is a block diagram of an example video processing system in which disclosed techniques may be implemented.

FIG. 50 is a block diagram showing an example video processing system 5000 in which various techniques disclosed herein may be implemented. Various implementations may include some or all of the components of the system 5000. The system 5000 may include input 5002 for receiving video content. The video content may be received in a raw or uncompressed format, e.g., 8 or 10 bit multi-component pixel values, or may be in a compressed or encoded format. The input 5002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 5000 may include a coding component 5004 that may implement the various coding or encoding methods described in the present document. The coding component 5004 may reduce the average bitrate of video from the input 5002 to the output of the coding component 5004 to produce a coded representation of the video. The coding techniques are therefore sometimes called video compression or video transcoding techniques. The output of the coding component 5004 may be either stored, or transmitted via a communication connected, as represented by the component 5006. The stored or communicated bitstream (or coded) representation of the video received at the input 5002 may be used by the component 5008 for generating pixel values or displayable video that is sent to a display interface 5010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

With respect to the description in the present document, the bitstream representation of a current video block may not necessarily be in the form of contiguous bits, but may be based on bits (e.g., header fields and parameter sets) that occur in different locations of a bitstream syntax.

Furthermore, in some disclosed embodiments, for sub-block coded mode, including ATMVP and affine merge, one merge list construction process is shared. Here, the ATMVP and affine merge candidates may be added in order.

In some embodiments, for triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. The transform may be performed in the whole block level, even two partitions may use different motion vectors for generating their own prediction blocks.

For remaining coding blocks, one merge list construction process is shared. Here, the spatial/temporal/HMVP, pairwise combined bi-prediction merge candidates and zero motion candidates may be inserted in order.

It will be appreciated by one of skill in the art that video encoding or decoding methods (compression/decompression) are disclosed. Geometry (or geometric) partitions of video block may be used to track motion information accurately and improve compression performance of a video coded. It will further be appreciated that the use of disclosed methods may enable embodiments to achieve further coding gain and/or reduce complexity of implementation as compared to present day video coding/decoding techniques.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, for a conversion between a current block of a video and a bitstream of the video, that the current block of video is coded using a geometric partitioning mode in which the current block corresponds to multiple partitions;
   constructing multiple motion candidate lists for the current block; and
   performing the conversion based on the multiple motion candidate lists,
   wherein one or more motion candidates that are inserted into the multiple motion candidate lists are derived based on motion information associated with different spatial or temporal blocks,
   wherein a location of the different spatial or temporal blocks used to derive the one or more motion candidates for a first partition or a second partition of the multiple partitions is based on a splitting pattern of the current block,
   wherein a first of the multiple motion candidate lists for a first of the multiple partitions comprises only motion candidates predicted from List X, wherein a second of the multiple motion candidate lists for a second of the multiple partitions comprises only motion candidates predicted from List Y, wherein X=0 or X=1, and wherein Y=(1−X).

2. The method of claim 1, wherein each of the multiple motion candidate lists corresponds to each of the multiple partitions.

3. The method of claim 1, wherein the multiple motion candidate lists are shared for all of the multiple partitions, and one of the multiple motion candidate lists is selected for each of the multiple partitions.

4. The method of claim 1, wherein the splitting pattern comprises splitting from a top-right corner to a bottom-left corner or from a top-left corner to a bottom-right corner, denoted by a 45 degree splitting pattern or a 135 degree splitting pattern, respectively.

5. The method of claim 4, wherein in case of the 135 degree splitting pattern, the method further comprises:
   checking more above blocks for a partition comprising the top-right corner of the current block; or
   checking more left blocks for a partition comprising the bottom-left corner of the current block.

6. The method of claim 1, wherein an index for each of the multiple motion candidate lists corresponding to the multiple partitions is signaled.

7. The method of claim 1, wherein an index for each of the multiple motion candidate lists is parsed from the bitstream.

8. The method of claim 1, wherein the geometric partition mode comprises a triangular partitioning mode.

9. The method of claim 1, wherein the current block is split into the multiple partitions with at least one partition being non-square and non-rectangular.

10. The method of claim 1, wherein the conversion comprises encoding the video into the bitstream.

11. The method of claim 1, wherein the conversion comprises decoding the video from the bitstream.

12. The method of claim 1, further comprising:
making a decision, based on a priority rule, regarding an order of insertion of motion candidates into at least one of the multiple motion candidate lists, wherein the order or insertion is changeable across sequence to sequence, picture to picture, slice to slice, tile group to tile group, or from the current block to a subsequent block of the video.

13. The method of claim 12, wherein the order of insertion is based on the current block, or a sequence, a picture, a slice or a tile group comprising the current block, and the order of insertion is signaled in a sequence parameter set (SPS), a video parameter set (VPS), a picture parameter set (PPS), a slice header, a tile group header, a tile, a coding tree unit (CTU) or a coding unit (CU) in the bitstream.

14. The method of claim 12, wherein the priority rule is based on at least one of a size, a shape or a splitting pattern of the current block.

15. An apparatus for processing video data comprising a processor and a non-transitory memory with instructions thereon, wherein the instructions upon execution by the processor, cause the processor to:
determine, for a conversion between a current block of a video and a bitstream of the video, that the current block of video is coded using a geometric partitioning mode in which the current block corresponds to multiple partitions;
construct multiple motion candidate lists for the current block; and
perform the conversion based on the multiple motion candidate lists,
wherein one or more motion candidates that are inserted into the multiple motion candidate lists are derived based on motion information associated with different spatial or temporal blocks,
wherein a location of the different spatial or temporal blocks used to derive the one or more motion candidates for a first partition or a second partition of the multiple partitions is based on a splitting pattern of the current block, and
wherein a first of the multiple motion candidate lists for a first of the multiple partitions comprises only motion candidates predicted from List X, wherein a second of the multiple motion candidate lists for a second of the multiple partitions comprises only motion candidates predicted from List Y, wherein X=0 or X=1, and wherein Y=(1-X).

16. A non-transitory computer-readable recording medium storing a bitstream of a video which is generated by a method performed by a video processing apparatus, wherein the method comprises:
determining, for a current block of the video, that the current block of video is coded using a geometric partitioning mode in which the current block corresponds to multiple partitions;
constructing multiple motion candidate lists for the current block; and
generating the bitstream of the video from the current block based on the multiple motion candidate lists,
wherein one or more motion candidates that are inserted into the multiple motion candidate lists are derived based on motion information associated with different spatial or temporal blocks,
wherein a location of the different spatial or temporal blocks used to derive the one or more motion candidates for a first partition or a second partition of the multiple partitions is based on a splitting pattern of the current block,
wherein a first of the multiple motion candidate lists for a first of the multiple partitions comprises only motion candidates predicted from List X, wherein a second of the multiple motion candidate lists for a second of the multiple partitions comprises only motion candidates predicted from List Y, wherein X=0 or X=1, and wherein Y=(1-X).

17. A non-transitory computer-readable storage medium storing instructions that cause a processor to:
determine, for a conversion between a current block of a video and a bitstream of the video, that the current block of video is coded using a geometric partitioning mode in which the current block corresponds to multiple partitions;
construct multiple motion candidate lists for the current block; and
perform the conversion based on the multiple motion candidate lists,
wherein one or more motion candidates that are inserted into the multiple motion candidate lists are derived based on motion information associated with different spatial or temporal blocks,
wherein a location of the different spatial or temporal blocks used to derive the one or more motion candidates for a first partition or a second partition of the multiple partitions is based on a splitting pattern of the current block,
wherein a first of the multiple motion candidate lists for a first of the multiple partitions comprises only motion candidates predicted from List X, wherein a second of the multiple motion candidate lists for a second of the multiple partitions comprises only motion candidates predicted from List Y, wherein X=0 or X=1, and wherein Y=(1-X).

* * * * *